(12) United States Patent
Shock et al.

(10) Patent No.: US 10,393,045 B2
(45) Date of Patent: Aug. 27, 2019

(54) METHOD AND SYSTEM FOR INITIATING REGENERATION OF DIESEL PARTICULATE FILTERS

(71) Applicant: IDSC Holdings, LLC, Kenosha, WI (US)

(72) Inventors: David P. Shock, Clinton Township, MI (US); Thomas L. Kotenko, Macomb, MI (US); Dan O. Morris, Troy, MI (US); Robert J. Hoevenaar, De Weere (NL); Daniel L. Doss, Novi, MI (US)

(73) Assignee: IDSC Holdings, LLC, Kenosha, WI (US)

( * ) Notice: Subject to any disclaimer, the term of this patent is extended or adjusted under 35 U.S.C. 154(b) by 318 days.

(21) Appl. No.: 15/427,031

(22) Filed: Feb. 7, 2017

(65) Prior Publication Data
US 2018/0223755 A1    Aug. 9, 2018

(51) Int. Cl.
*F02D 41/02* (2006.01)
*F01N 3/023* (2006.01)
(Continued)

(52) U.S. Cl.
CPC ........... *F02D 41/029* (2013.01); *F01N 3/023* (2013.01); *F01N 9/00* (2013.01); *F01N 11/00* (2013.01);
(Continued)

(58) Field of Classification Search
CPC .................. F02D 41/029; F02D 41/266; F02D 2041/288; F02D 2041/286;
(Continued)

(56) References Cited

U.S. PATENT DOCUMENTS

D356,296 S    3/1995  Chapman
6,296,522 B1  10/2001 Ho
(Continued)

OTHER PUBLICATIONS

Autel Maxi Check User Manual V3, Intelligent Technology Corp., Ltd., Jun. 7, 2016 (159 pages (Table of Contents to p. 156)).
(Continued)

*Primary Examiner* — Audrey K Bradley
*Assistant Examiner* — Kelsey L Stanek
(74) *Attorney, Agent, or Firm* — McDonnell Boehnen Hulbert & Berghoff LLP

(57) ABSTRACT

A method and system for initiating regeneration of a diesel particulate filter (DPF) within a diesel engine system comprising the DPF, a data link connector (DLC), and an electronic control unit (ECU) such as an engine control unit includes an engine communication interface (ECI) device and a communication device that request and transmit DPF inhibit parameters that indicate whether initiation of regeneration of the DPF can be performed. The ECI device can comprise two connectors that are connectable to different types of DLC. The communication device can comprise a smart-phone. The ECI device can determine which DPF inhibit parameter are to be requested from the ECU and which vehicle communication protocol is required to communicate with the ECU. The communication device can receive the DPF inhibit parameters, determine whether initiation of regeneration of the DPF can be performed, and transmit a communication to request initiation of regeneration of the DPF.

37 Claims, 21 Drawing Sheets

(51) Int. Cl.
*F02D 41/26* (2006.01)
*F01N 9/00* (2006.01)
*F01N 11/00* (2006.01)
*F02D 41/28* (2006.01)
*H04B 1/02* (2006.01)
*H04B 1/06* (2006.01)
*F02D 41/22* (2006.01)

(52) U.S. Cl.
CPC .......... *F01N 11/002* (2013.01); *F02D 41/266* (2013.01); *F01N 2900/08* (2013.01); *F01N 2900/10* (2013.01); *F02D 2041/228* (2013.01); *F02D 2041/286* (2013.01); *F02D 2200/604* (2013.01); *H04B 1/02* (2013.01); *H04B 1/06* (2013.01); *Y02T 10/47* (2013.01)

(58) Field of Classification Search
CPC ...... F02D 2200/604; F01N 3/023; F01N 9/00; F01N 11/00; F01N 11/002; F01N 2900/08; F01N 2900/10; H04B 1/02; H04B 1/06; Y02T 10/47
USPC .......................................................... 60/295
See application file for complete search history.

(56) References Cited

U.S. PATENT DOCUMENTS

| | | |
|---|---|---|
| D484,097 S | 12/2003 | Drane et al. |
| D525,202 S | 7/2006 | Bihrer |
| 7,134,275 B2 | 11/2006 | Tsutsumoto et al. |
| D534,495 S | 1/2007 | Gershfeld |
| D575,288 S | 8/2008 | Chen |
| 7,806,723 B2 | 10/2010 | Chong et al. |
| 8,479,499 B2 | 7/2013 | Berke et al. |
| 8,589,018 B2 | 11/2013 | Samacke et al. |
| 8,731,627 B2 | 5/2014 | Inabathuni et al. |
| D714,726 S | 10/2014 | Byrne et al. |
| 8,919,098 B2 | 12/2014 | Barucchi et al. |
| D722,024 S | 2/2015 | Smith |
| D722,971 S | 2/2015 | Smith |
| 8,963,023 B2 | 2/2015 | Phillips et al. |
| 9,002,554 B2 | 4/2015 | Chen |
| 9,634,435 B1 | 4/2017 | Raschilla et al. |
| D786,255 S | 5/2017 | Kaminaga |
| D786,875 S | 5/2017 | Kaminaga |
| D788,777 S | 6/2017 | Bargetzi |
| D790,556 S | 6/2017 | Heath et al. |
| D794,104 S | 8/2017 | Zou |
| D803,908 S | 11/2017 | Yamaguchi et al. |
| D806,040 S | 12/2017 | Morris et al. |
| D825,568 S | 8/2018 | Morris et al. |
| D826,172 S | 8/2018 | Morris et al. |
| D828,838 S | 9/2018 | Morris et al. |
| 2007/0271906 A1 | 11/2007 | Berke et al. |
| 2012/0305868 A1 | 12/2012 | Callahan et al. |
| 2013/0327569 A1 | 12/2013 | Stathis et al. |
| 2014/0120750 A1 | 5/2014 | Johnson |
| 2015/0008805 A1 | 1/2015 | Kramer |
| 2015/0118902 A1 | 4/2015 | Data et al. |
| 2016/0327754 A1 | 11/2016 | Hill et al. |

OTHER PUBLICATIONS

Campbell, Bruce and Reavell, Kingsley, Cambustion Ltd., Accelerated ash load testing of particulate filters on an automated test rig, Technical Innovations, Testing, Powertrain, magazine article, Off-Highway Engineering, Apr. 2016 (2 pages).

DG Technologies Product Pinouts and Industry Connectors References Guide, DG Technologies Vehicle Network Solutions, Dearborn Group, Inc., document date: Apr. 23, 2014, document revision: 2.5.6, (38 pages).

Diesel Particulate Filter (DPF) Service Regeneration, Alldata Repair, 2012 Chevy Truck Silverado 2500 4WD V8-6.6L Turbo, downloaded from the World Wide Web at https://www.google.com/url?sa=t&rct=j&q=&esrc=s&source=web&cd=4&ved=0ahUKEwiNyrDuldbTAhUh4oMKHck4CNEQFgg_MAM&url=http%3A%2F%2Faskatech.com%2FAskATechLive%2Fforums%2FResourceHandler.ashx%3Fa%3D7419&usg=AFQjCNHhGuQFTxU51QJ-m9EFookmndJ5eg&cad=rja, Jul. 19, 2014 (5 pages).

Diesel particulate filter, Wikipedia, the free encyclopedia, web page downloaded Feb. 12, 2016 from https://en.wikipedia.org/wiki/Diesel_particulate_filter (8 pages).

DPF Diagnostic Tool, European Exhaust and Catalyst EEC, web page downloaded Feb. 12, 2016 from http://www.eurocats.co.uk/products/dpf-tool/ (2 pages).

HD Mobile, CanDo International Inc., web page downloaded from http://www.vehicleservicepros.com/directory/computers-and-software/mobile-apps/product/20851004/cando-international-inc-hd-mobile, Feb. 2, 2017 (2 pages).

Jaltest Multibrand Diagnostics Global Solution, Cojali Group, www.jaltest.com, catalog downloaded May 1, 2017 from www.m2kinc.com/pdf/445-reference.pdf (11 pages (cover sheet, index and pp. 4-12)).

Kvaser, J1939 Standards Overview, web page downloaded Sep. 9, 2016 from https://kvaser.com/about-can/higher-layer-protocols/j1939-standards-overview/ (4 pages).

LADD Distribution, TE Connectivity's Industrial & Commercial Transportation Products, Sep. 8, 2016 (164 pages).

Mack Trucks, Inc. Operator's Handbook, Maintenance and Lubrication, MP7, MP8, and MP10 Engines, 21394653, Apr. 2010 (167 pages).

Mack Trucks, Service Manual, Trucks, Group 28, Engine Control Module (ECM), Diagnostic Trouble Code (DTC), Guide 2010 Emissions CHU, CXU, GU, TD, PV776-88961816, manual downloaded from Mack_Trucks_service_manual_trucks_group_28_ECM_DTC_guide_manual.pdf, Mar. 2, 2010, (98 pages).

The SAE J1939 Communications Network, an SAE White Paper, an overview of the J1939 family of standards and low they are used, SAE International, Sep. 11, 2011 (7 pages).

SAE J1962: Diagnostic Connector Equivalent to ISO/DIS, Society of Automotive Engineers, 40 CFR 86.094-17(h)(4), Jan. 1995 (8 pages).

Sanders, Kevin, How Diesel Particular Filters Work, Extend Regen Cycles, Protect Your Engine, DPF Remedy, web page downloaded Feb. 12, 2016 from http://dpfremedy.com/2015/10/how-diesel-particulate-filters-work/ (5 pages).

Taylor, Drew, FSX Equipment, Ask the Expert: Is there ever a time when a forced regeneration of a diesel particulate filter is necessary?, web page downloaded Apr. 7, 2016 from http://www.vehicleservicepros.com/article/12182625/ask-the-expert-is-there-ever-a-time-when-a-forced-regeneration-of-a-diesel-particulate-filter-is-necessary (6 pages).

Vehicle Identification Number Requirements, Department of Transportation, National Highway Traffic Safety Administration, 49 CFR Part 565, RIN 2127-AJ99, Apr. 25, 2008 (77 pages).

Welcome to ZED, Simple & Affordable ELD Compliance and GPS Tracking, The Lowest Cost ELD and Fleet Management Solutions, ZED, LLC, web page downloaded May 1, 2017 from ZED_The_Simple_Affordable_ELD_Solution_For_Truck_Drivers_and_Fleets, https://zed-eld.com/ (5 pages).

ZED 16-Pin Converted Cable, ZED, LLC, web page downloaded May 1, 2017 from ZED_16_Pin_Converter_Cable.pdf, https://zed-eld.com/collections/related-products/products/j1939-9-pin-type-1-male-to-j1939-9-pin-type-2-female (4 pages).

ZED Bluetooth Adapter, ZED, LLC, web page downloaded May 1, 2017 from ZED_Bluetooth_Adapter_for_Truck_Driver_E_Log.pdf, https://zed-eld.com/products/bluetooth-data-link-adapter (4 pages).

Design U.S. Appl. No. 29/593,271, inventors: Dan O. Morris and Ivan Wei, filed Feb. 7, 2017, title: Dual-connector wireless vehicle communication interface (14 pages).

METHOD AND SYSTEM FOR INITIATING REGENERATION OF DIESEL PARTICULATE FILTERS

BACKGROUND

Diesel engines, also known as compression-ignition engines, are used around the world. Diesel engines comprise cylinders. Air enters the cylinder via intake valves. Fuel enters the cylinders via fuel injectors and is ignited due to the temperature of the air within the cylinder that has been compressed during a compression stoke. After ignition, combustion exhaust exits the cylinder through exhaust valves and into an exhaust system.

Many diesel engines include a diesel particulate filter (DPF) within the exhaust system to trap particulate matter within the combustion exhaust. A DPF requires regeneration from time to time to prevent the DPF from becoming clogged. A clogged DPF can reduce performance of a diesel engine. In some instances, a clogged DPF can cause a diesel engine to stop operating and/or lead to damage of the diesel engine.

Regenerating a DPF can include burning off soot and other residue that has collected within the DPF. For diesel engines located within a vehicle, such as a semi-tractor, a passive regeneration of the DPF can occur as the vehicle is driven on a road. If the DPF on a vehicle is excessively clogged, an active regeneration of the DPF may be required. For a DPF on a vehicle, the vehicle has to be parked to actively regenerate the DPF. A vehicle typically does not produce income for its owner and/or operator when the vehicle is parked to actively regenerate a DPF on the vehicle. In some instance, the vehicle operator has to request and wait for a service person to travel to the vehicle to actively regenerate the DPF on the parked vehicle.

OVERVIEW

Several example embodiments that relate to initiating regeneration of a DPF within a diesel engine system are described.

Viewed from one aspect, an example embodiment takes the form of a method for initiating regeneration of a DPF within a diesel engine system that comprises the DPF, a first data link connector (DLC), and an electronic control unit (ECU), the method comprising: (i) receiving, at a radio receiver of an engine communication interface (ECI) device, a first radio signal comprising a request for at least one DPF regeneration inhibit parameter, wherein the ECI device comprises a first connector connectable to the first DLC, but not to a second DLC different than the first DLC; (ii) determining, by at least one processor of the ECI device, at least one message for requesting the at least one DPF regeneration inhibit parameter from the ECU; (iii) transmitting, by a first transmitter of the ECI device to the first DLC, the at least one message for requesting the at least one DPF regeneration inhibit parameter from the ECU; (iv) receiving, by a second receiver of the ECI device, the at least one DPF regeneration inhibit parameter from the ECU, wherein the received at least one DPF regeneration inhibit parameter indicates regeneration of the DPF can be initiated; (v) determining, by the at least one processor of the ECI device, at least one message for requesting the ECU to initiate regeneration of the DPF; and (vi) transmitting, by the first transmitter of the ECI device to the first DLC, the at least one message for requesting the ECU to initiate regeneration of the DPF.

Viewed from another aspect, an example embodiment takes the form of an ECI device for initiating regeneration of a DPF within a diesel engine system that comprises the DPF, a first DLC, and an ECU, the ECI device comprising: a first connector connectable to the first DLC, but not to a second DLC different than the first DLC; at least one processor; a radio receiver; a second receiver; a first transmitter; and a radio transmitter; wherein the radio receiver is configured to receive a first radio signal comprising a request for at least one DPF regeneration inhibit parameter, wherein the at least one processor is programmed to determine at least one message for requesting the at least one DPF regeneration inhibit parameter from the ECU, wherein the first transmitter is configured to transmit to the first DLC the at least one message for requesting the at least one DPF regeneration inhibit parameter from the ECU, wherein the second receiver is configured to receive the at least one DPF regeneration inhibit parameter from the ECU, wherein the received at least one DPF regeneration inhibit parameter indicates regeneration of the DPF can be initiated, wherein the at least one processor is programmed to determine at least one message for requesting the ECU to initiate regeneration of the DPF, and wherein the first transmitter is configured to transmit to the first DLC the at least one message for requesting the ECU to initiate regeneration of the DPF.

Viewed from yet another aspect, an example embodiment takes the form of a method for initiating regeneration of a DPF within a diesel engine system that comprises the DPF, a first DLC, and an ECU, the method comprising: (i) transmitting, by a radio transmitter of a communication device, a first radio signal, the first radio signal comprising a request for an ECI device to provide at least one DPF regeneration inhibit parameter, wherein the ECI device comprises a first connector, the first connector being connectable to the first DLC; (ii) receiving, by a radio receiver of the communication device, a second radio signal, the second radio signal comprising the at least one DPF regeneration inhibit parameter, wherein the second radio signal is from the ECI device; (iii) determining, by at least one processor of the communication device, the at least one DPF regeneration inhibit parameter received by the radio receiver indicates regeneration of the DPF can be initiated; and (iv) transmitting, by the radio transmitter of the communication device, a third radio signal, the third radio signal comprising an instruction for the ECI device to output at least one message for requesting the ECU to initiate regeneration of the DPF.

Viewed from still yet another aspect, an example embodiment takes the form of a communication device for initiating regeneration of a DPF within a diesel engine system that comprises the DPF, a first DLC, and an ECU, the communication device comprising: a radio transmitter; a radio receiver configured to receive a second radio signal, the second radio signal comprising at least one DPF regeneration inhibit parameter, wherein the second radio signal is from the ECI device; and at least one processor programmed to: transmit, via the radio transmitter, a first radio signal, the first radio signal comprising a request for an ECI device to provide at least one DPF regeneration inhibit parameter, wherein the ECI device comprises a first connector, the first connector being connectable to the first DLC; determine the at least one DPF regeneration inhibit parameter received by the radio receiver indicates regeneration of the DPF can be initiated; and transmit, via the radio transmitter, a third radio signal, the third radio signal comprising an instruction for the ECI device to output at least one message for requesting the ECU to initiate regeneration of the DPF.

Viewed from still yet another aspect, an example embodiment takes the form of a method for initiating regeneration of a DPF within a diesel engine system that comprises the DPF, a first DLC, and an ECU, the method comprising: (i) receiving, by at least one processor of an ECI device, an input to request the ECI device to request the ECU to initiate regeneration of the DPF, wherein the ECI device comprises a first connector connectable to the first DLC, but not to a second DLC different than the first DLC; (ii) determining, by the at least one processor of the ECI device, at least one message for requesting at least one DPF regeneration inhibit parameter from the ECU; (iii) transmitting, by a transmitter of the ECI device to the first DLC, the at least one message for requesting the at least one DPF regeneration inhibit parameter from the ECU; (iv) receiving, by a receiver of the ECI device, the at least one DPF regeneration inhibit parameter from the ECU, wherein the received at least one DPF regeneration inhibit parameter indicates regeneration of the DPF can be initiated; (v) determining, by the at least one processor of the ECI device, at least one message for requesting the ECU to initiate regeneration of the DPF; and (vi) transmitting, by the transmitter of the ECI device to the first DLC, the at least one message for requesting the ECU to initiate regeneration of the DPF.

Viewed from still yet another aspect, an example embodiment takes the form of an ECI device for initiating regeneration of a DPF within a diesel engine system that comprises the DPF, a first DLC, and an ECU, the ECI device comprising: (i) a first connector connectable to the first DLC, but not to a second DLC different than the first DLC; (ii) at least one processor; (iii) a receiver; and (iv) a transmitter, wherein the at least one processor is configured to receive an input to request the ECI device to request the ECU to initiate regeneration of the DPF, wherein the at least one processor is programmed to determine at least one message for requesting at least one DPF regeneration inhibit parameter from the ECU, wherein the transmitter is configured to transmit to the first DLC the at least one message for requesting the at least one DPF regeneration inhibit parameter from the ECU, wherein the receiver is configured to receive the at least one DPF regeneration inhibit parameter from the ECU, wherein the received at least one DPF regeneration inhibit parameter indicates regeneration of the DPF can be initiated, wherein the at least one processor is programmed to determine at least one message for requesting the ECU to initiate regeneration of the DPF, and wherein the transmitter is configured to transmit to the first DLC the at least one message for requesting the ECU to initiate regeneration of the DPF.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

This description describes several example embodiments, at least some which pertain to methods and systems for initiating regeneration of a DPF of a diesel engine system. In one respect, a diesel engine system can operate within a vehicle. For example, a diesel engine system can operate within a semi-tractor configured for pulling a trailer along a paved road. In another respect, a diesel engine system can operate outside of a vehicle. As an example, a diesel engine system can be installed at a fixed location, such as a manufacturing plant, a lift station, or a hospital.

I. Example Systems

Figure 1:
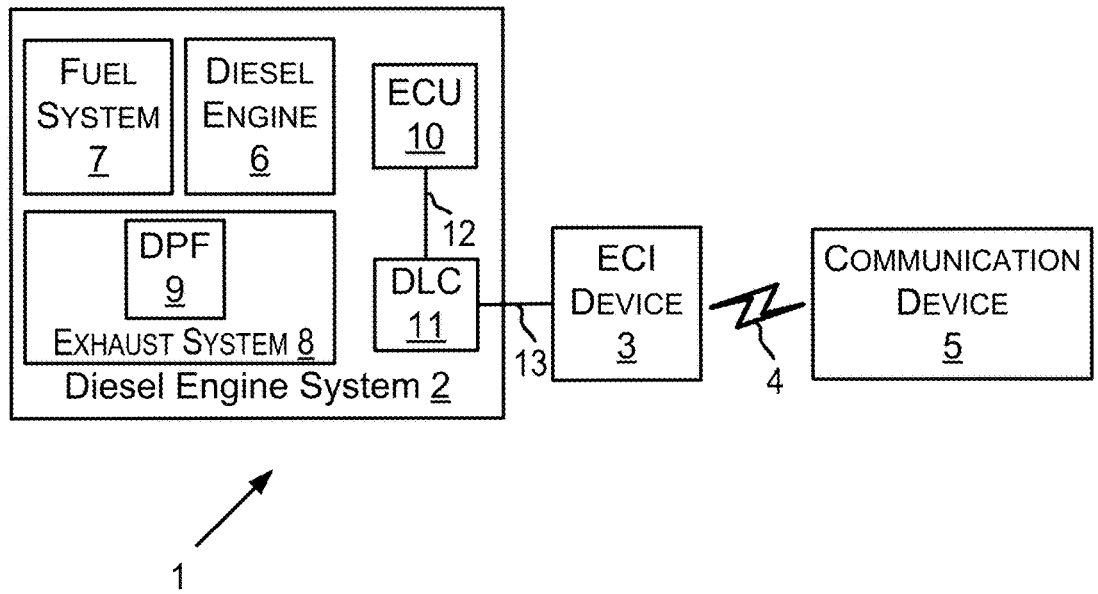
FIG. 1 and FIG. 2 are block diagrams showing example systems.

FIG. 1 is a block diagram showing an example system 1. The system 1 comprises a diesel engine system 2, an engine communication interface (ECI) device 3, a communication link 4, and a communication device 5.

Figure 2:
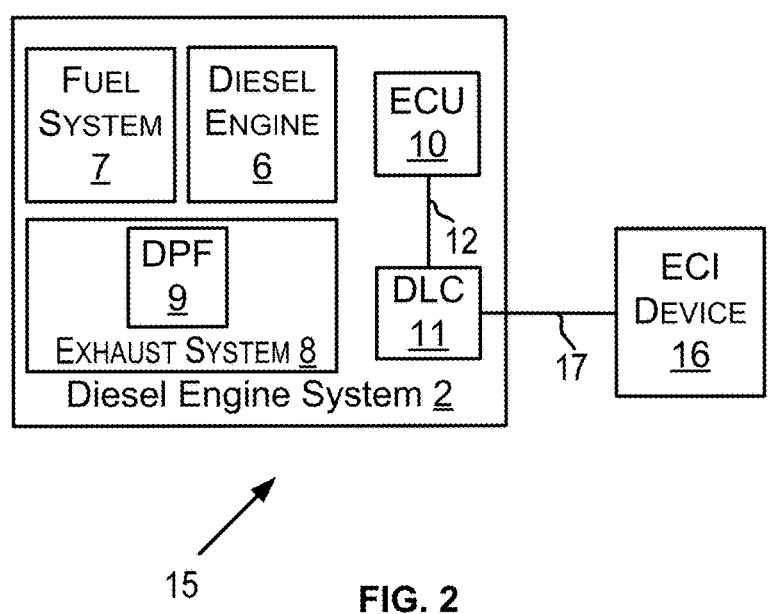

Next, FIG. 2 is a block diagram showing an example system 15. The system 15 comprises the diesel engine system 2 and an ECI device 16. The ECI device 16 can be referred to as a "stand-alone ECI device" as the ECI device 16 is configured to request initiation of regenerating a DPF without communicating with the communication device 5.

The diesel engine system 2 comprises several components and/or systems. FIG. 1 and FIG. 2 show at least some of those component and systems. In particular, the diesel engine system 2 comprises a diesel engine 6, a fuel system 7, an exhaust system 8, an electronic control unit 10, a data link connector 11, and an ECU-and-DLC communication link 12. An ECI device (such as the ECI device 3 or the ECI device 16) is removably connectable to the DLC 11. A line 13 in FIG. 1 represents a DLC-and-ECI-device connection that exists when the DLC 11 and the ECI device 3 are connected to each other. A line 17 in FIG. 2 represents a DLC-and-ECI-device connection that exists when the DLC 11 and the ECI device 16 are connected to each other.

The diesel engine 6 can comprise a cylinder block with one or more cylinders, a crankshaft, a cylinder head, and other engine components. The fuel system 7 can comprise a fuel pump, one or more fuel injectors per cylinder, and other fuel system components. The exhaust system 8 comprises a DPF 9 and can comprise other components such as an exhaust manifold, a catalytic converter, and other exhaust system components.

An ECU, such as the ECU 10, can control operation of the diesel engine system 2 and/or components within the diesel engine system 2. For example, the ECU 10 can control the diesel engine 6, the fuel system 7, and other components of the diesel engine system 2. The ECU 10 can comprise an engine control module (ECM) ECU that controls the diesel engine system 2 without controlling a vehicle transmission. Alternatively, the ECU 10 can comprise a powertrain system ECU that controls the diesel engine system 2 and a vehicle transmission. Other examples of an ECU that control at least a portion of the diesel engine system 2 are also possible.

The ECU 10 can receive inputs (e.g., a sensor input), control output devices (e.g., a solenoid, a fuel pump, a fuel injector), generate a vehicle data message (VDM) (such as a VDM based on a received input or a controlled output and/or in response to a request for a DPF regeneration inhibit parameter), and set a diagnostic trouble code (DTC) as being active or history for a detected fault or failure condition within the diesel engine system 2. The ECU 10 can receive one or more of the communications 81, 85, 89, 94, 96, and 98 shown in FIG. 20 or FIG. 21. The ECU 10 can transmit one or more of the communications 82, 86, 90, 95, 97 and 99 shown in FIG. 20 or FIG. 21.

The ECI device 3 and the communication device 5 can communicate with each other using the communication link 4. The communication link 4 can transport radio signals transmitted by the ECI device 3 and radio signals transmitted by the communication device 5. Those radio signals can comprise and/or be configured like the communications 80, 83, 84, 87, 88, and 91 shown in FIG. 20. The ECI device 3 and/or the ECI device 16 can be referred to a "vehicle communication interface device," especially with respect to embodiments in which the diesel engine system 2 operates within a vehicle.

The radio signals transmitted by the ECI device 3 or by the communication device 5 to communicate with each other can be arranged in accordance with a wireless communication standard or protocol. As an example, the wireless communication standard or protocol can comprise an Institute of Electrical and Electronic Engineers (IEEE) standard, such as an IEEE 802.11 standard (e.g., 802.11a, 802.11b, 802.11g, or 802.11n) for wireless local area networks (wireless LAN) (which is sometimes referred to as a WI-FI® standard), or an IEEE 802.15 standard (e.g., 802.15.1, 802.15.3, 802.15.4 (ZIGBEE®), or 802.15.5) for wireless personal area networks (PANs), or a Bluetooth version 4.1 standard developed by the Bluetooth Special Interest Group (SIG) of Kirkland, Wash. A radio signal transmitted according to the IEEE 802.15 standard can be referred to as a "Bluetooth RF signal."

As another example, the wireless communication standard or protocol can comprise a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

As still yet another example, the wireless communication standard and/or protocol can comprise an International Telecommunication Union (ITU) standard, such as the ITU-T G.9959 standard referred to as the Z-Wave standard, or a 6LoWPAN standard, a Thread networking protocol, an International Organization for Standardization (ISO/International Electrotechnical Commission (IEC) standard such as the ISO/IEC 18000-3 standard for Near Field Communication (NFC), the Sigfox communication standard, the Neul communication standard, and the LoRaWAN communication standard.

The ECI device 3 and the ECU 10 can communicate with each other using the ECU-and-DLC communication link 12, the DLC 11, and the DLC-and-ECI-device connection that exists when the ECI device 3 and the DLC 11 are connected to each other. The ECI device 16 and the ECU 10 can communicate with each other using the ECU-and-DLC communication link 12, the DLC 11, and the DLC-and-ECI-device connection that exists when the ECI device 16 and the DLC 11 are connected to each other.

As discussed above, the diesel engine system 2 can operate within a vehicle. A vehicle is a mobile machine that can be used to transport a person, people, or cargo. A vehicle can be driven and/or otherwise guided along a path (e.g., a paved road or otherwise) on land, in water, or in the air or outer space. A vehicle can be wheeled, tracked, railed, or skied. A vehicle can comprise an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. A vehicle guided along a path can comprise a van (such as a dry or refrigerated van), a tank trailer, a platform trailer, or an automobile carrier. A vehicle can comprise and/or use any appropriate voltage or current source, such as a battery, an alternator, a fuel cell, and the like, providing any appropriate current or voltage, such as about 12 volts, about 42 volts, and the like. A vehicle can comprise systems or engines that use multiple fossil fuels, such as diesel fuel and propane.

In accordance with example embodiments in which the diesel engine system 2 operates within a vehicle, the ECU-and-DLC communication link 12 can comprise and/or be part of a vehicle communication link within the vehicle. The ECU-and-DLC communication link 12, as well as a vehicle communication link, can comprise one or more conductors (e.g., copper wire conductors) or can be wireless. As an example, the ECU-and-DLC communication link 12 can comprise one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-2004 road vehicle (extended data link security) VDP protocol, a controller area network (CAN) VDM protocol (e.g., the SAE J1708_201609 VDM protocol for serial data communications between microcomputer systems in heavy-duty vehicle applications, or the SAE J1939_201308 VDM protocol for serial control and communications heavy duty vehicle network), an ISO 9141-2 K-Line VDM protocol, an ISO 14230-4 KWP2000 K-Line VDM protocol, or some other protocol presently defined for performing communications within a vehicle.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ and/or can end on a date other than December 31st. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define a vehicle identifier for each vehicle built by the vehicle manufacturer. Particular vehicle identifiers identify particular sets of vehicles (e.g., all vehicles of a particular vehicle model for a particular vehicle model year or all vehicles of a particular vehicle model for a particular vehicle model year with a particular set of one or more vehicle options).

As an example, a particular vehicle identifier can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifier can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2003/International/4400/8.7L L6, in which "2003" represents the model year the vehicle was built, "International" represents the name of the vehicle manufacturer Navistar, Inc., Lisle, Ill., United States, "4400" represents a vehicle model built by that manufacturer, and "8.7L L6 4X2" represents a an engine type (i.e., a 6 cylinder internal combustion engine with a displacement of 8.7 liters) within the vehicle. A person skilled in the art will understand that other features in addition to or as an alternative to "engine type" can be used to identify a vehicle using a particular vehicle identifier.

The DLC 11 can comprise one or more connectors. The DLC 11 can also comprise one or more electrical terminals. Each of those one or more terminals can be connected to an electrical circuit. One or more of those electrical circuits can comprise the ECU-and-DLC communication link 12. Another one or more of those electrical circuits can be connected to a battery.

As an example, the DLC 11 can comprise a sixteen terminal position connector that meets an SAE J1962 standard for a diagnostic connector, such as the SAE J1962_201607 standard published on Jul. 12, 2016. The SAE J1962_201607 standard provides for a vehicle connector and a test equipment connector. The sixteen terminal position connector that meets the SAE J1962_201607 can be referred to as a "J1962 vehicle connector" or a "sixteen terminal position vehicle connector." The J1962 vehicle connector is available as part number 12110250 from Delphi Connection Systems of Warren, Ohio, United States. The terminal positions of that J1962 test equipment connector can comprise plug terminals having a part number 1204758 from Delphi Connection Systems. That vehicle connector accepts receptacle terminals (i.e., female terminals) having a part number 12129373, 12129484, 13525297, or 15317769 from Delphi Connection Systems. The J1962 vehicle connector can mate with a J1962 test equipment connector of the ECI device 3 and/or the ECI device 16, if so equipped.

As another example, the DLC 11 can comprise a nine terminal position connector that meets an SAE J1939 standard for an off-board diagnostic connector, such as the SAE J1939-13 standard published on Oct. 5, 2011. This nine terminal position connector can be referred to as a "J1939 vehicle connector" or a "nine terminal position vehicle connector." The J1939 vehicle connector is available as part number AHD10-9-1939P from Amphenol SINE Systems, Clinton Township, Michigan, United States, and is available as Deutsch part number HD10-9-1939P from TE Connectivity Ltd., Schaffhausen, Switzerland. The J1939 vehicle connector can mate with the J1939 test equipment connector of the ECI device 3 and/or the ECI device 16, if so equipped.

II. Example ECI Devices

Figure 3:
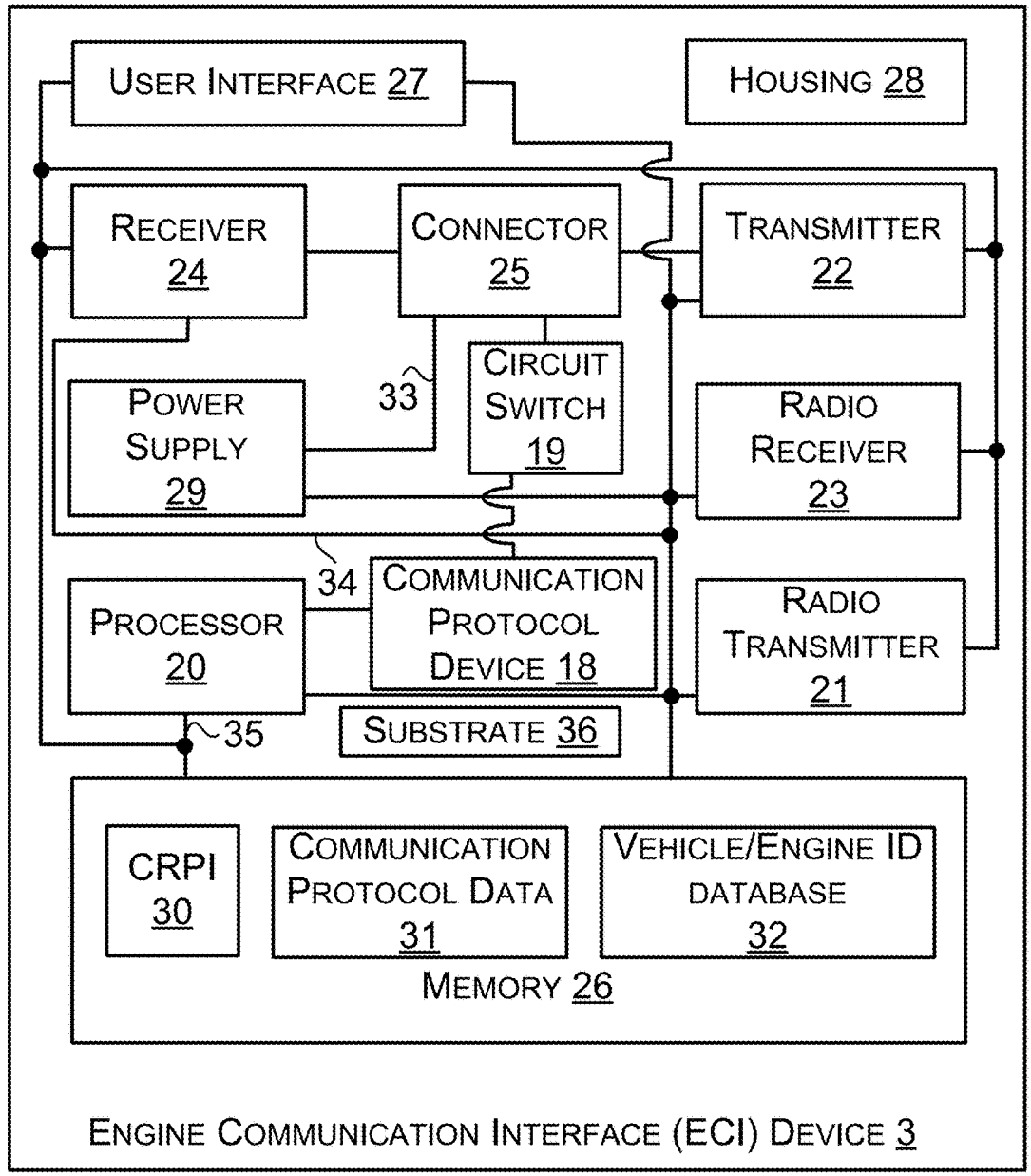
FIG. 3 and FIG. 4 are block diagrams showing example engine communication interface devices.

Next, FIG. 3 is a simplified block diagram of the ECI device 3. As shown in FIG. 3, the ECI device 3 comprises a communication protocol device (CPD) 18, a circuit switch 19, a processor 20, a radio transmitter 21, a transmitter 22, a radio receiver 23, a receiver 24, a connector 25, a memory 26, a user interface 27, a housing 28, and a power supply 29. Two or more of those components can be communicatively coupled or linked together via a system bus, network, or other connection mechanism 35. The ECI device 3 can comprise a substrate 36, such as a printed circuit board (PCB). One or more of the CPD 18, the circuit switch 19, the processor 20, the radio transmitter 21, the transmitter 22, the radio receiver 23, the receiver 24, the connector 25, the memory 26, and the user interface 27 can be mounted on the substrate 36.

Figure 4:
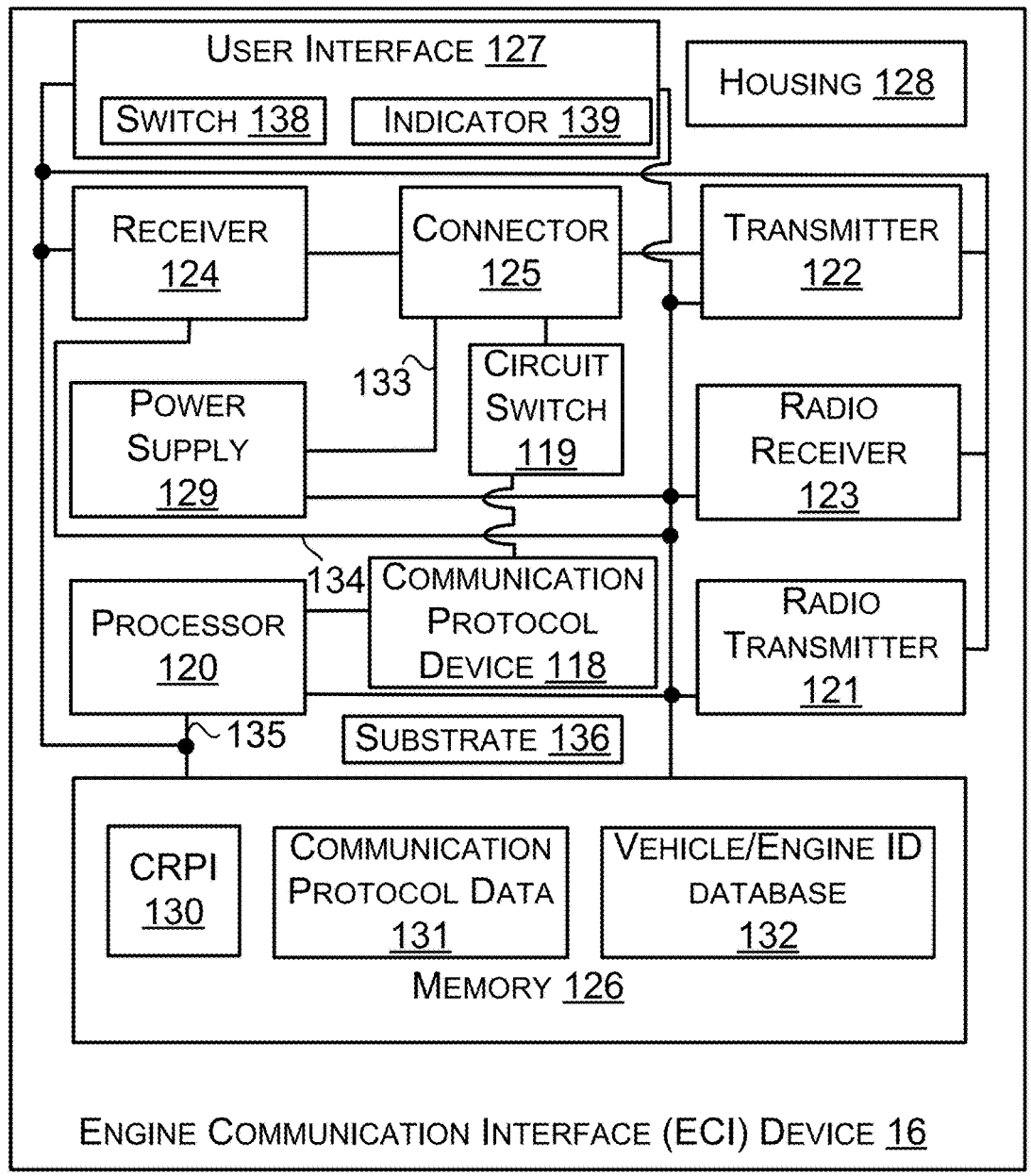

Next, FIG. 4 is a simplified block diagram of the ECI device 16. As shown in FIG. 4, the ECI device 16 comprises a communication protocol device 118, a circuit switch 119, a processor 120, a radio transmitter 121, a transmitter 122, a radio receiver 123, a receiver 124, a connector 125, a memory 126, a user interface 127, a housing 128, and a power supply 129. Two or more of those components can be communicatively coupled or linked together via a system bus, network, or other connection mechanism 135. The ECI device 16 can comprise a substrate 136, such as a PCB. One or more of the CPD 118, the circuit switch 119, the processor 120, the radio transmitter 121, the transmitter 122, the radio receiver 123, the receiver 124, the connector 125, the memory 126, and the user interface 127 can be mounted on the substrate 136.

A processor, such as the processor 20, the processor 120, and any other processor discussed in this description, comprises one or more processors. As an example, each processor can comprise a general purpose processor (e.g., an INTEL® single-core microprocessor or an INTEL® multi-core microprocessor), or a special purpose processor (e.g., a digital signal processor, a graphics processor, or an application specific integrated circuit (ASIC) processor). Each processor can be configured to execute computer-readable program instructions (CRPI). For example, the processors 20 and 120 can execute CRPI 30 and CRPI 130, respectively, stored in the memory 26 and the memory 126, respectively. Each processor can be configured to execute hard-coded functionality in addition to or as an alternative to software-coded functionality (e.g., via CRPI). For example, each processor can comprise circuitry that is wired to perform the hard-coded functionality. The processor 20 can be programmed to perform (or cause to be performed) any function discussed in this description as being performed by the processor 20 and/or by a component connected to the processor 20. The processor 120 can be programmed to perform (or cause to be performed) any function discussed in this description as being performed by the processor 120 and/or by a component connected to the processor 120. A processor can comprise or connect to authentication circuitry and/or an authentication IC, such an authentication IC for communications with APPLE® products (e.g., an IPHONE® communication device). The authentication circuitry and/or IC can provide an appropriate signal to permit communications via a transmitter, such as a wireless transmitter configured to transmit Bluetooth RF signals.

A memory, such as the memory 26, the memory, 126, and any other memory discussed in this description, can include one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as the communication link 4. The communication link can include a digital or analog communication link. The communication link can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory.

The memories 26 and 126 store computer-readable data, such as the CRPI 30 and 130, respectively, communication protocol data 31 and 131, respectively, and a vehicle/engine identifier database 32 and 132, respectively. The processors 20 and 120 can read the communication protocol data 31 and 131, respectively, for various purposes, such as generating messages for the transmitters 22 and 122, respectively, to transmit to the ECU 10 and/or determining the content of messages the receivers 24 and 124, respectively, receives from the ECU 10. The processor 20 can read the communication protocol data 31 to determine a communication protocol to use for communicating with the ECU 10 based on a vehicle identifier the radio receiver 23 receives from the communication device 5. The processors 20 and 120 can read the communication protocol data 31 and 131, respectively, to determine a communication protocol to use for communicating with the ECU 10 based on a communication received via the receiver 24 and 124, respectively. The communication protocol data 31 and 131 can define values and/or ranges for each DPF inhibit parameter, the values and/or ranges indicating whether regeneration to the DPF 9 can be initiated.

A communication protocol device, such as the CPD 18 and the CPD 118, can be configured as a standalone integrated circuit (IC) that is connectable to a processor, such as the processor 20 or 120. In an alternative arrangement, the processor 20 and/or the processor 120 can include circuitry and components to carry out the functions performed by the CPD 18 and the CPD 118, respectively. A CPD can be configured to implement a single VDM protocol or multiple VDM protocols. The multiple VDM protocols can be the same VDM protocol or different protocols. Communications between a standalone CPD and the processor 20 or 120 can occur using a serial peripheral interface (SPI) or another communication link. A CPD can include or connect to a transceiver that is connectable to a vehicle communication link within a vehicle, such as the ECU-and-DLC communication link 12. The transceiver can comprise a standalone transceiver, such as CAN transceiver. In an alternative arrangement, the processor 20 and/or the processor 120 can include a transmitter and receiver to perform the functions of the standalone transceiver.

The CPD 18 can be connected to the connector 25 directly or by the circuit switch 19. Similarly, the CPD 118 can be connected to the connector 125 directly or by the circuit switch 119. In the embodiment in which each of the connectors 25 and 125 comprise two connectors having connector terminals for connecting to the DLC 11, the circuit switches 19 and 119 can be configured with a switch to connect the connector terminals of a first of the two connectors to the CPD 18 and 118, respectively, when the first connector is connected to a first DLC and to put one or more connector terminals (for connecting to the ECU-and-DLC communication link 12) of a second connector of the two connectors into a high impedance state. The circuit switches 19 and 119 can be configured with a switch to connect the connector terminals of the second of the two connectors to the CPD 18 and 118, respectively, when the second connector is connected to a second DLC and to put one or more connector terminals (for connecting to the ECU-and-DLC communication link 12) of the first connector of the two connectors into a high impedance state.

The two connectors of the connector 25 and the two connectors of the connector 125, in the embodiments in which the connectors 25 and 125 comprise two connectors connectable to two different types of vehicle data link connectors, can comprise two connectors connectable to any combination of two different types of vehicle data link connectors. The two different types of vehicle data link connectors can be data link connectors used on vehicles built by the same vehicle manufacturer or different vehicle manufacturers. As an example, the connectors 25 and 125 can comprises connectors for connecting to DLC within vehicles built by any two vehicle manufacturers, such as but not limited to, DAF Trucks N.V. with headquarters in Eindhoven, Netherlands, Scania AB with headquarters in Sodertalje, Sweden, Mercedes-Benz with headquarters in Stuttgart, Germany, MAN Truck & Bus with headquarters in Munich, Germany, Groupe Renault with headquarters in Boulogne-Billancourt, France, Iveco S.p.A. with headquarters in Turin, Italy, or any other vehicle manufacturer in any country that builds a vehicle with a data link connector.

As an example, the two connectors of the connector 25 and the two connectors of the connector 125, in the embodiments in which the connectors 25 and 125 comprise two connectors connectable to two different types of vehicle data link connectors, can comprise the connectors like the connectors on the harnesses with the Jaltest part numbers JDC209M2 (for DAF & Scania vehicles), JDC210MS (for MAN F2000 vehicles), JDC207M2 (for MAN vehicles), JDC206MS (for Iveco vehicles), JDS205M2 (for Groupe Renault vehicles), and JDC203M2 (for Mercedes vehicles).

The vehicle/engine identifier databases 32 and 132 can comprise one or more vehicle identifiers such as one or more YMM. The vehicle/engine identifier databases 32 and 132 can comprise one or more engine identifiers as one or more E terms of the YMME. Each YMM within the vehicle/engine identifier databases 32 and 132 can be associated with one or more engine identifiers. Each engine identifier of the vehicle/engine identifier databases 32 and 132 can be associated with one or more vehicle identifiers.

A radio transmitter, such as the radio transmitter 21 and the radio transmitter 121, can comprise one or more transmitters configured to transmit radio signals carrying data. Each of the transmitters 22 and 122 can comprise one or more transmitters to transmit signals carrying data over an electrical circuit. A radio transmitter of the radio transmitter 21 and the radio transmitter 121 can be contained within the processor 20 and the processor 120, respectively, or located remote from the processor 20 and the processor 120, respectively. A remote radio transmitter of the radio transmitter 21 and the radio transmitter 121 can be coupled to the processor 20 and the processor 120, respectively. Each of the radio transmitter 21 and the radio transmitter 121 can comprise one or more antennas. A transmitter of the transmitters 22 and 122 can be contained within the processors 20 and 120, respectively, or can be located remote from the processors 20 and 120, respectively. A remote transmitter of the transmitters 22 and 122 can be coupled to the processors 20 and 120, respectively, and to the connectors 25 and 125, respectively.

The data transmitted by a transmitter can comprise a destination ID of a system component to which the data is to be transmitted. For example, the data transmitted by the transmitters 22 and 122 can comprise an identifier of the ECU 10. The data transmitted by a transmitter can comprise a source ID of the transmitter and/or of a system component comprising the transmitter. For example, the data transmitted by the transmitters 22 and 122 can comprise an identifier of the ECI devices 3 and 16, respectively.

A radio receiver, such as the radio receiver 23 and the radio receiver 123, can comprise one or more receivers configured to receive radio signals carrying data. Each of the receivers 24 and 124 can comprise one or more receivers to receive signals carrying data over an electrical circuit. A radio receiver of the radio receiver 23 and the radio receiver 123 can be contained within the processor 20 and the processor 120, respectively, or located remote from the processor 20 and the processor 120, respectively. A remote radio receiver of the radio receiver 23 and the radio receiver 123 can be coupled to the processor 20 and the processor 120, respectively. The radio receiver 23 and the radio receiver 123 can each comprise one or more antennas. A receiver of each of the receivers 24 and 124 can be contained within the processors 20 and 120, respectively, or can be located remote from the processors 20 and 120, respectively. A remote receiver of the receivers 24 and 124 can be coupled to the processors 20 and 120, respectively, and to the connectors 25 and 125, respectively.

The data received by a receiver can comprise a destination ID of the receiver and/or a system component comprising the receiver (e.g., an identifier of the ECI device 3 or 16). The data received by a receiver can comprise a source ID indicative of the transmitter and/or of a system component comprising the transmitter that transmitted the data. For example, the data received by the receivers 24 and 124 can comprise a source identifier indicative of the ECU 10.

The radio signals transmitted by the radio transmitter 21 and the radio transmitter 121 and/or the radio signals received by the radio receiver 23 and the radio receiver 123 can be arranged in accordance with one or more wireless communication standards and/or protocols such as an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4 (ZigBee), or 802.15.5) for wireless personal area networks (PANs), a Bluetooth version 4.1 standard developed by the Bluetooth Special Interest Group (SIG) of Kirkland, Wash., or an IEEE 802.11 standard for wireless local area networks (wireless LAN) (which is sometimes referred to as a Wi-Fi standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard. Additional examples of the wireless communication standard and/or protocol include an International Telecommunication Union (ITU) standard, such as the ITU-T G.9959 standard referred to as the Z-Wave standard, or a 6LoWPAN standard, a Thread networking protocol, an International Organization for Standardization (ISO/International Electrotechnical Commission (IEC) standard such as the ISO/IEC 18000-3 standard for Near Field Communication (NFC), the Sigfox communication standard, the Neul communication standard, and the LoRaWAN communication standard.

A transceiver can comprise a transmitter and receiver. In particular, a radio transceiver can comprise the radio transmitter 21 and the radio receiver 23. A radio transceiver can be referred to as an "RF transceiver" and/or a "wireless transceiver." The processor 20 can comprise a transceiver comprising the transmitter 22 and the receiver 24 and/or the radio transceiver discussed above. The processor 120 can comprise a transceiver comprising the transmitter 122 and the receiver 124.

Each of the connectors 25 and 125 comprise one or more connectors. For example, each of the connectors 25 and 125 can comprise a sixteen terminal position connector that meets the SAE J1962_201607 standard. This connector can be referred to as a "J1962 test equipment connector" or a "sixteen terminal position test equipment connector." The J1962 test equipment connector is available as part number 12110252 from Delphi Connection Systems. The terminal positions of that J1962 test equipment connector can comprise plug terminals having a part number 1204758 from Delphi Connection Systems. The J1962 test equipment connector can mate with the sixteen terminal position vehicle connector of the DLC 11, if so equipped.

As another example, each of the connectors 25 and 125 can comprise a nine terminal position connector that meets the SAE J1939_13 standard. This connector can be referred to as a "J1939 test equipment connector" or a "nine terminal position test equipment connector." The J1939 test equipment connector is available as part number AHD16-9-19395 or AHD17-9-1939S from Amphenol SINE Systems, or as HD16-9-19395 or HD17-9-19395 from TE Connectivity Ltd. The J1939 test equipment connector can mate with the J1939 vehicle connector of the DLC 11, if so equipped.

As yet another example, each of the connectors 25 and 125 can comprise both the J1962 test equipment connector and the J1939 test equipment connector. The connectors 25 and 125 can comprise friction connectors that use friction of the connector terminals to hold the connectors firmly together. The connectors 25 and 125 can be removably affixed to the housing 28 and 128, respectively, and/or the substrates 36 and 136, respectively, via one or more fasteners, such as a screw.

An example assignment of electrical circuits for the sixteen terminal positions of the J1962 vehicle connector and J1939 test equipment connector according to the SAE J1962 standard are as follows: 1 (Discretionary), 2 (Bus+ Line of SAE J1850), 3 (Discretionary), 4 (Chassis Ground), 5 (Signal Ground), 6 (Discretionary), 7 (K Line of ISO 9141-2), 8 (Discretionary), 9 (Discretionary), 10 (Bus–Line of SAE J1850), 11 (Discretionary), 12 (Discretionary), 13 (Discretionary), 14 (Discretionary), 15 (L Line of ISO 9141-2), and 16 (Unswitched vehicle battery positive). A different assignment of electrical circuits for the sixteen terminal positions for those two connectors can also be defined.

An example assignment of electrical circuits for the nine terminal positions of the J1939 vehicle connector and the J1939 test equipment connector according to the SAE J1939 standard are as follows: Position A (Ground), Position B (Power), Position C (J1939 Data Link +), Position D (J1939 Data Link −), Position E (J1939 Common or shield), Position F (Data Link +), Position G (Data Link −), Position H (Discretionary) and Position I (Discretionary). A different assignment of electrical circuits for the nine terminal positions for those two connectors can also be defined.

The J1939 test equipment connector used within the ECI devices 3 and 16 can be equipped with fewer terminals then terminal positions. For example, the J1939 test equipment connector can be equipped with terminals at eight of the nine terminal positions by omitting a terminal at Position E designated as a shield for the CAN signals. When a cable is used between a vehicle and a diagnostic device, the cable shield is connected to pin E. The ECI devices 3 and 16 can connect to the DLC 11 without a cable such that pin E is unused.

The power supplies 29 and 129 can be arranged in any of a variety of configurations. As an example, each of the power supplies 29 and 129 can receive an electrical current (e.g., a direct current (DC) electrical current) via an electrical circuit 33 and 133, respectively, connected to a pin within the connectors 25 and 125, respectively, when the connectors 25 and 125 are connected to the DLC 11. As another example, each of the power supplies 29 and 129 can comprise a battery and/or be battery operated. As yet another example, each of the power supplies 29 and 129 can comprise a solar cell and/or be solar operated. The power supplies 29 and 129 can comprise electrical circuits 34 and 134, respectively to distribute electrical current throughout the ECI devices 3 and 16, respectively. As an example, the electrical circuits can comprise a circuit board trace and/or a wire at least partially covered by an insulator. Other examples of the power supplies 29 and 129 are also possible.

The housings 28 and 128 can be arranged in various configurations and can serve a variety of functions. As an example, the housing 28 can provide a cover for other components of the ECI device 3, such as the processor 20, the radio transmitter 21, the transmitter 22, the radio receiver 23, the receiver 24, the memory 26, and the power supply 29. Similarly, the housing 128 can provide a cover for other components of the ECI device 16, such as the processor 120, the transmitter 122, the receiver 124, the memory 126, and the power supply 129. As another example, the housings 28 and 128 can cover part of a test equipment connector, such as part of a J1939 test equipment connector and/or part of a J1962 test equipment connector. The housings 28 and 128 can protect internal components of the ECI devices 3 and 16, respectively, from being damaged if the ECI devices 3 and 16, respectively, are dropped. The housings 28 and 128 can comprise a multi-piece housing. A multi-piece housing can snap together using one or more flexible snap latches to allow multiple pieces of the housings 28 and 128 to be coupled together and to allow the multiple pieces to be uncoupled from each other. Aspects of a multi-piece housing are shown in and described with respect to FIG. 15 to FIG. 18.

Each of the user interfaces 27 and 127 can comprise one or more user interface components for inputting data and/or signals into the processors 20 and 120, respectively. Each of the user interfaces 27 and 127 can comprise one or more user interface components for outputting data and/or signals from the processors 20 and 120, respectively. The user interfaces 27 and 127 can be connected to the power supplies 29 and 129, respectively. The user interface 127 comprises a switch 138 and an indicator 139. The user interface 27 can comprise a switch similar to switch 138 and/or an indicator similar to indicator 139. The communication device 5 can perform functions performed by the switch 138 and the indicator 139. The indicator 139 can comprise a light, such as a light emitting diode (LED). The LED can comprise a multi-color LED. The indicator 139 can be connected to an output of the processor 120. The switch 138 can be connected to an input of the processor 120.

Since an ECI device can be connected to a DLC within a vehicle, an ECI device can be referred to as a vehicle communication interface (VCI) device. In accordance with the example embodiments, a VCI device can comprise two separate connectors that are configured to connected to a DLC, and further comprise a wireless transmitter and wireless receiver. Such a VCI device can be referred to as a dual-connector wireless VCI. Furthermore, for a particular example dual-connector wireless VCI, the two connectors can consist of a J1939 vehicle connector and a J1962 vehicle connector and the dual-connector wireless VCI can comprise a radio transmitter that transmits Bluetooth RF signals and a radio receiver that receives Bluetooth RF signals. In other words, this particular example dual-connector wireless VCI can be configured as a three-port communication device, with two mutually-exclusive wired ports comprising the two connectors, and with one wireless port (i.e., the wireless transmitter and receiver).

Figure 5:
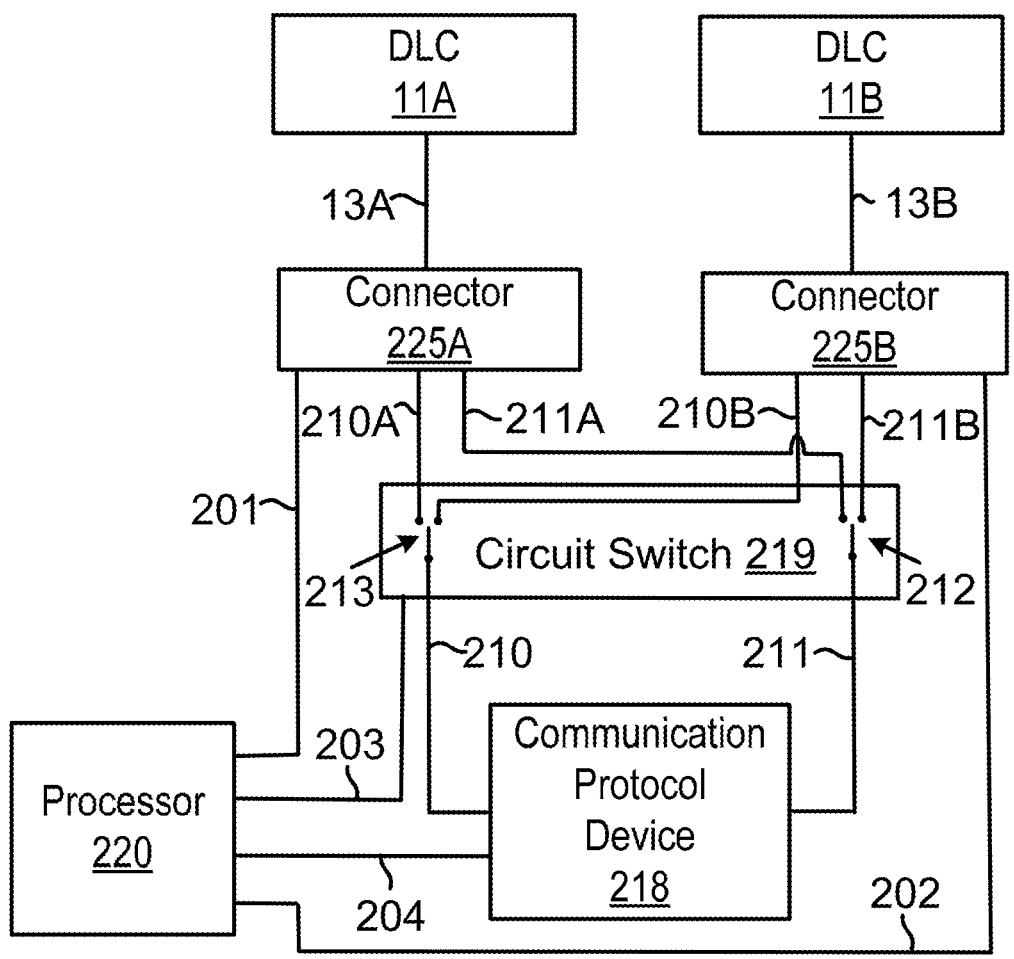
FIG. 5 shows an example embodiment of various components shown in FIG. 1, FIG. 2, FIG. 3 and FIG. 4.

Next, FIG. 5 shows an example embodiment of various components shown in FIG. 1, FIG. 2, FIG. 3 and/or FIG. 4. In particular, FIG. 5 shows a DLC 11A and a DLC 11B that correspond to the DLC 11 shown in FIG. 1 and FIG. 2. As an example, the DLC 11A can comprise a J1939 vehicle connector and the DLC 11B can comprise a J1962 vehicle connector. The DLC 11A and the DLC 11B can be located in the same or different vehicles or outside of all vehicles (e.g., a DLC of a diesel engine operating as an electrical generator in the field).

FIG. 5 also shows a communication protocol device 218, a circuit switch 219, a processor 220, a connector 225A, and a connector 225B. The connector 25 shown in FIG. 3 can comprise and/or be configured like the connectors 225A and 225B. Similarly, the connector 125 shown in FIG. 4 can comprise and/or be configured like the connectors 225A and 225B. The circuit switch 19 shown in FIG. 3 can comprise and/or be configured like the circuit switch 219. The circuit switch 119 shown in FIG. 4 can comprise and/or be configured like the circuit switch 219. The CPD 18 shown in FIG. 3 can comprise and/or be configured like the CPD 218. The CPD 118 shown in FIG. 4 can comprise and/or be configured like the CPD 218. The processor 20 shown in FIG. 3 can comprise and/or be configured like the processor 220. The processor 120 shown in FIG. 4 can comprise and/or be configured like the processor 220.

A line 13A represents a DLC-and-ECI-device connection that exists when the DLC 11A and the connector 225A are connected to each other. A line 13B represents a DLC-and-ECI-device connection that exists when the DLC 11B and the connector 225B are connected to each other. The connectors 225A and 225B can be configured with respect to each other such that only the connector 225A and the DLC 11A or the connector 225B and the DLC 11B can be connected to each other at the same time.

FIG. 5 shows circuitry 201 extending between the connector 225A and the processor 220, circuitry 202 extending between the connector 225B and the processor 220, circuitry 203 extending between the processor 220 and the circuit switch 219, circuitry 204 extending between the processor 220 and the CPD 218, circuitry 210 extending between the CPD 218 and the circuit switch 219, and circuitry 211 extending between the CPD 218 and the circuit switch 219. In FIG. 5, the circuit switch 219 is shown as having two switches (i.e., a switch 212 and a switch 213). The switch 212 is configured to connect the circuitry 211 to circuitry 211A that extends to the connector 225A or to circuitry 211B that extends to the connector 225B. The switch 213 is configured to connect the circuitry 210 to circuitry 210A that extends to the connector 225A or to circuitry 210B that extends to the connector 225B. The processor 220 can output signals onto the circuitry 204 for providing to the CPD 218, which can convert the signals provided by the circuitry 204 into communications according to a particular VDM protocol.

The circuit switch 219 can comprise discrete circuit components and/or can comprise an ASIC. A switch (e.g., the switch 212 and/or the switch 213) within the circuit switch 219 can comprise one or more multiplexers and/or transistors to switch communications received via the circuitry 210 and 211 to one of connectors 225A and 225 when that connector is connected to the DLC 11A and the DLC 11B, respectively. The circuitry 203 can carry signals to control the one or more multiplexers and/or transistors or some other switching component within the circuit switch 219. Other examples of one or more switches in the circuit switch are possible.

The processor 220 can output the control signal based on signals detected on or via the circuitry 201 and 202. For example, the connection 13A can comprise a battery voltage and electrical ground connection. The processor 220 can detect the connector 225A is connected to the DLC 11A by determining battery voltage is present on the circuitry 201, and can detect the connector 225A is disconnected from the DLC 11A by determining the battery voltage is no longer present on the circuitry 201. Similarly, the connection 13B can comprise a battery voltage and electrical ground connection. The processor 220 can detect the connector 225B is connected to the DLC 11B by determining battery voltage is present on the circuitry 202, and can detect the connector 225B is disconnected from the DLC 11B by determining the battery voltage is no longer present on the circuitry 202.

As an example, the circuitry 210 can carry a high and low signal of an SAE J1939 CAN protocol communication output by the CPD 218, and the circuitry 211 can carry a high and low signal of an SAE J1708 CAN protocol communication output by the CPD 218. Other examples of the communications output by the CPD 218 onto the circuitry 210 and/or 211 are also possible. Furthermore, the circuitry switch 219 can comprise one or more additional switches for switching other communications output by the CPD 218 for providing to the connectors 225A and 225B. Furthermore still, the circuit switch 219 could be configured without switch 212 or switch 213 if the CPD outputs communications for a single communication protocol.

Next, FIG. 6, FIG. 7, FIG. 8, FIG. 9, FIG. 10, and FIG. 11 (i.e., FIG. 6 to FIG. 11) show various views of an example embodiment of an ECI device 79. Each instance of the ECI device 79 can comprise the components of the ECI device 3 or the ECI device 16. The ECI device 3 and the ECI device 16 can be arranged like the ECI device 79 shown in FIG. 6 to FIG. 11 or in a different configuration.

FIG. 6 to FIG. 11 show various views of an example embodiment of a housing 228. The housing 28 of the ECI device 3 and the housing 128 of the ECI device 16 can be arranged like the housing 228 shown in FIG. 6 to FIG. 11, a housing 328 shown in FIG. 15 to FIG. 18, a housing 428 shown in FIG. 27 and FIG. 28, or in a different configuration.

Figure 12:
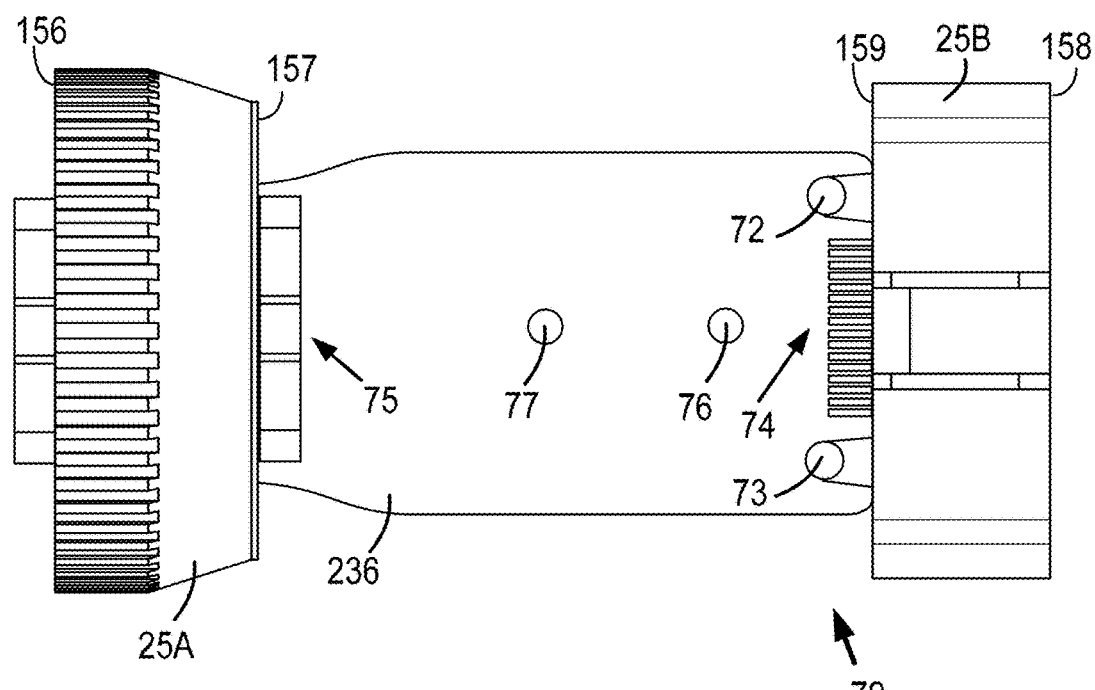
FIG. 12, FIG. 13, and FIG. 14 show example aspects of the engine communication interface devices.

The ECI device 79 comprises a connector 25A and a connector 25B. Connector 25A comprises a J1939 test equipment connector with 9 terminal positions. Connector 25B comprises a J1962 test equipment connector with 16 terminal positions. The connector 25 of the ECI device 3 can comprise connector 25A and/or connector 25B. The connector 125 of the ECI device 16 can comprise connector 25A and/or connector 25B. FIG. 12 shows further aspects of the ECI device 79 with the housing 128 removed from the ECI device 79. For example, FIG. 12 shows the connector 25A comprises an external edge 156 and an internal edge 157 and the connector 25B comprises an external edge 158 and an internal edge 159. With the housing 128 connected to the connectors 25A and 25B, the internal edges 157 and 159 or at least portions of them are not be visible when looking at the ECI device 79.

The connector 25A can be made from a variety of materials. As an example, the connector 25A can be made from a glass-filled nylon material. More particularly, the connector 25A can, for example, be made from PA66+15% GF (i.e., Polyamide 6, 6+15% glass fiber). Other examples of a material from which the connector 25A can be made are also possible.

Similarly, the connector 25B can be made from a variety of materials. As an example, the connector 25B can be made from acrylonitrile butadiene styrene (ABS). More particularly, the connector 25B can, for example, be made from a PA-763 grade of ABS available from the Chi Mei Corporation, Tainan City, Taiwan. Other examples of a material from which the connector 25B can be made are also possible.

Similarly, the housings 28, 128, 228, 328, and/or 428 can be made from a variety of materials. As an example, those housing(s) can be made from ABS. More particularly, those housing(s) can, for example, be made from a PA-765A grade of ABS available from the Chi Mei Corporation, Tainan City, Taiwan. Other examples of a material from which the housing(s) 28, 128, 228, 328, and/or 428 can be made are also possible.

The housing 228 can comprise a molded housing comprising wall segments 63, 64, 65, and 66 that are joined together by rounded corner segments 140, 141, 142, and 143. The housing 228 can comprise two housing halves, similar to the housing halves of the housing 328. A wall segment can comprise a first wall segment half of a first housing half and a second wall segment of a second housing half. Two wall segment halves can be joined together to form a wall segment.

The wall segments 63, 64, 65, and 66 can be joined to the connector 25B via rounded corner segments 144, 145, 146, and 147. The wall segments 63, 64, 65, and 66 can be joined to the connector 25A via wall segments 148, 149, 150, and 151.

The wall segments 148, 149, 150, and 151 can comprise curved wall segments. The walls segments 148 and 151 can be curved outward relative to the wall segments 64 and 66 and an interior portion of the wall segments 64 and 65 such that wall segments 148 and 151 form a joint at or beyond an outermost point of the flanges 160, 161, 162, and 163. The wall segments 149 and 150 can be curved inward relative to the wall segments 63 and 65 and an interior portion of the wall segments 63 and 65 such that the wall segments 149 and 150 form a joint at or beyond an outermost point of the flanges 160, 161, 162, and 163 similar to the joint formed by the wall segments 148 and 151.

The wall segments 148 and 151 can comprise recess 152 and recess 153 respectively. Each recess can be configured to provide a recessed area of the housing 228. The recesses 152 and 153 provide area at which fingers can be positioned to provide a better grip for pushing an ECI device onto the DLC 11. As an example, the recesses 152 and 153 can be 0.125 inches deep and 0.25 inches in diameter. Other example dimensions of the recesses 152 and 153 are also possible.

Figure 6:
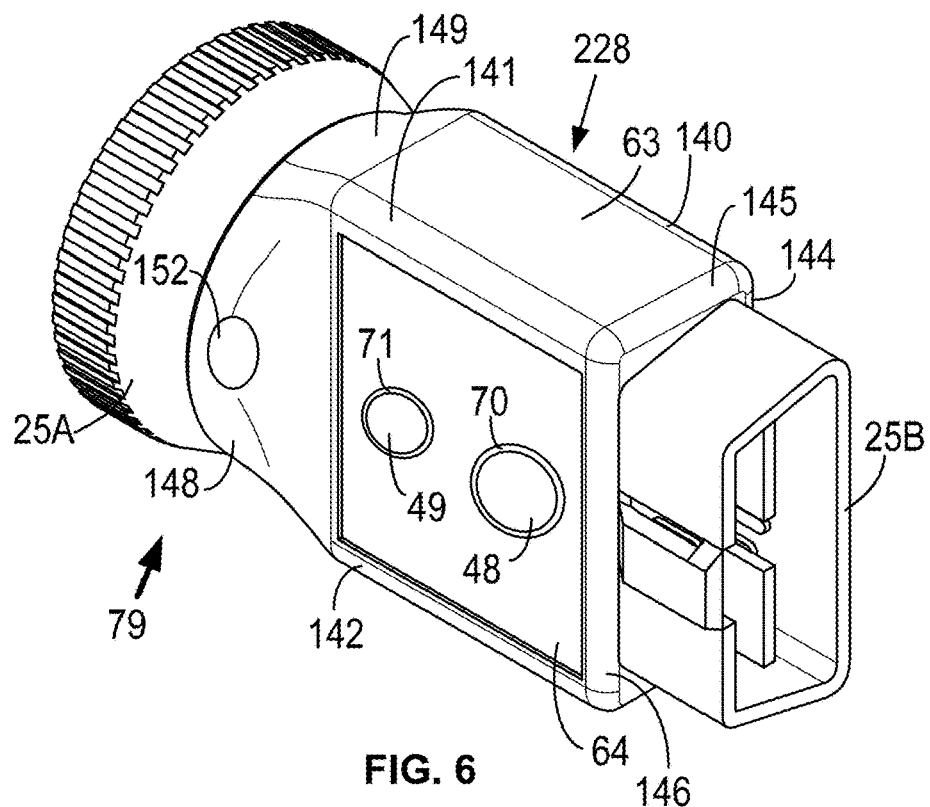
FIG. 6, FIG. 7, FIG. 8, FIG. 9, FIG. 10, and FIG. 11 show various views of an example engine communication interface device.
Figure 7:
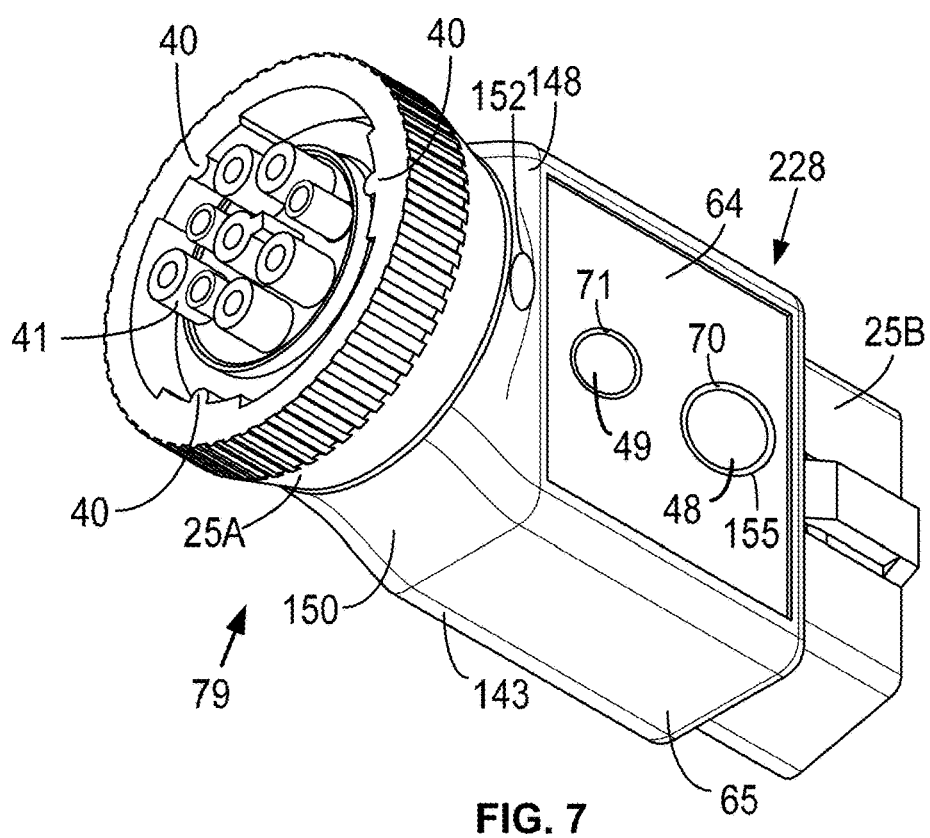
Figure 10:
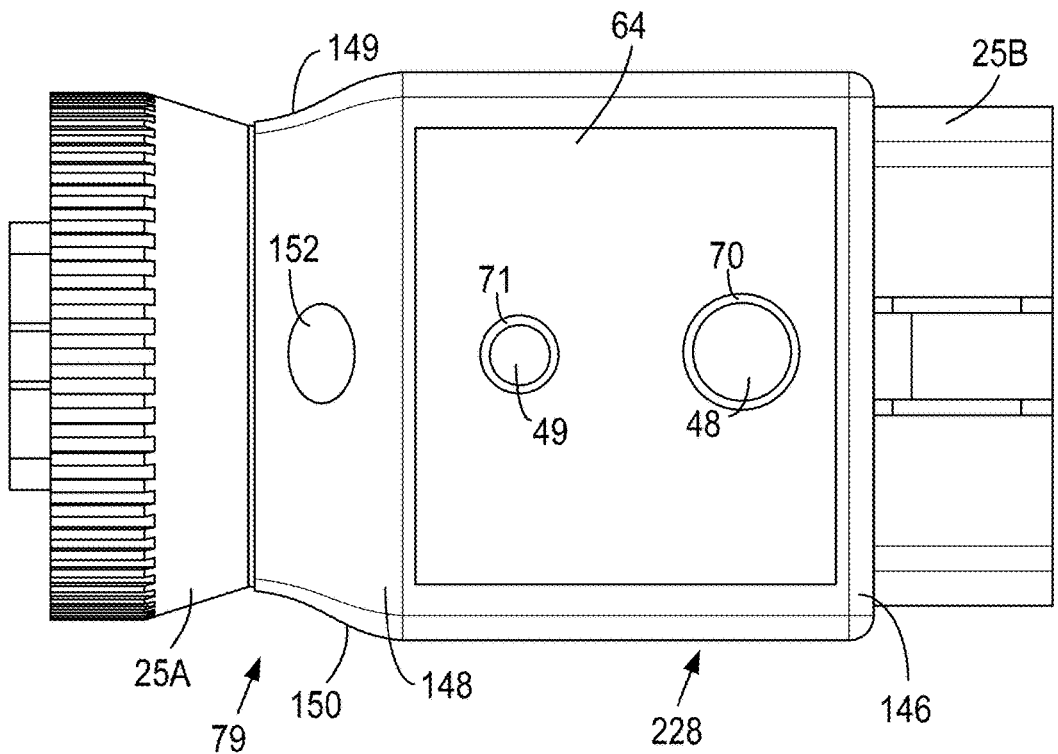
Figure 11:
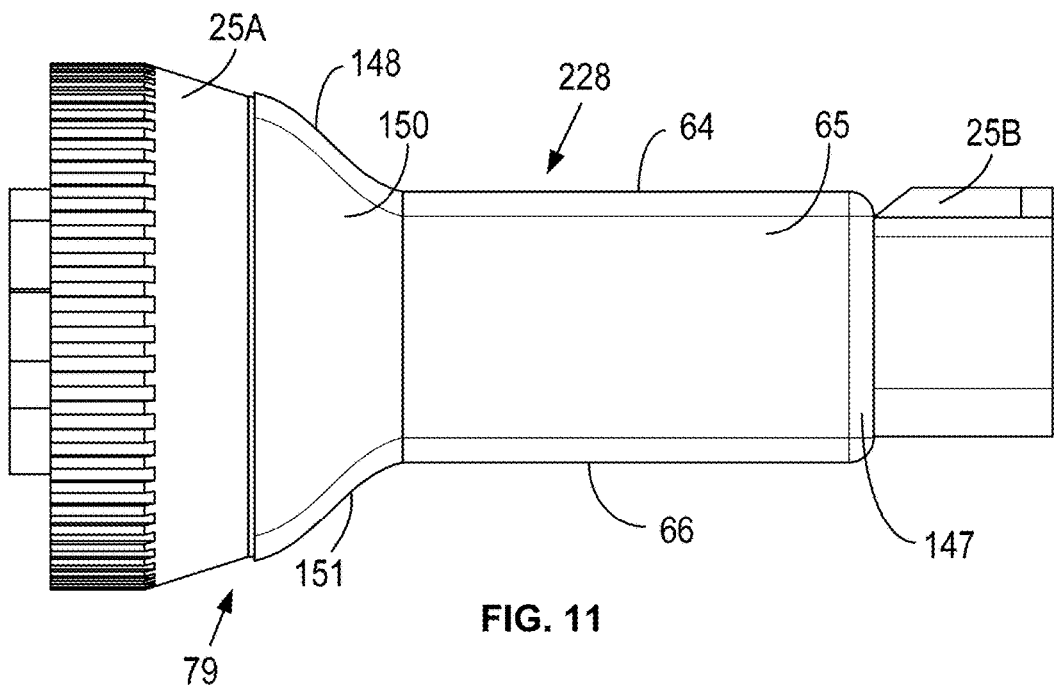

FIG. 6, FIG. 7, and FIG. 10 depict a button 48 (e.g., a push button), a light port cover 49, a button support 70, and a light port 71. The button 48 can be a component of a user interface, such as the user interface 27 and/or 127. The button 48 can be connected to a switch 76 (shown in FIG. 12) mounted on a substrate 236. The button support 70 and the light port 71 can be part of the housing 228. The button support 70 can extend at least between the button 48 and the substrate 236. The button 48 can be located within the button support 70. The light port 71 can extend at least between the light port cover 49 and a light 77 (e.g., a diode) mounted on the substrate 236.

The wall segment 64 comprises an opening 155 through which the button 48 is accessible. The opening surrounding a button in an ECI device can be arranged in various configurations, such the opening 155, which is circular, an elliptical opening 167 shown in FIG. 27, or in another configuration.

Figure 8:
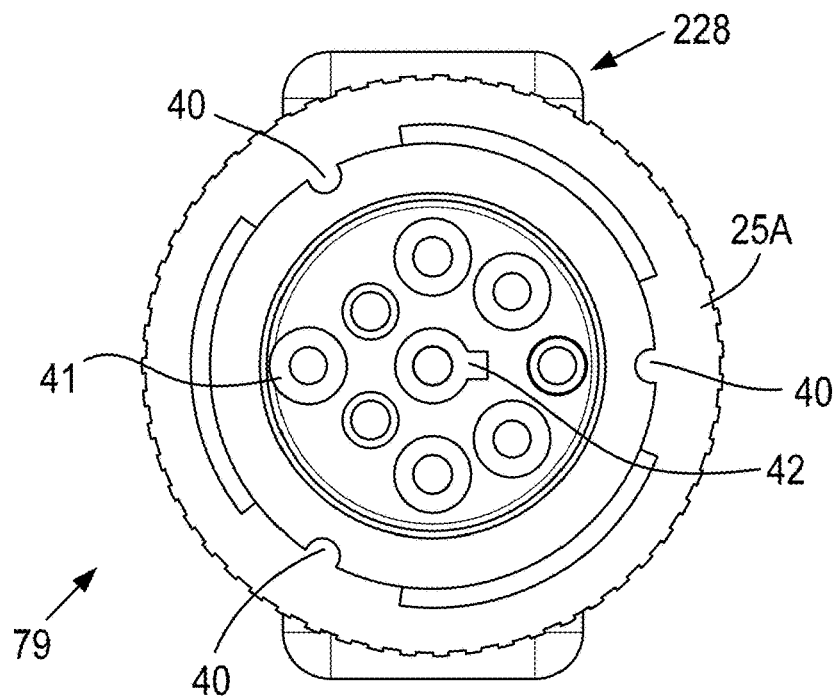

FIG. 7 and FIG. 8 depict details of the connector 25A. In particular, the connector 25A is shown having three connector keys 40. The connector keys 40 can correspond to connector key slots in a J1939 vehicle connector of the DLC 11. A terminal guide 41 is shown in FIG. 7 along with eight other terminal guides. Each of those terminal guides can provide protection of terminals within those terminal guides from short-circuiting with other terminals within the connector 25A and/or with terminals in a mating vehicle connector of the DLC 11. FIG. 8 shows a keyed terminal guide 42.

Figure 9:
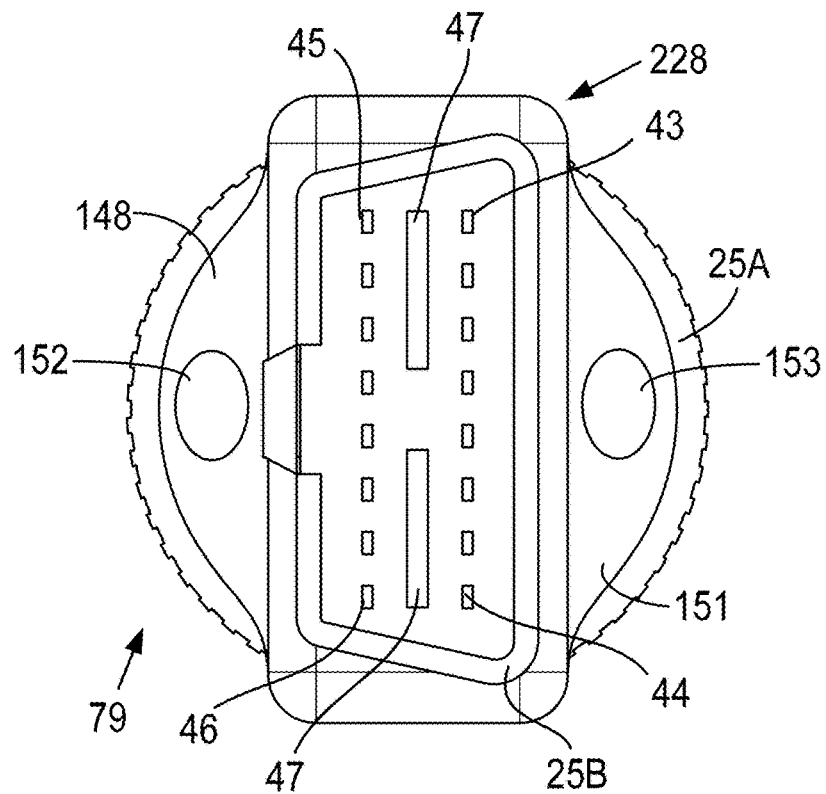

Next, FIG. 9 depicts details of the connector 25B. In particular, the connector 25B is showing having sixteen terminal plugs (i.e., blades). Each of those terminal plugs is at a respective terminal position. The terminal positions can be numbered one to sixteen with terminal position one 43 to terminal position eight 44 being in a first row of terminal positions, and terminal position nine 45 to terminal position sixteen 46 being in a second row of terminal positions. The connector 25B comprises a J1962 test equipment connector. The connector 25B comprises connector keys 47. The connector keys 47 can correspond to a connector key slot in a J1962 vehicle connector of the DLC 11.

FIG. 12 also shows the substrate 236 positioned between the connector 25A and the connector 25B, the switch 76, and the light 77. FIG. 12 also shows terminals 74 of the connector 25B and terminals 75 of the connector 25A contacting the substrate 236. The connector 25B can include fastener holes 72 and 73 for positioning fasteners to removably attach the connector 25B to the substrate 236. The substrate 236 can comprise a substrate portion that extends ninety degrees from a portion of the substrate 236 shown in FIG. 12. The substrate portion extending at ninety degrees can be positioned within the connector 25A. One or more fasteners can be used to removably attach the connector 25A to the substrate portion extending at ninety degrees from the portion of the substrate 236 shown in FIG. 12. The connector 25A can comprise threaded fastener holes to receive the fasteners.

The light 77 can comprise a multi-color LED. A processor, such as the processor 20 and/or 120, can output electrical signals to the anodes of the multi-color LED to control which color of light is output by the multi-color LED. The processor can output electrical signals to the light 77 such that the light is on solid or the light flashes (e.g., turns on and off at a frequency of one hertz). As an example, the processor can output electrical signals to cause the multi-color LED to output solid red light in response to the processor determining an error has occurred during regeneration of the DPF. As another example, the processor can output electrical signals to cause the multi-color LED to output flashing green light to indicate regeneration of the DPF has been initiated and/or is in process. As yet another example, the processor can output electrical signals to cause the multi-color LED to output sold green light to indicate regeneration of the DPF has been completed.

The switch 76 can be activated in response to the button 48 being pressed. A processor, such as the processor 20 and/or 120, can determine the switch 76 has been activated. The processors 20 and 120 can execute the CRPI 30 and 130, respectively, to determine that a request to initiate regeneration of the DPF 9 has been entered via the user interfaces 27 and 127, respectively.

Figure 13:
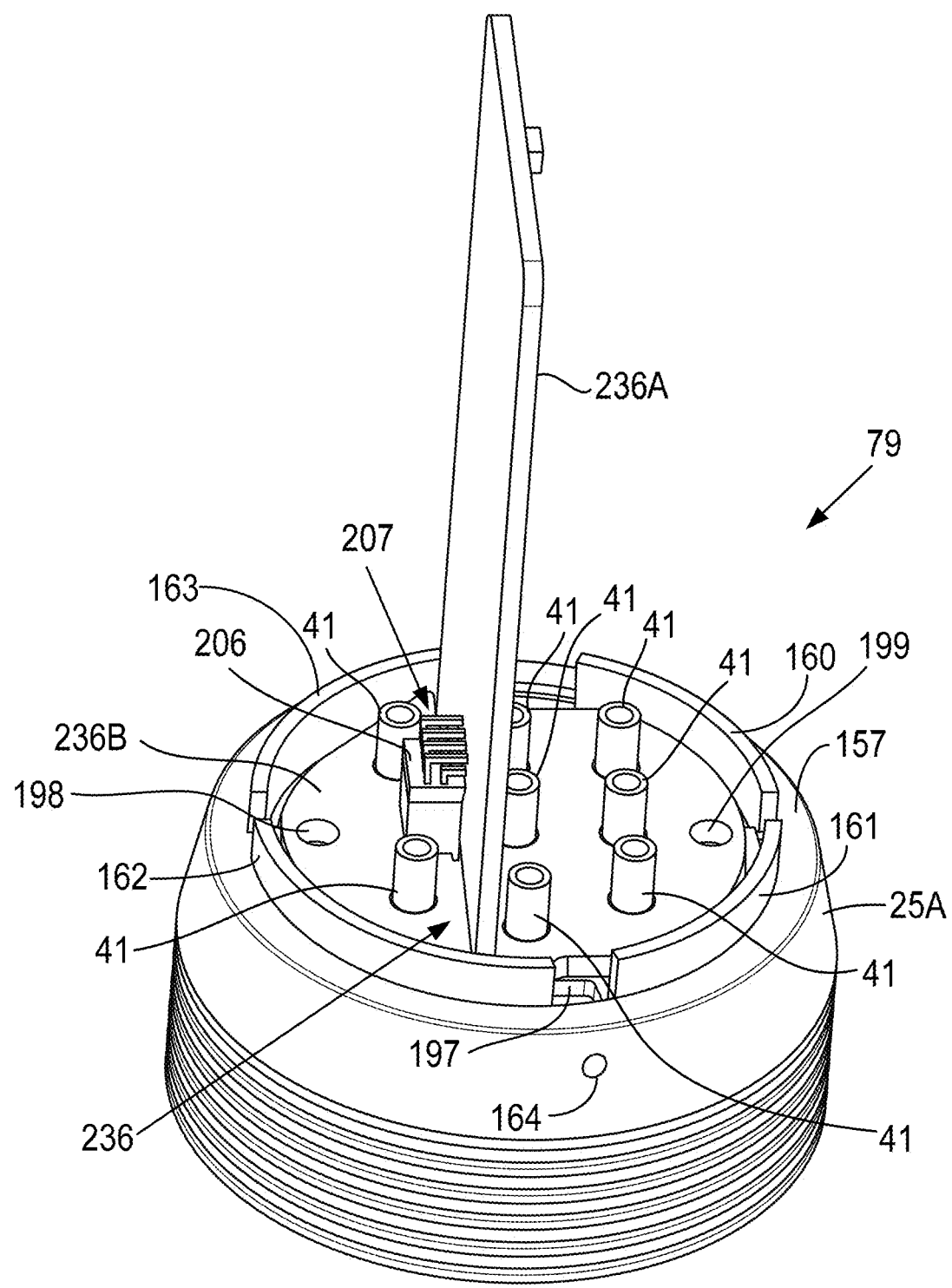

Next, FIG. 13 shows further aspects of the ECI device 79. The substrate 236 comprises a right angle substrate including a main substrate 236A and a connector substrate 236B. The main substrate 236A can comprise a main PCB and the connector substrate 236B can comprise a connector PCB. FIG. 13 shows the ECI device 79 for an embodiment in which the connector 25A includes eight of the nine terminal positions (with terminal guides 41) of the J1939 connector and a connector 206 instead of a terminal guide at terminal position E. Electrical connections between the substrates 236A and 236B can occur via connector pins 207 of the connector 206. The connector 206 can comprise a board-to-board connector. The connector substrate 236B comprises through-holes 198 and 199. The through-holes 198 and 199 can line up with through-holes in the connector 25A to receive fasteners (e.g., screws) positioned first into the through-holes of the connector 25A, then into the through-holes 198 and 199, and then into metallic inserts of housing halves that form a housing that can protect the substrate 236.

FIG. 13 shows additional aspects of the internal edge 157 of the connector 25A. The internal edge 157 abuts and/or forms a joint area with edges of housing halves of ECI device housing. The connector 25A comprises flanges 160, 161, 162, and 163. Those flanges can be used to guide the connector 25A into a housing, such as the housing 28, 128, 228, 328, or 428, for connecting the connector 25A to the housing. The flanges 161 and 162 are separated from each other by an alignment tab slot 197. The flanges 160 and 163 can be separated from each other by another alignment tab slot on the opposite side of the connector 25A. Alignment tabs on the ECI device connectors can be positioned within the alignment tab slot 197 and the alignment tab slot separating flanges 160 and 163. The connector 25A can comprise an alignment tab release hole 164 through which a device can be inserted to cause the alignment tab positioned within the alignment tab slot 197 to be released. Another alignment table release hole can be located on the other side of the connector 25A opposite the alignment tab release hole 164.

Figure 14:
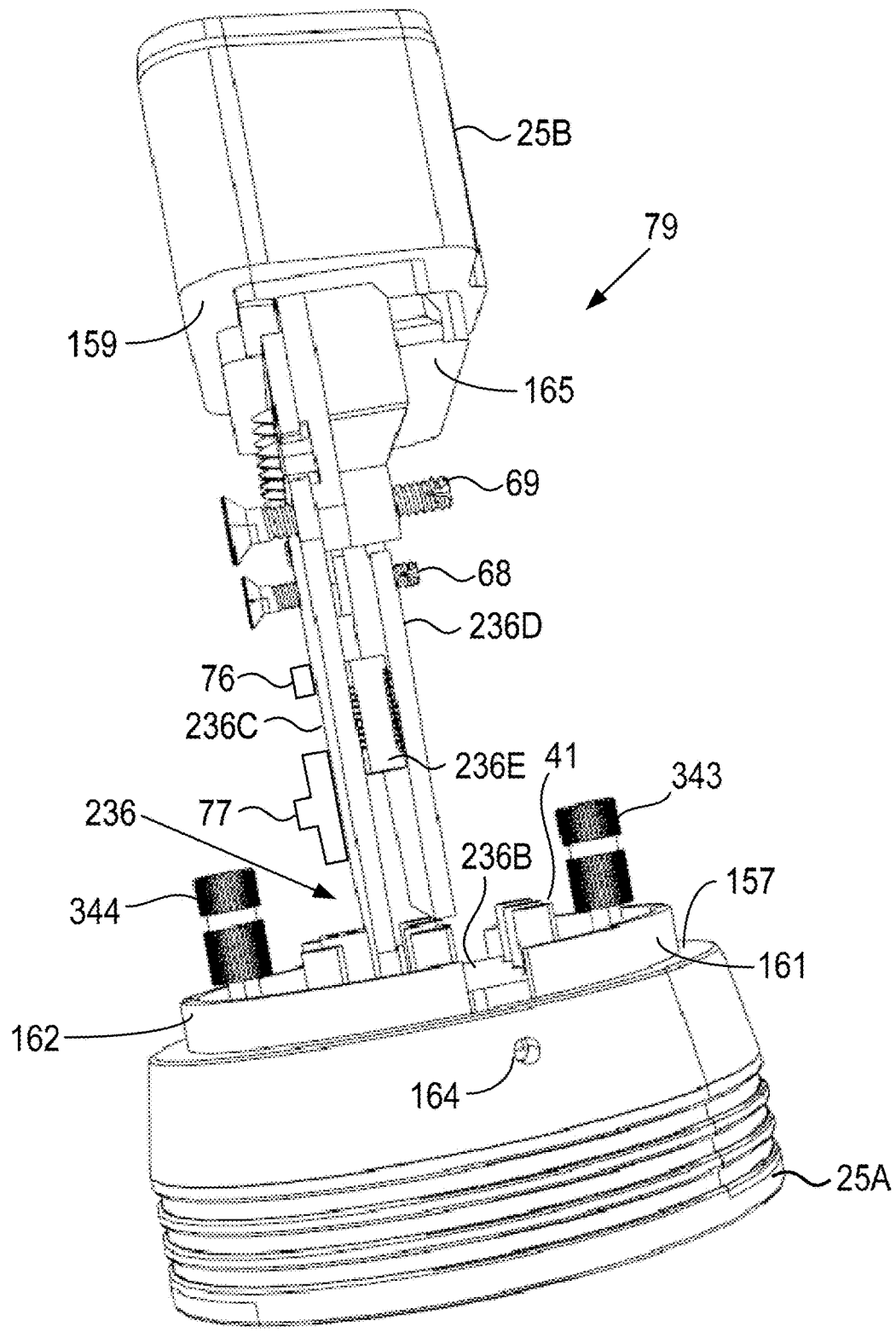

Next, FIG. 14 shows further aspects of the ECI device 79 in which the substrate 236 comprises the connector substrate 236B, a main substrate 236C, a secondary main substrate 236D, and a board-to-board connector 236E. Each of the main substrates 236C and 236D can comprise a PCB. The main substrate 236C of the ECI device 79 shown in FIG. 14 can be shorter than the main substrate 236A shown in FIG. 13. The main substrate 236C and the secondary main substrate 236D can support the components supported on the main substrate 236A such that a length of the ECI device 79 shown in FIG. 14 is shorter than a length of the ECI device shown in FIG. 13. As shown in FIG. 14, the main substrate 236B can support the switch 76 and the light 77. Other components that can be supported by the main substrate 236B or the secondary main substrate 236C include the components of the ECI device 3 shown in FIG. 3 or the components of the ECI device 16 shown in FIG. 4. The board-to-board connector 236E provides an interface between the main substrate 236C and the secondary main substrate 236D. The ECI device 79 comprises fasteners 68 and 69 to fasten the substrate 236 to the connector 25B. The ECI device 79 comprises terminal guides 41, the connector 25A, and metallic inserts 343 and 344 configured to receive fasteners to retain the substrate 236 to the connector 25A. A person skilled in the art will understand that plastic inserts could be used in place of the metallic inserts 343 and 344. FIG. 14 also shows the internal edge 157, the flange 161, the flange 162, and the alignment tab release hole 164 of the connector 25A, and a connector wall 159 and connector flange 165 of the connector 25B. The housings 28, 128, 228, 328, and 428 can abut the connector wall 159 and wrap around the connector flange 165.

Figure 15:
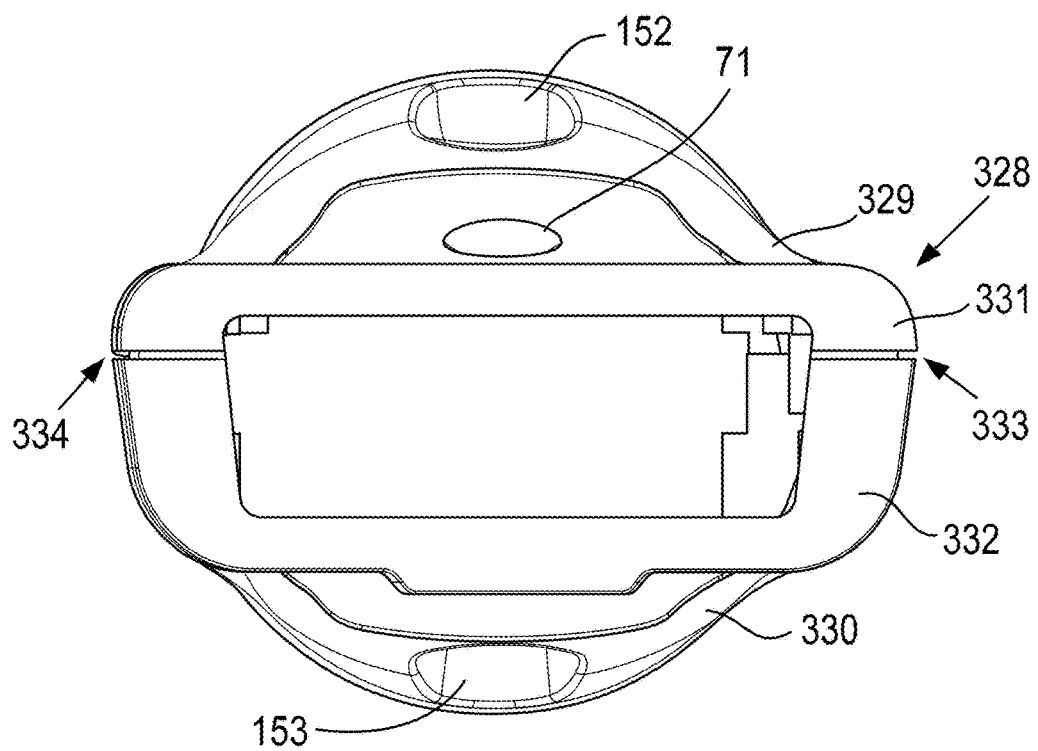
FIG. 15, FIG. 16, FIG. 17, and FIG. 18 show an example housing for an engine communication interface device.

Next, FIG. 15 shows the example housing 328, which can comprise a housing half 329 and a housing half 330. Similarly, the housings 28, 128, and 228 can comprise two housing halves. The housing 328 has a different shape than the housing 228 so as to show various housings that can be part of an ECI device. Although the housings 228, 328, and 428 have different shapes, the housings 228 and 428 can comprise the same aspects described herein as being a part of the housing 328 unless explicitly stated otherwise.

The housing halves 329 and 330 can be connected together. The connection can be maintained by snaps and further maintained by other fasteners, such as screw. The housing halves 329 and 330 can be configured for being separable after connection of the two halves so as to be able to service a component within the housing 328 should such a need arise. FIG. 15 shows joint lines 333 and 334 where the housing halves 329 and 330 connect together. The housing half 329 comprises a connector mating surface 331 and the housing half 330 comprises a connector mating surface 332. The mating surfaces 331 and 332 are configured to abut and/or form a joint area with the connector wall 159 of the connector 25B. FIG. 15 show additional aspects of the recess 152, the recess 153, and the light port 171.

Figure 16:
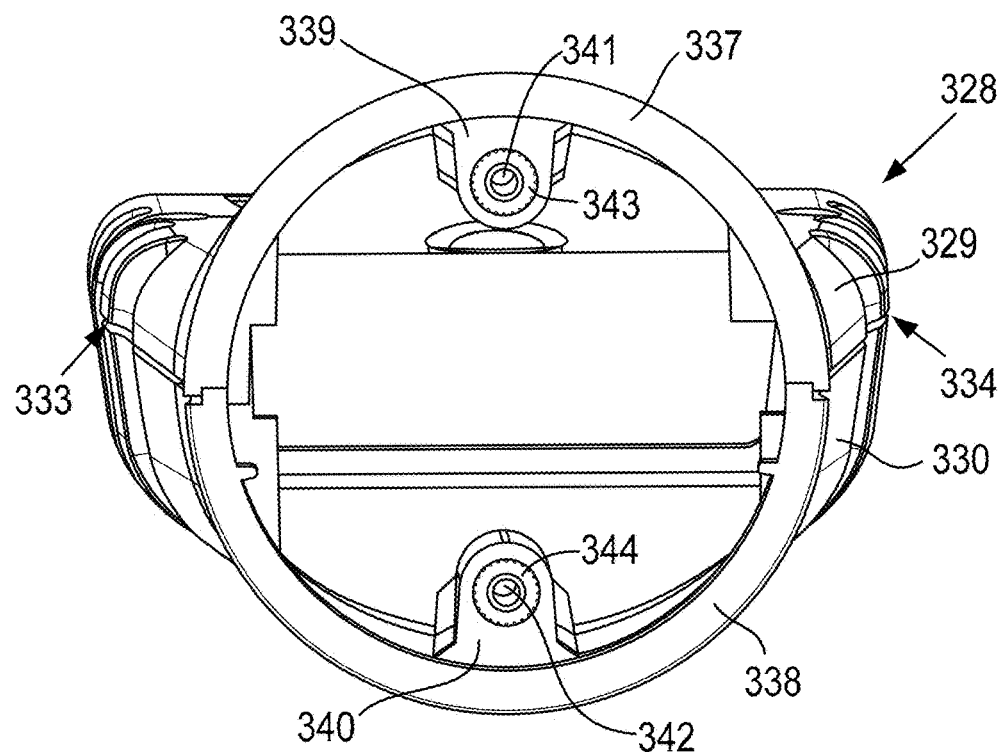

Next, FIG. 16 shows the example housing 328 rotated one hundred eighty degrees with respect to how the housing 328 is shown in FIG. 15. FIG. 16 shows the housing halves 329 and 330 and the joint lines 333 and 334. The housing half 329 has an edge 337 and the housing half 330 has an edge 338. The edges 337 and 338 abut and/or form a joint area with the internal edge 157 when the connector 25A is connected to the housing 328. The housing half 329 comprises a boss 339 extending inwardly transversely and longitudinally from the edge 337. The housing half 330 comprises a boss 340 extending inwardly transversely and longitudinally from the edge 338. The boss 339 includes a mounting hole 341 and the boss 340 includes a mounting hole 342. The mounting holes 341 and 342 can reside within metallic inserts (e.g., brass inserts) 343 and 344 positioned within the bosses 339 and 340, respectively. Each metallic insert can be threaded to retain a fastener inserted into the connector 25A, through the through-holes 198 and 199 and into the metallic inserts 343 and 344.

Figure 17:
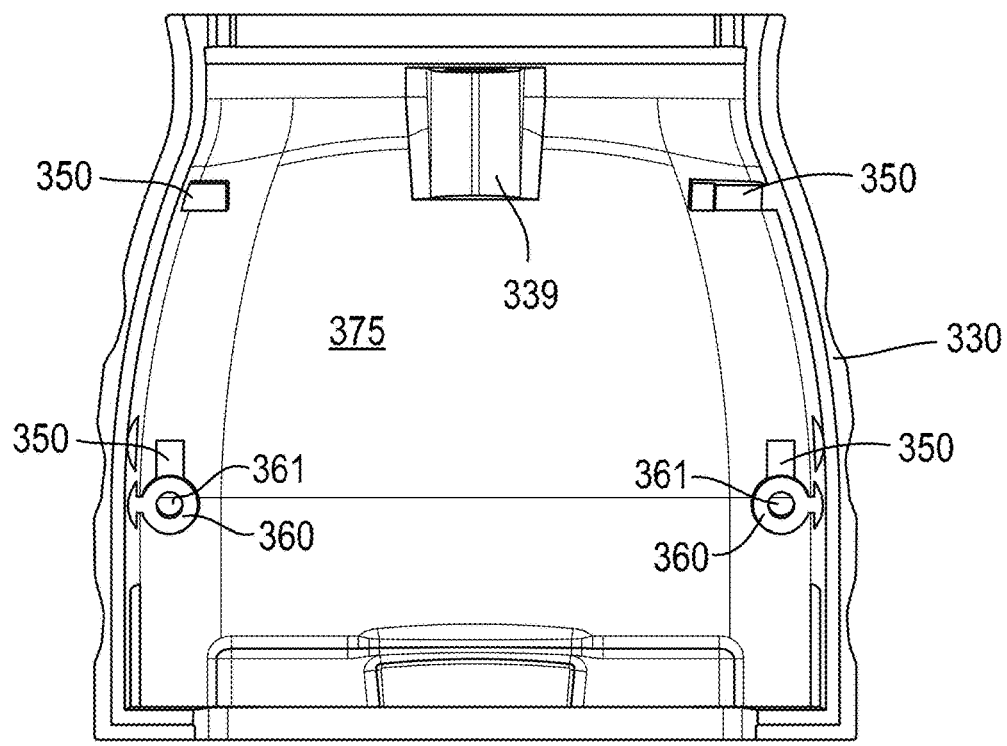
Figure 18:
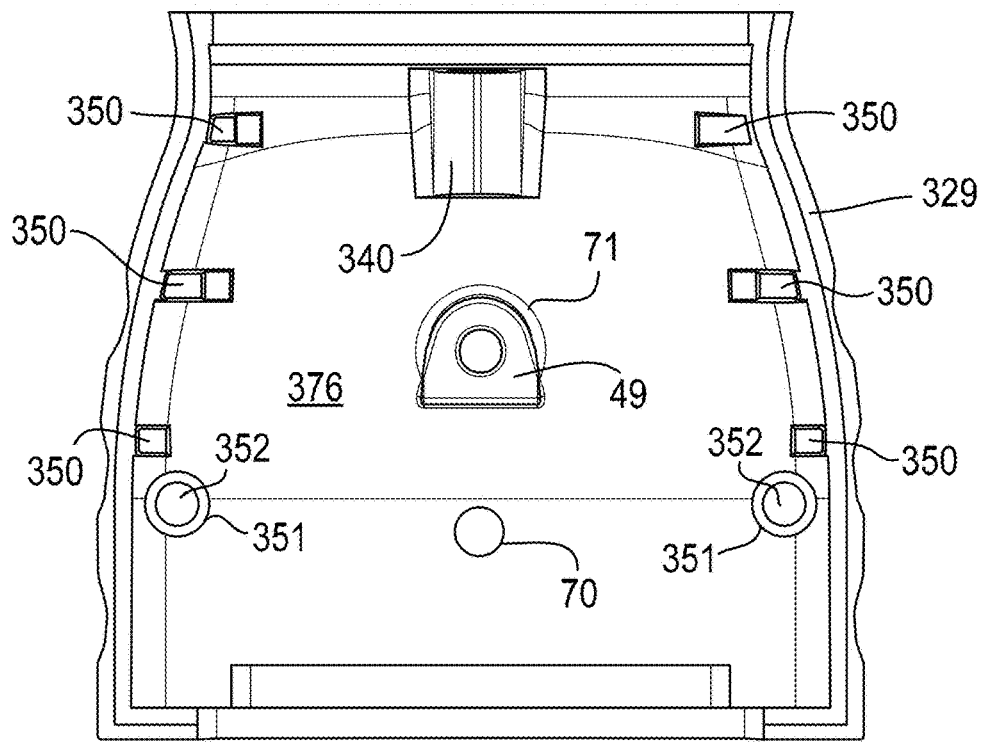

Next, FIG. 17 shows an interior surface 375 of the connector half 330, and FIG. 18 shows an interior surface 376 of the connector half 329. As shown in these figures, an interior portion of the connector half 330 comprises snap components 350, which in combination with a counterpart snap component 350 on the connector half 329 form a snap joint. The snap connectors 350 on the connector halves 329 and 330 can comprise, for example, a protruding part such as a lug, hook, stud or bead, or a depression or undercut snap component to catch the protruding part to form a snap joint. The connector half 330 comprises bosses 360 with fastener holes 361. The connector half 329 comprises bosses 351 having through-holes 352. The holes 361 can be threaded and/or can be through-holes. Fasteners passing through the through-holes 352 from an exterior surface of the connector half 329 opposite the interior surface 376 can be secured within the bosses 351 to further retain the connector halves 329 and 330 together. FIG. 17 shows further aspects of the boss 339 and FIG. 18 shows further aspects of the boss 340, button support 70, and the light port 71.

Figure 27:
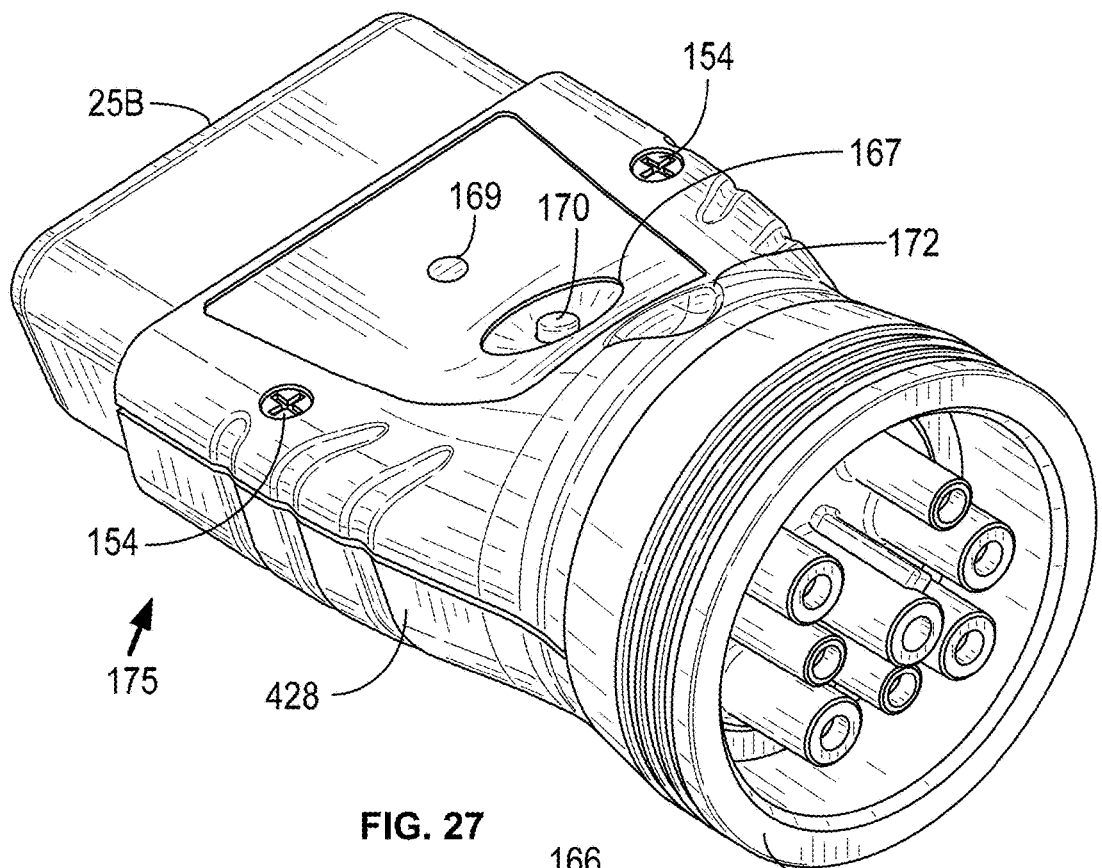
FIG. 27 and FIG. 28 show additional views of an example engine communication interface device.
Figure 28:
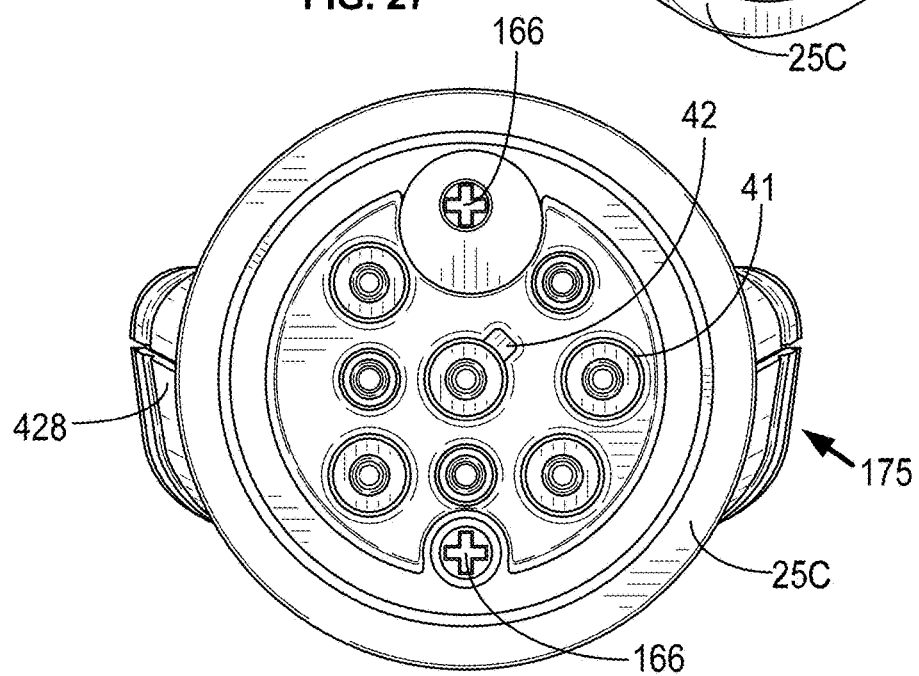

Next, FIG. 27 and FIG. 28 show an ECI device 175 comprising the connector 25B and 25C. The connector 25C is a press-fit connector without the connector keys 40 used with the connector 25A. Similar to connector 25A, the connector 25C comprises terminal guides 40 without keys and a keyed terminal guide 42. The connector 25C includes openings (e.g., through-holes) to receive fasteners 166 that can be positioned in the through-holes 198 and 199 shown in FIG. 13. The terminal guides of the connector 25A can be arranged (e.g., quantity of terminal guides and positioning within the connector 25A) like the terminal guides of the connector 25 C. The terminal guides of the connector 25C can be arranged (e.g., quantity of terminal guides and positioning within the connector 25C) like the terminal guides of the connector 25 A. The connector 25A can comprise the openings to receive fasteners similar to the openings within the connector 25C to receive the fasteners 166.

The ECI device 175 comprises a housing 428 positioned between the connectors 25B and 25C. The housing 428 can comprise a multi-piece housing. For example, the housing 428 can comprise two housing halves retained together by fasteners 154. The ECI device 175 comprises a light port 169. The housing can comprise the opening 167 surrounding the button 170. The button 170 can be configured like the button 48 shown in FIG. 6. The housing 428 comprises a recess 172. The housing 428 can comprise a recess similar to the recess 172 on the opposite side of the housing. Those recesses 153 provide areas at which fingers can be positioned to provide a better grip for pushing the ECI device 175 onto the DLC 11.

III. Example Communication Devices

Figure 19:
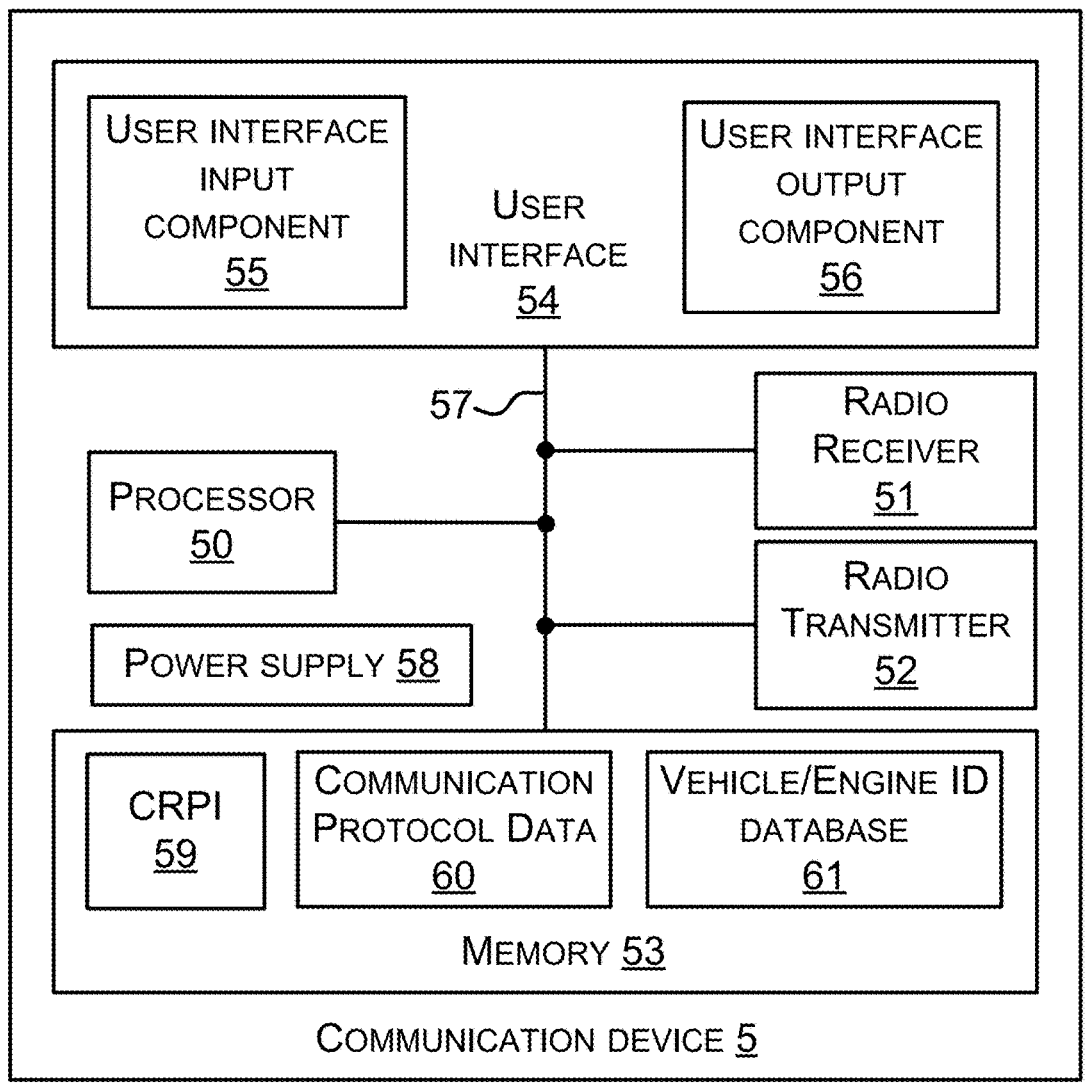
FIG. 19 is a block diagram of an example communication device.

Next, FIG. 19 is a block diagram of the communication device 5 in accordance with the example embodiments. As shown in FIG. 19, the communication device 5 comprises a processor 50, a radio receiver 51, a radio transmitter 52, a memory 53, and a user interface 54. Two or more of those components can be communicatively coupled or linked together via a system bus, network, or other connection mechanism 57.

The processor 50 comprises one or more processors. As an example, the processor 50 can comprise a general purpose processor (e.g., an INTEL® single-core microprocessor or an INTEL® multi-core microprocessor), or a special purpose processor (e.g., a digital signal processor, a graphics processor, or an application specific integrated circuit (ASIC) processor). The processor 50 can execute CRPI 59 stored in the memory 53. The processor 50 can be configured to execute hard-coded functionality in addition to or as an alternative to software-coded functionality (e.g., via CRPI). The processor 50 can be programmed to perform (or cause to be performed) any function discussed in this description as being performed by the processor 50 and/or by a component connected to the processor 50.

The radio transmitter 52 can comprise one or more transmitters configured to transmit radio signals carrying data. A radio transmitter of the radio transmitter 52 can be contained within the processor 50 or located remote from the processor 50. A remote radio transmitter of the radio transmitter 52 can be coupled to the processor 50. The radio transmitter 52 can comprise one or more antennas.

The data transmitted by the radio transmitter 52 can comprise a destination ID of a system component to which the data is to be transmitted. For example, the data transmitted by the transmitter 52 can comprise an identifier of the ECI device 3. The data transmitted by the radio transmitter 52 can comprise a source ID of the transmitter and/or of a system component comprising the radio transmitter 52. For example, the data transmitted by the radio transmitter 52 can comprise an identifier of the communication device 5.

The radio receiver 51 can comprise one or more radio receivers configured to receive radio signals carrying data. The radio receiver 51 can be contained within the processor 50 or located remote from the processor 50. A remote radio receiver of the radio receiver 51 can be coupled to the processor 50. The radio receiver 51 can comprise one or more antennas.

The data received by the radio receiver 51 can comprise a destination ID of the radio receiver 51 and/or a system component comprising the radio receiver 51 (e.g., an identifier of the communication device 51). The data received by the radio receiver 51 can comprise a source ID indicative of the transmitter and/or of a system component comprising the transmitter that transmitted the data. For example, the data received by the radio receiver 51 can comprise a source identifier indicative of the ECI device 3.

The radio signals transmitted by the radio transmitter 52 and/or the radio signals received by the radio receiver 51 can be arranged in accordance with one or more wireless communication standards and/or protocols discussed elsewhere in this description. The radio transmitter 52 and the radio receiver 51 can be contained within a radio transceiver.

The memory 53 comprises one or more memories. The memory 53 comprises the CRPI 59, communication protocol data 60, and a vehicle/engine identifier database 61. The processor 50 can read the communication protocol data 60 for various purposes, such as generating messages for the radio transmitter 52 to transmit to the ECI communication device 3 and/or determining the content of messages the radio receiver 51 receives from the ECI communication device 3. The processor 50 can read the communication protocol data 60 to determine a communication protocol to use for communicating with the ECI communication device 3 based on a vehicle identifier the radio receiver 51 receives from the ECI communication device 3.

The vehicle/engine identifier database 61 can comprise one or more vehicle identifiers such as one or more YMM. The vehicle/engine identifier database 61 can comprise one or more engine identifiers as one or more E terms of the YMME. Each YMM within the vehicle/engine identifier database 61 can be associated with one or more engine identifiers. Each engine identifier of the vehicle/engine identifier database 61 can be associated with one or more vehicle identifiers.

The communication device 5 can comprise a power supply 58. The power supply 58 of can be arranged in any of a variety of configurations. As an example, the power supply 58 can receive an electrical current (e.g., a direct current (DC) electrical current) via a charge port to which a charging cable can be connected. As another example, the power supply 58 can comprise a battery and/or be battery operated. As yet another example, the power supply 58 can comprise a solar cell and/or be solar operated. The power supply 58 can comprise an electrical circuit (not shown) to distribute electrical current throughout the communication device 5. As an example, the electrical circuits can comprise a circuit board trace and/or a wire at least partially covered by an insulator. Other examples of the power supply 58 are also possible.

The user interface 54 comprises a user interface input component 55 and a user interface output component 56. The user interface input component 55 can be used for inputting data into the processor 50 via the user interface. The user interface output component 56 can be used for outputting data from the processor 50 at the user interface 54. As an example, the user interface input component 55 can comprise a keypad, a button, a touch screen display, and/or a microphone. As an example, the user interface output component 56 can comprise a display and/or an audio speaker. The display of the user interface output component 56 can be the same display of the user interface input component 55.

The communication device 5 can comprise (or be implemented as a portion of) a small-form factor portable (i.e., mobile) electronic device such as a smart-phone (e.g., an IPHONE® smart-phone from Apple Inc. of Cupertino, Calif., or a GALAXY S® smart-phone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The CRPI 59 can comprise an application downloaded to the radio receiver 51 from the APP STORE® online retail store, from the GOOGLE PLAY® online retail store, or another source of the applications or the CRPI 59 or a portion of the CRPI 59.

IV. Example Communication Flows

Figure 20:
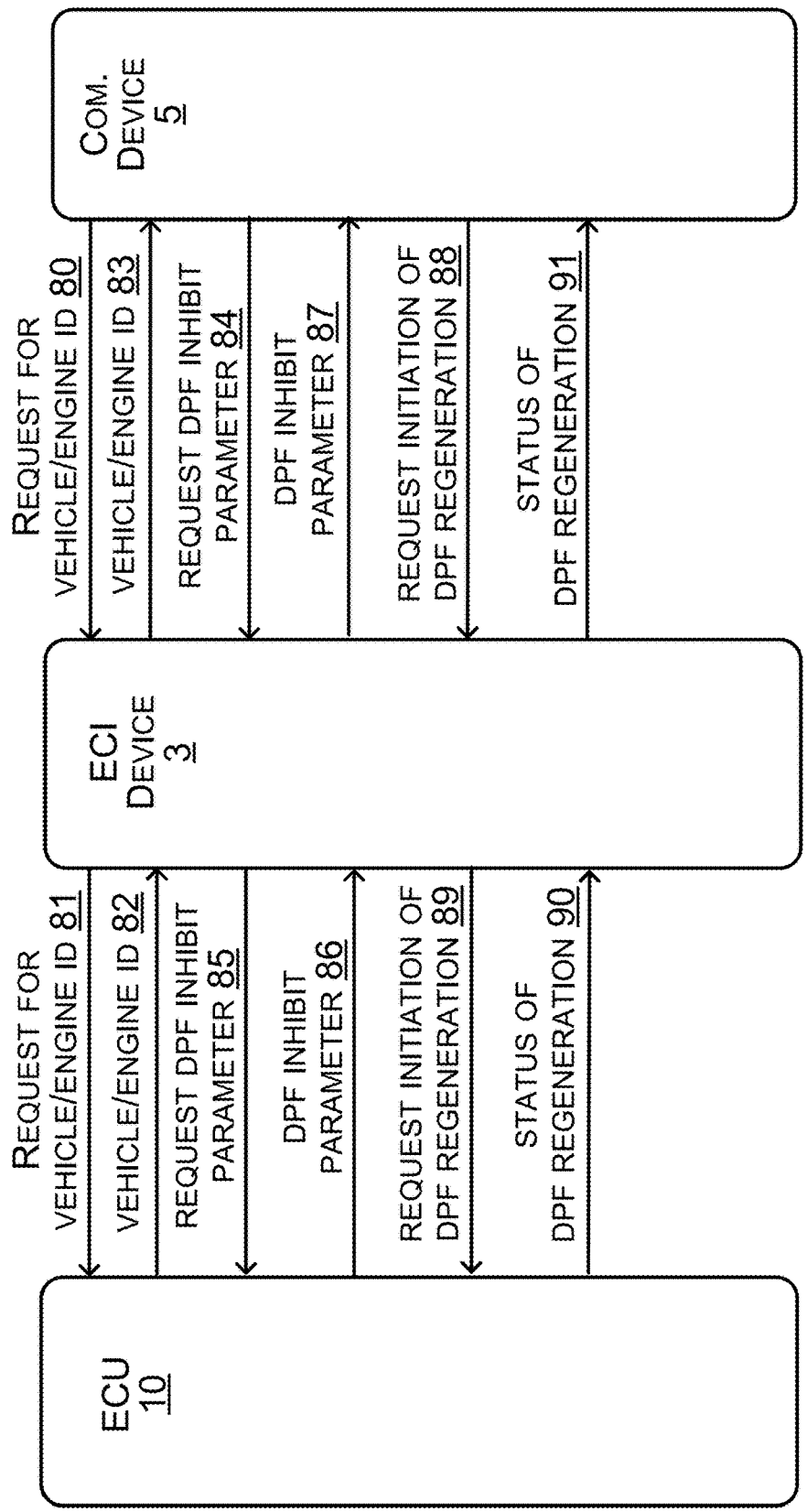
FIG. 20 and FIG. 21 are flow diagrams showing example communications in accordance with the example embodiments.

Next, FIG. 20 is a flow diagram showing example communications that can be carried out in accordance with embodiments using the ECI device 3 and the communication device 5. Each arrowhead indicates a direction (between devices) of a particular communication.

Communication 80 comprises a request for a vehicle/engine identifier. The radio transmitter 52 transmits the communication 80 to the ECI device 3 via a radio signal (e.g., a Bluetooth RF signal). The communication device 5 can cause the radio transmitter 52 to transmit the communication 80 in response to an event trigger, such as a DPF regeneration application on the communication device 5 being started or the communication device 5 receiving an input to request the vehicle/engine identifier. The request for the vehicle/engine identifier within the communication 80 can comprise a request for a vehicle identifier, a request for an engine identifier, or a request for a vehicle identifier and an engine identifier. The radio receiver 23 can receive the communication 80.

Communication 81 comprises a request for a vehicle/engine identifier. The transmitter 22 of the ECI device 3 transmits the communication 81 over the ECU-and-DLC communication link 12. The ECI device 3 may need to send and/or attempt to send a communication with a request for a vehicle/engine identifier over at least one other vehicle communication link connected to the DLC 11 if the ECI device 3 is not aware which vehicle communication link is connected to the ECU 10. The ECI device 3 may need to send and/or attempt to send a communication with a request for a vehicle/engine identifier over the ECU-and-DLC communication link 12 if the ECI device 3 is not aware of a destination identifier of the ECU 10. The ECI device 3 may send the other requests by trial-and-error until the ECU 10 responds with a vehicle/engine identifier via a communication 82. The request for the vehicle/engine identifier within the communication 81 can comprise a request for a vehicle identifier, a request for an engine identifier, or a request for a vehicle identifier and an engine identifier. The ECU 10 can receive the communication 81.

Communication 82 comprises a vehicle/engine identifier. The vehicle/engine identifier within the communication 82 can comprise a vehicle identifier, an engine identifier, or a vehicle identifier and an engine identifier. A transmitter within the ECU 10 can transmit the communication 82 over the ECU-and-DLC communication link 12. The receiver 24 can receive the communication 82.

Communication 83 comprises a vehicle/engine identifier. The radio transmitter 21 transmits the communication 83 to the communication device 5 via a radio signal (e.g., a Bluetooth RF signal). The vehicle/engine identifier within the communication 83 can comprise a vehicle identifier, an engine identifier, or a vehicle identifier and an engine identifier. The vehicle/engine identifier within the communication 83 can be identical to or differ from the vehicle/engine identifier within the communication 82. As an example, the vehicle/engine identifier within the communication 82 can comprise a vehicle identifier and the vehicle/engine identifier within the communication 83 can comprise both the vehicle identifier contained within the communication 82 plus an engine identifier that the ECI device 3 determines by referring to the vehicle/engine identifier database 32. The radio receiver 51 receives the communication 83. The processor 50 can cause a display of the user interface output component 56 to display the vehicle/engine identifier.

Communication 84 comprises a request for a DPF inhibit parameter. The radio transmitter 52 transmits the communication 84 to the ECI device 3 via a radio signal (e.g., a Bluetooth RF signal). The processor 50 can cause the radio transmitter 52 to transmit the communication 84 in response to an event trigger, such as the processor 50 receiving an input from the user interface input component 55 to request the DPF inhibit parameter or the processor 50 determining which DPF inhibit parameter to request based on the vehicle/engine identifier received via the communication 83. As an example, the DPF inhibit parameter request of the communication 84 can comprise a request for all DTCs set in the ECU 10, an identifier of a particular DTC that is settable within the ECU 10, and/or a parameter identifier (PID) of the DPF inhibit parameter. The radio receiver 23 can receive the communication 84.

Communication 85 comprises a request for a DPF inhibit parameter. The transmitter 22 transmits the communication 85 over the ECU-and-DLC communication link 12. The ECI device 3 may need to send and/or attempt to send a communication with a request for a DPF inhibit parameter over at least one other vehicle communication link connected to the DLC 11 if the ECI device 3 is not aware which vehicle communication link is connected to the ECU 10. The ECI device 3 may need to send and/or attempt to send a communication with a request for a DPF inhibit parameter over the ECU-and-DLC communication link 12 if the ECI device 3 is not aware of a destination identifier of the ECU 10. The ECI device 3 may send the other requests by trial-and-error until the ECU 10 responds with a DPF inhibit parameter via a communication 86. As an example, the DPF inhibit parameter request of the communication 85 can comprise a request for all DTCs set in the ECU 10, an identifier of a particular DTC that is settable within the ECU 10, and/or a parameter identifier (PID) of the DPF inhibit parameter. The ECU 10 can receive the communication 85.

Communication 86 comprises a DPF inhibit parameter. As an example, the DPF inhibit parameter within the communication 86 can comprise identifiers of all DTCs settable in the ECU 10 and a status of the DTCs (e.g., active or history), an identifier of the particular DTC that is settable within the ECU 10 and/or the PID of the DPF inhibit parameter. A transmitter within the ECU 10 can transmit the communication 86 over the ECU-and-DLC communication link 12. The receiver 24 can receive the communication 86.

Communication 87 comprises a DPF inhibit parameter. As an example, the DPF inhibit parameter within the communication 87 can comprise identifiers of all DTCs settable in the ECU 10 and a status of the DTCs (e.g., active or history), an identifier of the particular DTC that is settable within the ECU 10 and/or the PID of the DPF inhibit parameter. The radio transmitter 21 transmits the communication 87 to the communication device 5 via a radio signal (e.g., a Bluetooth RF signal). The radio receiver 51 receives the communication 87. The processor 50 can cause a display of the user interface output component 56 to display the DPF inhibit parameter.

Communication 88 comprises a request for initiation of DPF regeneration. The radio transmitter 52 transmits the communication 88 to the ECI device 3 via a radio signal (e.g., a Bluetooth RF signal). The processor 50 can cause the radio transmitter 52 to transmit the communication 88 in response to an event trigger, such as the processor 50 determining that the DPF inhibit parameter received via the communication 87 indicates that DPF regeneration of the DPF 9 can be initiated. The radio receiver 23 can receive the communication 88.

Communication 89 comprises a request for initiation of DPF regeneration. The transmitter 22 transmits the communication 89 over the ECU-and-DLC communication link 12. The processor 20 can cause the transmitter 22 to transmit the communication 89 in response to an event trigger, such as the processor 20 determining that the radio receiver 23 received the communication 88. The ECU 10 can receive the communication 89.

Communication 90 comprises a status of DPF regeneration. A transmitter within the ECU 10 can transmit the communication 90 over the ECU-and-DLC communication link 12. The receiver 24 can receive the communication 90. As an example, the status of the communication 90 can indicate DPF regeneration has started, DPF regeneration is on-going, DPF regeneration has halted, DPF regeneration is completed, or initiation of DPF regeneration is inhibited.

Communication 91 comprises a status of DPF regeneration. The radio transmitter 22 transmits the communication 91 to the ECI device 3 via a radio signal (e.g., a Bluetooth RF signal). The radio receiver 23 can receive the communication 91. As an example, the status of the communication 91 can indicate DPF regeneration has started, DPF regeneration is on-going, DPF regeneration has halted, DPF regeneration is completed, or initiation of DPF regeneration is inhibited. The processor 50 can cause a display of the user interface output component 56 to display the status of the DPF regeneration.

The RF communications 80, 83, 84, 87, 88, and 91 can occur over a wireless communication protocol other than the Bluetooth protocol or in addition to the Bluetooth protocol.

Figure 21:
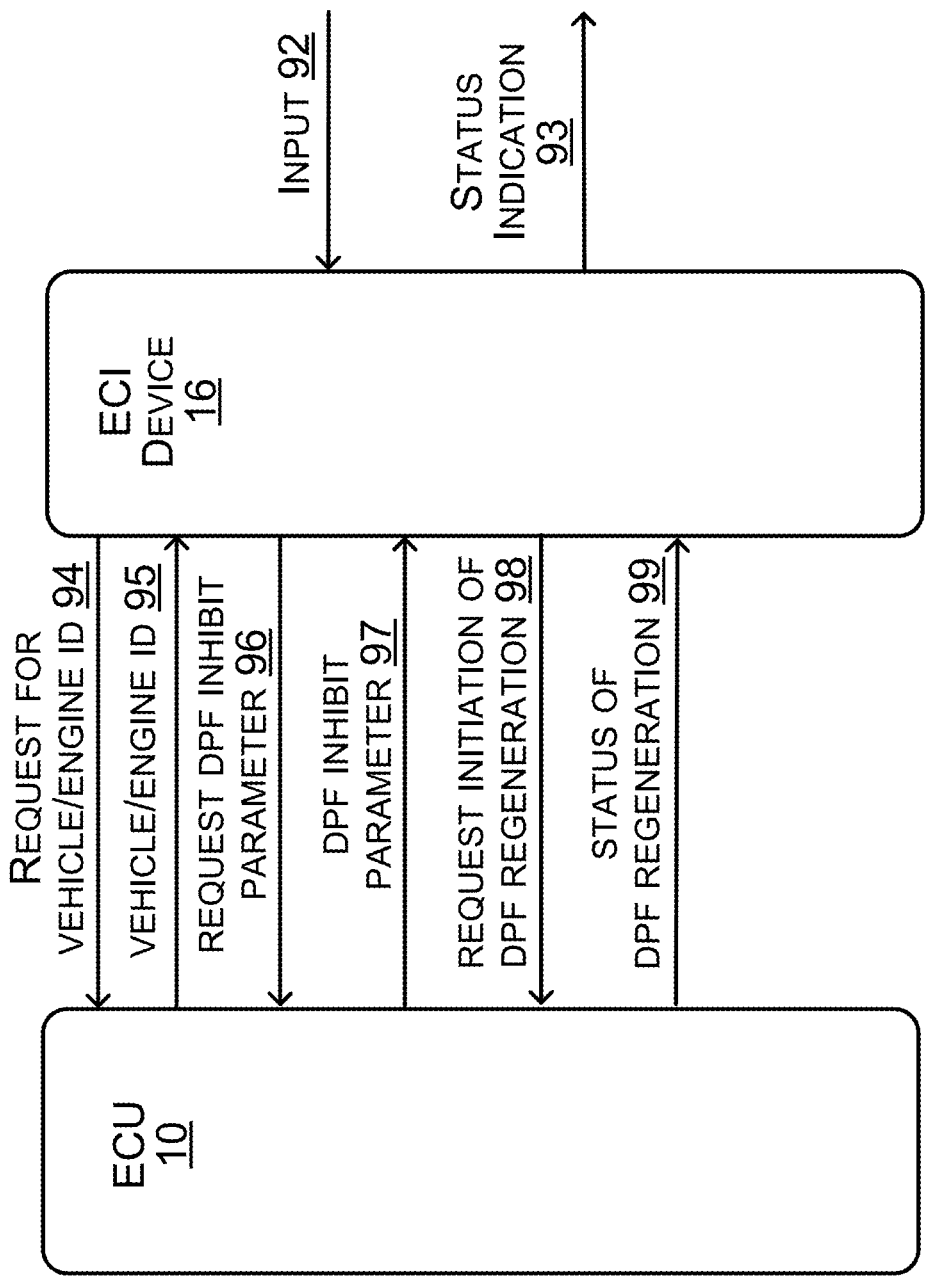

Next, FIG. 21 is a flow diagram showing example communications that can be carried out in accordance with embodiments using the ECI device 16. Each arrowhead for a communication indicates a direction (between devices) of a particular communication. FIG. 21 also shows an input 92 and a status indication 93.

The input 92 can comprise an input received by the processor 120. As an example, the input 92 can result from activation of a switch, such as the switch 76 and/or connection of the ECI device 16 to the DLC 11. Activation of the switch can, for example, comprise pressing a push button, sliding a switch, or turning a knob. The processor 120 can determine the input 92 has been received, for example by determining a change in current flow and/or a change in voltage on a terminal of the processor 120 dedicated for receiving the input. The change in current and/or voltage on the terminal can, for example, occur in response the ECI device 16 being connected to the DLC 11. Other examples of the input 92 and/or the processor 120 determining the input 92 has been received are also possible.

Communication 94 comprises a request for a vehicle/engine identifier. The transmitter 122 of the ECI device 16 transmits the communication 94 over the ECU-and-DLC communication link 12. The ECI device 16 may need to send and/or attempt to send a communication with a request for a vehicle/engine identifier over at least one other vehicle communication link connected to the DLC 11 if the ECI device 16 is not aware which vehicle communication link is connected to the ECU 10. The ECI device 16 may need to send and/or attempt to send a communication with a request for a vehicle/engine identifier over the ECU-and-DLC communication link 12 if the ECI device 16 is not aware of a destination identifier of the ECU 10. The ECI device 16 may send the other requests by trial-and-error until the ECU 10 responds with a vehicle/engine identifier via a communication 94. The request for the vehicle/engine identifier within the communication 94 can comprise a request for a vehicle identifier, a request for an engine identifier, or a request for a vehicle identifier and an engine identifier. The ECU 10 can receive the communication 94.

Communication 95 comprises a vehicle/engine identifier. The vehicle/engine identifier within the communication 95 can comprise a vehicle identifier, an engine identifier, or a vehicle identifier and an engine identifier. A transmitter within the ECU 10 can transmit the communication 95 over the ECU-and-DLC communication link 12. The receiver 124 can receive the communication 95.

Communication 96 comprises a request for a DPF inhibit parameter. The transmitter 122 transmits the communication 96 over the ECU-and-DLC communication link 12. The ECI device 16 may need to send and/or attempt to send a communication with a request for a DPF inhibit parameter over at least one other vehicle communication link connected to the DLC 11 if the ECI device 16 is not aware which vehicle communication link is connected to the ECU 10. The ECI device 16 may need to send and/or attempt to send a communication with a request for a DPF inhibit parameter over the ECU-and-DLC communication link 12 if the ECI device 16 is not aware of a destination identifier of the ECU 10. The ECI device 16 may send the other requests by trial-and-error until the ECU 10 responds with a DPF inhibit parameter via a communication 97. As an example, the DPF inhibit parameter request of the communication 96 can comprise a request for all DTCs set in the ECU 10, an identifier of a particular DTC that is settable within the ECU 10, and/or a parameter identifier (PID) of the DPF inhibit parameter. The ECU 10 can receive the communication 96.

Communication 97 comprises a DPF inhibit parameter. As an example, the DPF inhibit parameter within the communication 97 can comprise identifiers of all DTCs settable in the ECU 10 and a status of the DTCs (e.g., active or history), an identifier of the particular DTC that is settable within the ECU 10 and/or the PID of the DPF inhibit parameter. A transmitter within the ECU 10 can transmit the communication 97 over the ECU-and-DLC communication link 12. The receiver 124 can receive the communication 97.

Communication 98 comprises a request for initiation of DPF regeneration. The transmitter 122 transmits the communication 98 over the ECU-and-DLC communication link 12. The processor 120 can cause the transmitter 122 to transmit the communication 98 in response to an event trigger, such as the processor 120 determining that the DPF inhibit parameter received via the communication 97 indicates regeneration of the DPF can be initiated. The ECU 10 can receive the communication 98.

Communication 99 comprises a status of DPF regeneration. A transmitter within the ECU 10 can transmit the communication 99 over the ECU-and-DLC communication link 12. The receiver 124 can receive the communication 99. As an example, the status of the communication 99 can indicate DPF regeneration has started, DPF regeneration is on-going, DPF regeneration has halted, DPF regeneration is completed, or initiation of DPF regeneration is inhibited.

The status indication 93 can comprise one or more indications of a status of regenerating the DPF. The processor 120 can output signals that control the light 77 to provide the status indication. As an example, the status indication 93 can indicate can indicate DPF regeneration has started, DPF regeneration is on-going, DPF regeneration has halted, DPF regeneration is completed, or initiation of DPF regeneration is inhibited. The processor 120 can change the status indication 93 as the status of regenerating the DPF changes states. The processor 120 can determine the status to be indicated based on, at least in part, the communication 99.

V. Example Operation

Figure 22:
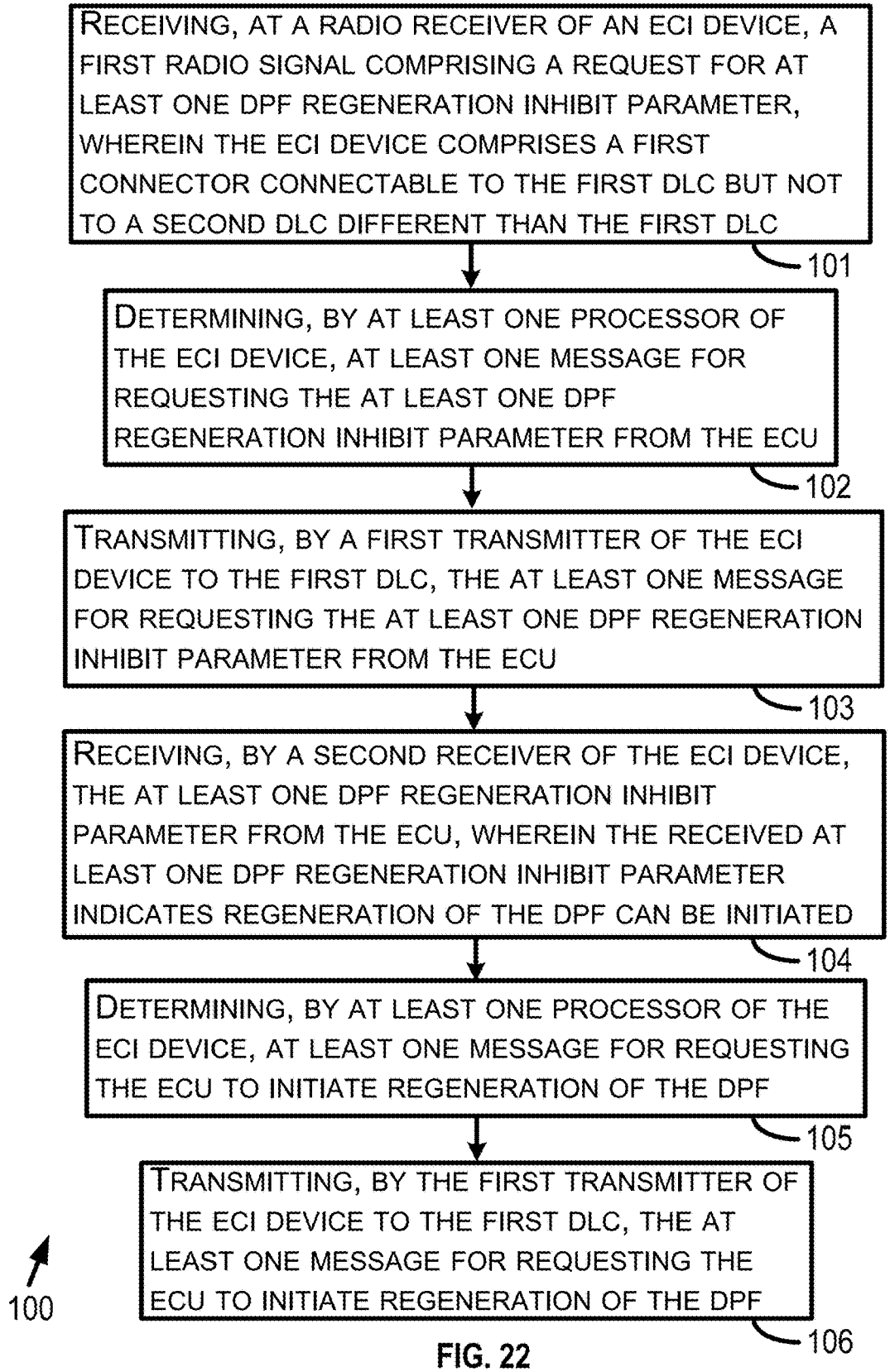
FIG. 22, FIG. 23, and FIG. 24 are flowcharts depicting sets of functions that can be carried out in accordance with the example embodiments.

Next, FIG. 22 is a flowchart depicting a set of functions 100 (or more simply "the set 100") that can be carried out in accordance with the example embodiments described in this description. The set 100 includes the functions shown in blocks labeled with whole numbers 101 through 106 inclusive. The following description of the set 100 includes references to elements shown in other figures discussed in this description, but the functions of the set 100 are not limited to being carried out only by the referenced elements. A variety of methods can be performed using all of the functions shown in the set 100 or any proper subset of the functions shown in the set 100. Any of those methods can be performed with other functions such as one or more of functions of the set 110 shown in FIG. 23 and/or some other function(s) discussed in this description.

A method including the functions of the set 100 can be performed for initiating regeneration of the DPF 9 within the diesel engine system 2 that comprises the DPF 9, the ECU 10, and the DLC 11.

Block 101 includes receiving, at a radio receiver 23 of an ECI device 3, a first radio signal comprising a request for at least one DPF regeneration inhibit parameter, wherein the ECI device 3 comprises a first connector connectable to the first DLC 11 but not to a second DLC different than the first DLC 11. The request of the first radio signal can comprise and/or be configured as the request within the communication 84 transmitted by the communication device 5, as shown in FIG. 20. Transmission of the first radio signal can comprise transmitting the communication 84. The first DLC 11 can comprise a DLC that meets the J1939 standard or the J1962 standard, and the second DLC can comprise a DLC that meets the other of the J1939 standard or the J1962 standard.

Next, block 102 includes determining, by at least one processor 20 of the ECI device 3, at least one message for requesting the at least one DPF regeneration inhibit parameter from the ECU 10. The request carried by the first radio signal may comprise an identifier that the processor 20 uses to determine the at least one DPF regeneration inhibit parameter which is to be requested. As an example, the indicator may comprise an identifier of the at least one DPF regeneration inhibit parameter, an identifier of the diesel engine system 2, and/or an identifier of a vehicle that comprises the diesel engine system 2. The processor 20 may search a database of DPF regeneration inhibit parameters, such as the vehicle/engine ID database 32, based on the identifier in order to identify the at least one DPF regeneration inhibit parameter which is to be requested.

As an example, performing a method including the functions of the set 100 can include identifying, by the at least one processor 20 of the ECI device 3, the diesel engine system 2. Determining the at least one message for requesting the at least one DPF regeneration inhibit parameter from the ECU 10 can comprise determining that the at least one message for requesting the at least one DPF regeneration inhibit parameter from the ECU 10 is mapped to the identified diesel engine system 2 within a database of DPF regeneration inhibit parameters, such as the vehicle/engine ID database 32.

Next, block 103 includes transmitting, by a transmitter 22 of the ECI device 3 to the first DLC 11, the at least one message for requesting the at least one DPF regeneration inhibit parameter from the ECU 10. The at least one message of block 103 can comprise and/or be configured as the request within the communication 85 transmitted by the ECI device 3, as shown in FIG. 20. Transmission of the at least one message of block 103 can comprise transmitting the communication 85.

Next, block 104 includes receiving, by a second receiver 23 of the ECI device 3, the at least one DPF regeneration inhibit parameter from the ECU 10, wherein the received at least one DPF regeneration inhibit parameter indicates regeneration of the DPF 9 can be initiated. Receiving the at least one DPF regeneration inhibit parameter from the ECU 10 can comprise the ECI device 3 receiving the communication 86 shown in FIG. 20.

Next, block 105 includes determining, by the at least one processor 20 of the ECI device 3, at least one message for requesting the ECU 10 to initiate regeneration of the DPF 9. Determining the at least one message for requesting the at least one ECU 10 to initiate regeneration of the DPF 9 can comprise determining the at least one message for requesting the at least one DPF regeneration inhibit parameter from the ECU 10 is mapped to the identified diesel engine system 2 within a database of DPF regeneration inhibit parameters, such as the vehicle/engine ID database 32.

Next, block 106 includes transmitting, by the transmitter 22 of the ECI device 3 to the first DLC 11, the at least one message for requesting the ECU 10 to initiate regeneration of the DPF 9. The at least one message of block 106 can comprise and/or be configured as the request within the communication 89 transmitted by the ECI device 3, as shown in FIG. 20. Transmission of the at least one message of block 106 can comprise transmitting the communication 89.

The ECI device for the set 100 can comprise a second connector. The second connector is connectable to a second DLC different than the first DLC, the first connector is not connectable to the second DLC, and the second connector is not connectable to the first DLC. Accordingly, as an example, the ECI device for the set 100 can be configured like the ECI device 79 shown in FIG. 6 to FIG. 11.

Performing a method including some or all of the functions of the set 100 can include transmitting, by a radio transmitter 21 of the ECI device 3, a second radio signal to a communication device 5 that transmitted the first radio signal received by the radio receiver 23, wherein the second radio signal comprises the at least one DPF regeneration inhibit parameter from the ECU 10; and receiving, at the radio receiver 23 of the ECI device 3, a third radio signal, wherein the third radio signal comprises an instruction to initiate regeneration of the DPF 9 of the diesel engine system 2, and wherein the third radio signal is transmitted by the communication device 5.

Performing a method including some or all of the functions of the set 100 can include receiving, at a first terminal of the first connector via the first DLC 11, an electric current to power on at least one of (i) the radio receiver 23 of the ECI device 3, (ii) the at least one processor 20 of the ECI device 3, (iii) the second receiver 24 of the ECI device 3, and (iv) the transmitter 22 of the ECI device 3; and powering on, using at least a portion of the received electric current, the at least one of (i) the radio receiver 23 of the ECI device 3, (ii) the at least one processor 20 of the ECI device 3, (iii) the second receiver 24 of the ECI device 3, and (iv) the transmitter 22 of the ECI device 3.

Performing a method including some or all of the functions of the set 100 can include receiving, at the radio receiver 23 of the ECI device 3, a fourth radio signal comprising data indicative of the diesel engine system 2, wherein the at least one processor 20 of the ECI device 3 uses the data indicative of the diesel engine system 2 to identify the diesel engine system 2. The fourth radio is transmitted by the communication device 5. The fourth radio signal can comprise or be arranged as the communication 80 shown in FIG. 20.

Performing a method including some or all of the functions of the set 100 can include transmitting, by the transmitter 22 of the ECI device 3 to the first DLC 11, a message to request an identifier of the diesel engine system 2 from the ECU 10, and receiving, by the second receiver 24 of the ECI device 3, the identifier of the diesel engine system 2 from the ECU 10. The at least one processor 20 of the ECI device 3 can use the identifier of the diesel engine system 2 from the ECU 10 to identify the diesel engine system 2.

Under other circumstances, the at least one DPF regeneration inhibit parameter received from the ECU 10 can comprise a DPF regeneration inhibit parameter that indicates initiating regeneration of the DPF is inhibited. Such circumstance, for example, can comprise a diagnostic trouble code being set active within the ECU 10 and/or the parking brake of the vehicle including the diesel engine system 2 being disengaged. The ECI device 3 can transmit at least one DPF regeneration inhibit parameter received from the ECU 10 to the communication device 5. The processor 50 can cause a display of the user interface output component 56 to display a status indicating regeneration of the DPF 9 is inhibited. Displaying that status can comprise displaying information that indicates why regeneration of the DPF 9 is inhibited (e.g., the diagnostic trouble code being set active within the ECU 10 and/or the parking brake of the vehicle including the diesel engine system 2 being disengaged).

Figure 23:
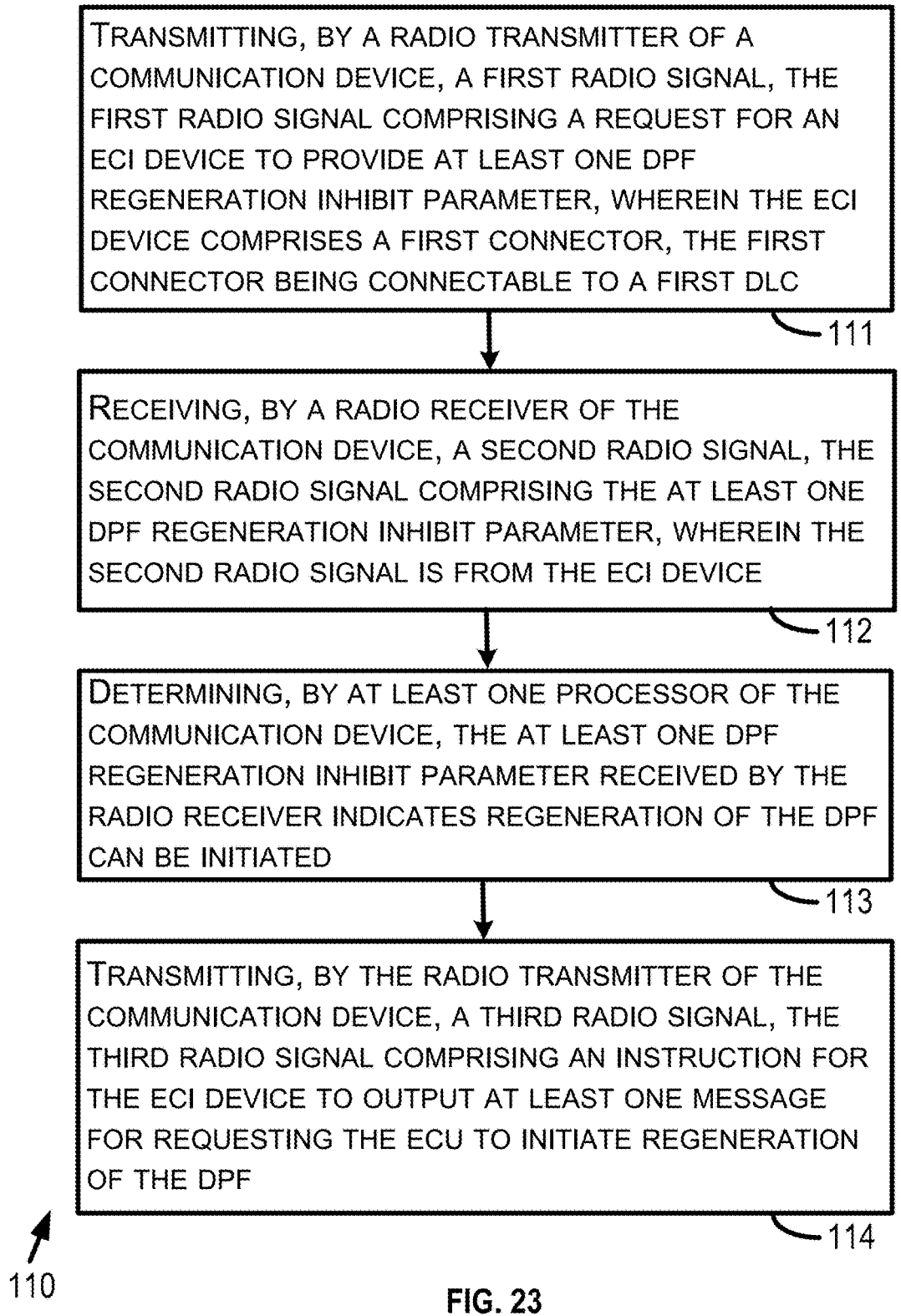

Next, FIG. 23 is a flowchart depicting a set of functions 110 (or more simply "the set 110") that can be carried out in accordance with the example embodiments described in this description. The set 110 includes the functions shown in blocks labeled with whole numbers 111 through 114 inclusive. The following description of the set 110 includes references to elements shown in other figures described in this description, but the functions of the set 110 are not limited to being carried out only by the referenced elements. A variety of methods can be performed using all of the functions shown in the set 110 or any proper subset of the functions shown in the set 110. Any of those methods can be performed with other functions such as one or more of the other functions described in this description.

A method including the functions of the set 110 can be performed for initiating regeneration of the DPF 9 within the diesel engine system 2 that comprises the DPF 9, the ECU 10, and the DLC 11.

Block 111 includes transmitting, by a radio transmitter 52 of a communication device 5, a first radio signal, the first radio signal comprising a request for the ECI device 3 to provide at least one DPF regeneration inhibit parameter, wherein the ECI device 3 comprises a first connector 25, the first connector being connectable to the first DLC 11. The first radio signal of block 111 can be configured like the communication 84 shown in FIG. 20.

As an example, the at least one DPF regeneration inhibit parameter for the set 110 comprises a parking brake status parameter, a transmission gear selection parameter, an engine coolant temperature parameter, and/or a foot pedal status parameter. The at least one DPF regeneration inhibit parameter for the set 110 can comprise a different DPF regeneration inhibit parameter as well or instead.

The ECI device for the set 110 can comprise a second connector. The second connector is connectable to a second DLC different than the first DLC, the first connector is not connectable to the second DLC, and the second connector is not connectable to the first DLC. Accordingly, as an example, the ECI device for the set 110 can be configured like the ECI device 79 shown in FIG. 6 to FIG. 11.

Next, block 112 includes receiving, by a radio receiver of the communication device 51, a second radio signal, the second radio signal comprising the at least one DPF regeneration inhibit parameter, wherein the second radio signal is from the ECI device 3. The second radio signal of block 112 can be configured like the communication 87 shown in FIG. 20.

Next, block 113 includes determining, by at least one processor 50 of the communication device 5, the at least one DPF regeneration inhibit parameter received by the radio receiver 51 indicates regeneration of the DPF can be initiated. Determining the at least one DPF regeneration inhibit parameter received by the radio receiver 51 indicates regeneration of the DPF can be initiated can comprise the processor 50 comparing the at least one DPF regeneration inhibit parameter with DPF regeneration inhibit parameters within a database of DPF regeneration inhibit parameters, such as the vehicle/engine ID database 32. The vehicle/engine ID database 32 can comprise the values and/or ranges of DPF regeneration inhibit parameters that indicate whether initiation of regeneration of the DPF is to be inhibited or not.

Next, block 114 includes transmitting, by the radio transmitter 52 of the communication device 5, a third radio signal, the third radio signal comprising an instruction for the ECI device 3 to output at least one message for requesting the ECU 10 to initiate regeneration of the DPF 9. The third radio signal of block 114 can be configured like the communication 88 shown in FIG. 20.

Performing a method including some or all of the functions of the set 110 can include determining, by the at least one processor 50 of the communication device 5, an identifier of the diesel engine system 2, and determining, by the at least one processor 50 of the communication device 5 based on the identifier of the diesel engine system 2, the at least one DPF regeneration inhibit parameter to include in the request of the first radio signal.

Performing a method including some or all of the functions of the set 110 can include determining, by the at least one processor 50 of the communication device 5 based on the identifier of the diesel engine system 2, a communication protocol for communicating with the ECU 10; and determining, by the at least one processor 50 based on the determined communication protocol and the identifier of the diesel engine system 2, the at least one message for requesting the ECU 10 to initiate regeneration of the DPF 9, wherein each message of the at least one message for requesting the ECU 10 to initiate regeneration of the DPF 9 is configured according to the determined communication protocol. The determined communication protocol being a VDM protocol.

Performing a method including some or all of the functions of the set 110 can include receiving, by the at least processor 50 of the communication device 5, an input from a use of a user interface input component 55 of the communication device 5, wherein the input is indicative of the diesel engine system 2, and wherein the at least one processor 50 of the communication device 5 determines the identifier of the diesel engine system 2 based on the input indicative of the diesel engine system 2.

Performing a method including some or all of the functions of the set 110 can include receiving, by the radio receiver 51 of the communication device 5, a fourth radio signal, wherein the fourth radio signal is from the ECI device 3, wherein the fourth radio signal comprises data indicative of the diesel engine system 2, and wherein the at least one processor 50 of the communication device 5 determines the identifier of the diesel engine system 2 based on the data indicative of the diesel engine system 2. The fourth radio signal of block 114 can be configured like the communication 83 shown in FIG. 20.

Performing a method including some or all of the functions of the set 110 can include displaying, on a display of the communication device 5, the at least one DPF regeneration inhibit parameter received by the radio receiver 51 and/or a status of regeneration of the DPF after regeneration of the DPF is initiated.

Performing a method including some or all of the functions of the set 110 can include, prior to receiving the second radio signal, determining, by the at least one processor 50 of the communication device 5, a diagnostic trouble code that inhibits initiating regeneration of the DPF is set to active within the ECU 10, and prior to receiving the second radio signal, transmitting, by the radio transmitter 52 of the communication device 5, an instruction for the ECI device 3 to output a signal to cause the ECU 10 to set the diagnostic trouble code to inactive within the ECU 10.

Figure 24:
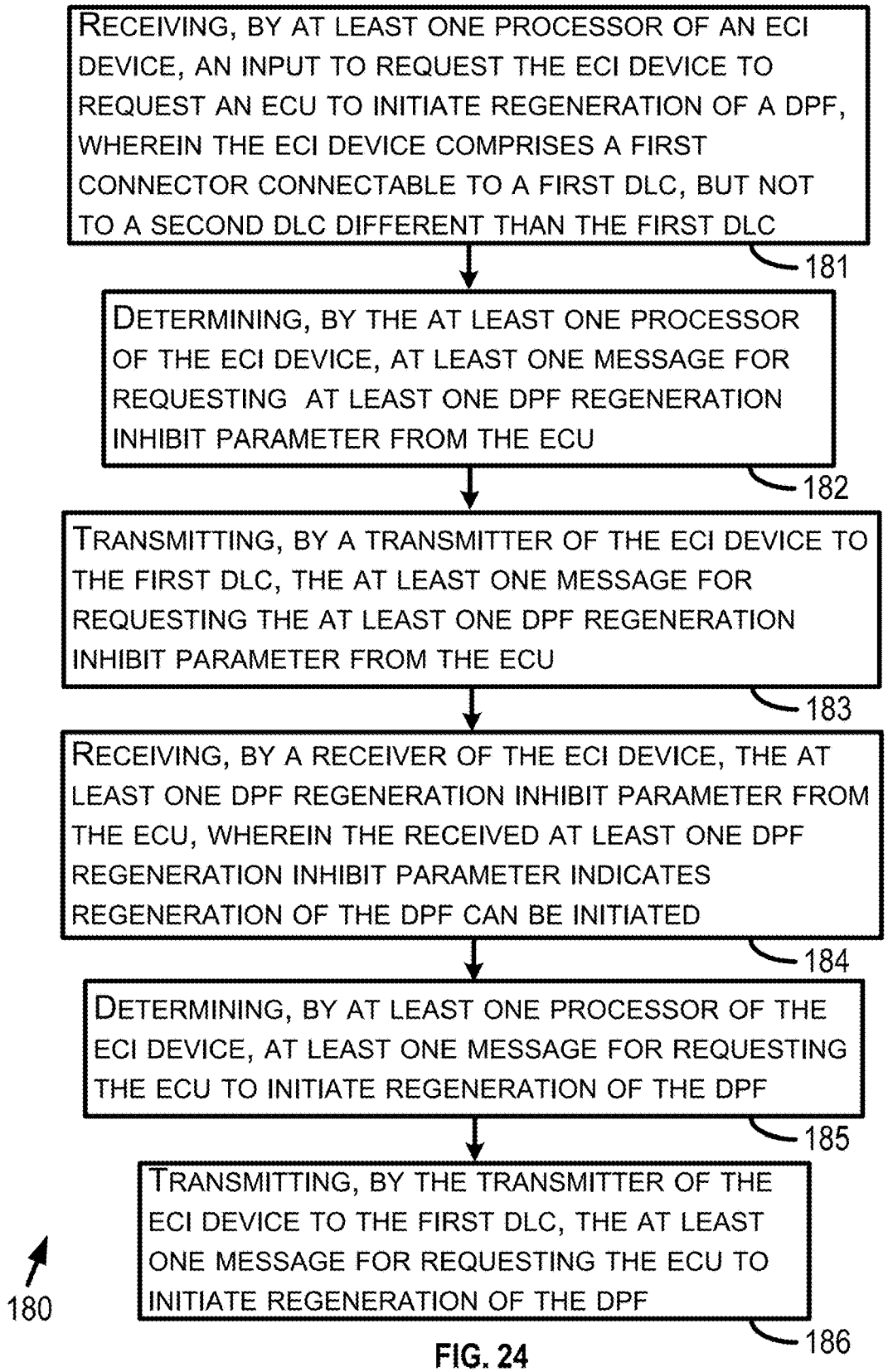

Next, FIG. 24 is a flowchart depicting a set of functions 180 (or more simply "the set 180") that can be carried out in accordance with the example embodiments described in this description. The set 180 includes the functions shown in blocks labeled with whole numbers 181 through 186 inclusive. The following description of the set 180 includes references to elements shown in other figures discussed in this description, but the functions of the set 180 are not limited to being carried out only by the referenced elements. A variety of methods can be performed using all of the functions shown in the set 180 or any proper subset of the functions shown in the set 180. Any of those methods can be performed with other functions such as one or more other function(s) discussed in this description.

A method including the functions of the set 180 can be performed for initiating regeneration of the DPF 9 within the diesel engine system 2 that comprises the DPF 9, the ECU 10, and the DLC 11.

Block 181 includes receiving, by at least one processor 120 of an ECI device 16, an input to request the ECI device 16 to request an ECU 10 to initiate regeneration of a DPF 9, wherein the ECI device 16 comprises a first connector connectable to a first DLC 11, but not to a second DLC different than the first DLC 11. The input can comprise and/or be configured as the input 92, as shown in FIG. 21.

Next, block 182 includes determining, by the at least one processor 120 of the ECI device 16, at least one message for requesting the at least one DPF regeneration inhibit parameter from the ECU 10. Determine the at least one message of block 182 can comprise the ECI device 16 transmitting the communication 94 and receiving the communication 95. The communication 95 may comprise an identifier that the processor 120 uses to determine the at least one DPF regeneration inhibit parameter which is to be requested. As an example, the indicator may comprise an identifier of the at least one DPF regeneration inhibit parameter, an identifier of the diesel engine system 2, and/or an identifier of a vehicle that comprises the diesel engine system 2. The processor 120 may search a database of DPF regeneration inhibit parameters, such as the vehicle/engine ID database 32, based on the identifier in order to identify the at least one DPF regeneration inhibit parameter which is to be requested.

As an example, performing a method including the functions of the set 180 can include identifying, by the at least one processor 120 of the ECI device 16, the diesel engine system 2. Determining the at least one message for requesting the at least one DPF regeneration inhibit parameter from the ECU 10 can comprise determining that the at least one message for requesting the at least one DPF regeneration inhibit parameter from the ECU 10 is mapped to the identified diesel engine system 2 within a database of DPF regeneration inhibit parameters, such as the vehicle/engine ID database 132. As an example, the identified diesel engine system can be the 8.7L L6 4X2 engine within the 2003/International/4400/8.7L L6 vehicle and the at least one DPF regeneration inhibit parameter can comprise a parking brake status and an engine coolant temperature.

Next, block 183 includes transmitting, by a transmitter 122 of the ECI device 16 to the first DLC 11, the at least one message for requesting the at least one DPF regeneration inhibit parameter from the ECU 10. The at least one message of block 183 can comprise and/or be configured as the request within the communication 96 transmitted by the ECI device 16, as shown in FIG. 21. Transmission of the at least one message of block 183 can comprise transmitting the communication 96.

Next, block 184 includes receiving, by a receiver 123 of the ECI device 16, the at least one DPF regeneration inhibit parameter from the ECU 10, wherein the received at least one DPF regeneration inhibit parameter indicates regeneration of the DPF 9 can be initiated. Receiving the at least one DPF regeneration inhibit parameter from the ECU 10 can comprise the ECI device 16 receiving the communication 97 shown in FIG. 21.

Next, block 185 includes determining, by the at least one processor 120 of the ECI device 16, at least one message for requesting the ECU 10 to initiate regeneration of the DPF 9. Determining the at least one message for requesting the at least one ECU 10 to initiate regeneration of the DPF 9 can comprise determining the at least one message for requesting the at least one DPF regeneration inhibit parameter from the ECU 10 is mapped to the identified diesel engine system 2 within a database of DPF regeneration inhibit parameters, such as the vehicle/engine ID database 132.

Next, block 186 includes transmitting, by the transmitter 122 of the ECI device 16 to the first DLC 11, the at least one message for requesting the ECU 10 to initiate regeneration of the DPF 9. The at least one message of block 186 can comprise and/or be configured as the request within the communication 89 transmitted by the ECI device 16, as shown in FIG. 20. Transmission of the at least one message of block 106 can comprise transmitting the communication 98.

The ECI device for the set 180 can comprise a second connector. The second connector is connectable to a second DLC different than the first DLC, the first connector is not connectable to the second DLC, and the second connector is not connectable to the first DLC. Accordingly, as an example, the ECI device for the set 180 can be configured like the ECI device 79 shown in FIG. 6 to FIG. 11.

Performing a method including some or all of the functions of the set 180 can include receiving, at a first terminal of the first connector via the first DLC 11, an electric current to power on at least one of (i) the at least one processor 120 of the ECI device 16, (iii) the receiver 124 of the ECI device 16, and (iii) the transmitter 122 of the ECI device 16; and powering on, using at least a portion of the received electric current, the at least one of (i) the at least one processor 120 of the ECI device 16, (ii) the receiver 124 of the ECI device 16, and (iii) the transmitter 122 of the ECI device 16.

Performing a method including some or all of the functions of the set 180 can include transmitting, by the transmitter 122 of the ECI device 16 to the first DLC 11, a message to request an identifier of the diesel engine system 2 from the ECU 10, and receiving, by the receiver 124 of the ECI device 16, the identifier of the diesel engine system 2 from the ECU 10. The at least one processor 120 of the ECI device 16 can use the identifier of the diesel engine system 2 from the ECU 10 to identify the diesel engine system 2.

Under other circumstances, the at least one DPF regeneration inhibit parameter received from the ECU 10 can comprise a DPF regeneration inhibit parameter that indicates initiating regeneration of the DPF is inhibited. Such circumstance, for example, can comprise a diagnostic trouble code being set active within the ECU 10 and/or the parking brake of the vehicle including the diesel engine system 2 being disengaged. The processor 120 can output a status indication 93 that indicates initiating regeneration of the DPF 9 is inhibited. Displaying the status indication 93 can comprise causing the light 77 to emit a particular color light and/or a flashing sequence to indicate initiating regeneration of the DPF 9 is inhibited.

VI. Example Computing System

Figure 25:
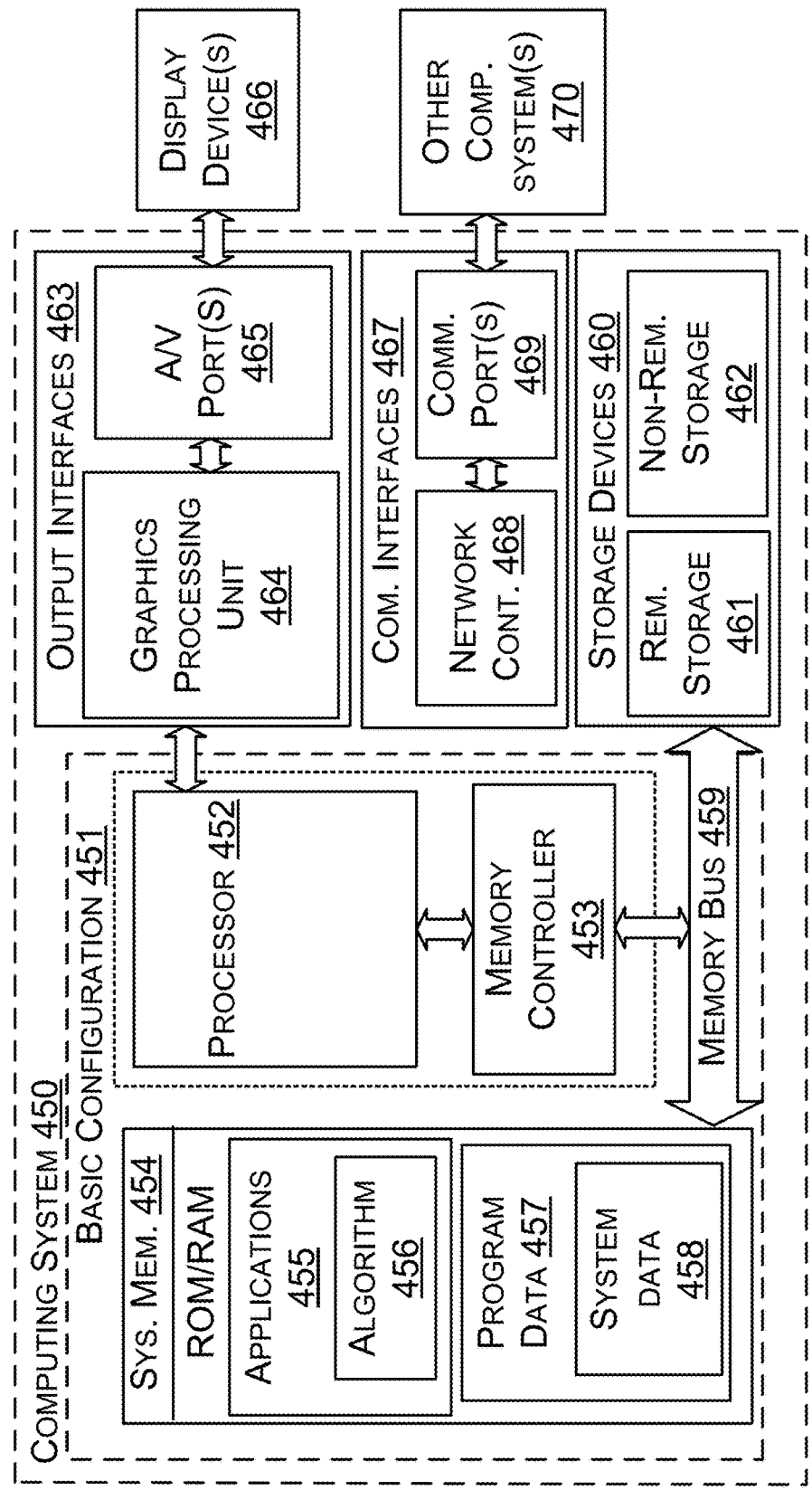
FIG. 25 is a functional block diagram illustrating a computing system that is arranged in accordance with at least some example embodiments.

Each of the ECI device 3, the ECI device 16, the communication device 5, and the ECU 10 comprises a computing system. The ECI device 3, the ECI device 16, the communication device 5, and the ECU 10 can comprise any of the components of an example computing system 450 shown in FIG. 25, which is a functional block diagram illustrating an example computing system.

In a basic configuration 451, the computing system 450 can include one or more processors 452 and a system memory 454. A memory bus 459 can be used for communicating between the processor 452 and the system memory 454. Depending on the desired configuration, the processor 452 can be of any type including but not limited to a microprocessor (µP), a microcontroller (µC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. The system memory 454 can include one or more applications 455, and program data 457. The application 455 can include an algorithm 456 that is arranged to perform the functions described as being performed by the ECI device 3, the ECI device 16, the communication device 5, and/or the ECU 10. The program data 457 can include system data 458 that could be directed to any number of types of data, such as the communication protocol data 31, 60 and 131, and/or the vehicle/engine ID databases 32, 61, and 132. In some example embodiments, the applications 455 can be arranged to operate with the program data 457 on an operating system executable by the processor 452.

The computing system 450 can have additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, or other data such as the data stored in a computer-readable memory, such as the memories 26, 53, and 126.

The system memory 454 and the storage devices 460 are examples of computer-readable medium, such as the memories 26, 53, and 126. The system memory 454 and the storage devices 460 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 450.

For the communication device 5, the computing system 450 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 455, or the program data 457 can include an application downloaded to the communication interfaces 467 from the APP STORE® online retail store, from the GOOGLE PLAY® online retail store, or another source of the applications or the CRPI described herein for use on the communication device 5.

Figure 26:
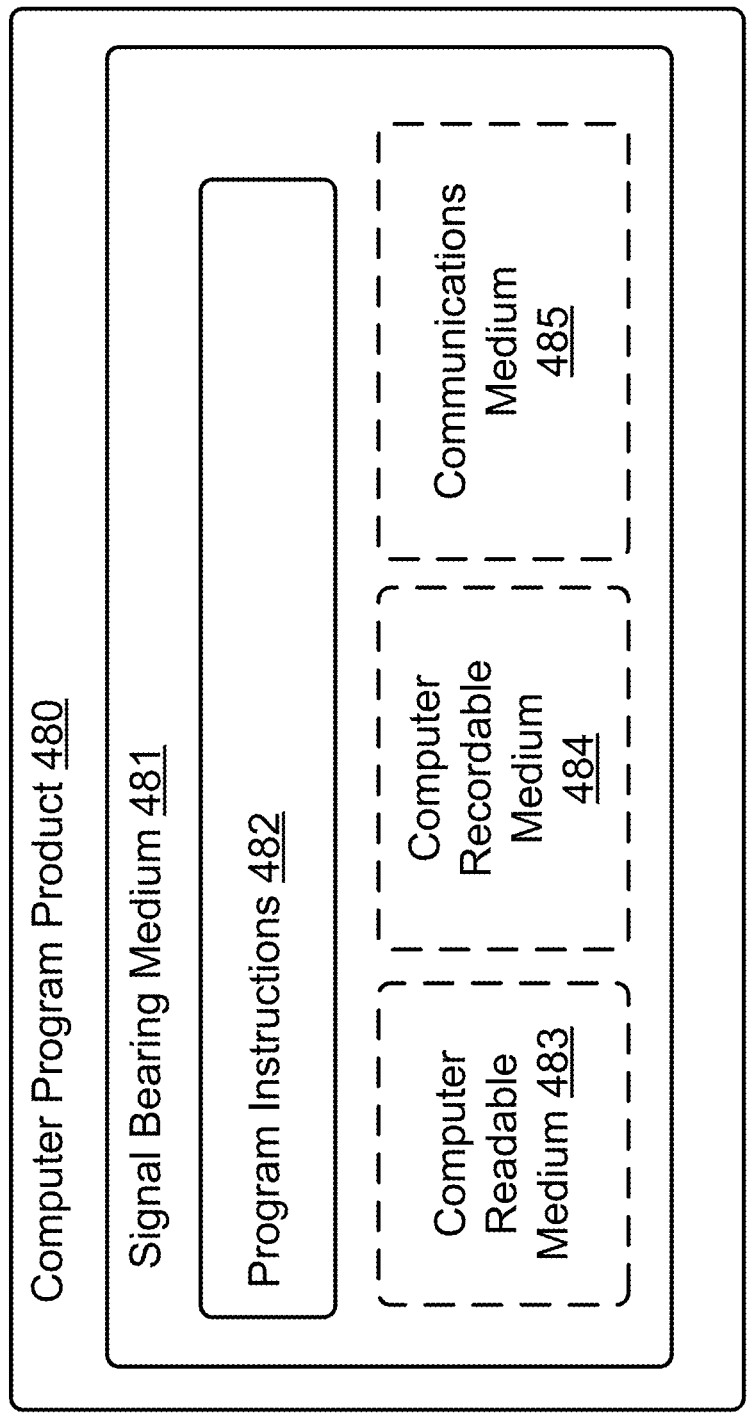
FIG. 26 is a schematic illustrating a conceptual partial view of a computer program product for executing a computer process on a computing system.

Additionally or alternatively, the computing system 450 can include or be implemented as part of a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 26 is a schematic illustrating a conceptual partial view of an example computer program product 480 that includes a computer program for executing a computer process on a computing system, arranged according to at least some embodiments presented herein.

The computing system 450 can also include output interfaces 463 that can include a graphics processing unit 464, which can be configured to communicate to various external devices such as display devices 466 or speakers via one or more A/V ports 465 or a communication interface 467. The communication interface 467 can include a network controller 468, which can be arranged to facilitate communications with one or more other computing systems 470 over a network communication via one or more communication ports 469. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 480 is provided using a signal bearing medium 481. The signal bearing medium 481 can include one or more programming instructions 482 that, when executed by one or more processors can provide functionality or portions of the functionality described above with respect to FIG. 1 to FIG. 25. In some examples, the signal bearing medium 481 can encompass a computer-readable medium 483, such as, but not limited to, a hard disk drive, a Compact Disc (CD), a Digital Video Disk (DVD), a digital tape, or any other memory described herein. In some implementations, the signal bearing medium 481 can encompass a computer recordable medium 484, such as, but not limited to, memory, read/write (R/W) CDs, R/W DVDs, etc. In some implementations, the signal bearing medium 481 can encompass a communications medium 485, such as, but not limited to, a digital and/or an analog communication medium (e.g., a fiber optic cable, a waveguide, a wired communications link, a wireless communication link, etc.). Thus, for example, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable and/or logic implemented instructions. In some examples, a computing system such as the computing system 450 of FIG. 25 can be configured to provide various operations, functions, or actions in response to the programming instructions 482 conveyed to the computing system 450 by one or more of the computer-readable medium 483, the computer recordable medium 484, and/or the communications medium 485.

The processor 20, the processor 50, and/or the processor 120 can be configured like the processor 452. The memory 26, the memory 53, and/or the memory 126 can be configured as part of or all of the system memory 454 or the storage devices 460. The radio transmitter 21, the transmitter 22, the radio receiver 23, the receiver 24, the radio receiver 51, the radio transmitter 52, the transmitter 122, and/or the receiver 124 can be configured as part of or all of the communication interfaces 467.

VII. Additional Definitions

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some memory to perform some function can include executing all of the program instructions of those CRPI or only a portion of those CRPI.

The term "data" within this description can be used interchangeably with the term "information" or similar terms, such as "content." The data can represent various things such as objects and conditions. The objects and conditions can be mapped to a data structure (e.g., a table). A processor can refer to the data structure to determine what object or condition is represented by the data. As an example, the data received by a processor can represent an engine identifier. The processor can determine a VDM protocol by comparing the engine identifier to a data structure that maps VDM protocols to engine identifiers.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

VIII. Additional Example Embodiments

The following four patent applications filed on Feb. 7, 2017 with the title Dual-connector wireless vehicle communication interface are incorporated herein by reference: (i)

U.S. Patent Application Ser. No. 29/593,272, (ii) U.S. Patent Application Ser. No. 29/593,273, (iii) U.S. Patent Application Ser. No. 29/593,270, and (iv) U.S. Patent Application Ser. No. 29/593,271. The four patent applications incorporated by reference illustrate additional aspects of the example embodiments.

Embodiments of the present disclosure may thus relate to one of the enumerated example embodiment (EEEs) listed below.

EEE 1 is a method for initiating regeneration of a DPF with a diesel engine system that comprises the DPF, a first DLC, and an ECU, the method comprising: (i) receiving, at a radio receiver of an ECI device, a first radio signal comprising a request for at least one DPF regeneration inhibit parameter, wherein the ECI device comprises a first connector connectable to the first DLC, but not to a second DLC different than the first DLC, (ii) determining, by at least one processor of the ECI device, at least one message for requesting the at least one DPF regeneration inhibit parameter from the ECU, (iii) transmitting, by a first transmitter of the ECI device to the first DLC, the at least one message for requesting the at least one DPF regeneration inhibit parameter from the ECU, (iv) receiving, by a second receiver of the ECI device, the at least one DPF regeneration inhibit parameter from the ECU, wherein the received at least one DPF regeneration inhibit parameter indicates regeneration of the DPF can be initiated, (v) determining, by the at least one processor of the ECI device, at least one message for requesting the ECU to initiate regeneration of the DPF, and (vi) transmitting, by the first transmitter of the ECI device to the first DLC, the at least one message for requesting the ECU to initiate regeneration of the DPF.

EEE 2 is the method of EEE 1, further comprising: transmitting, by a radio transmitter of the ECI device, a second radio signal to a communication device that transmitted the first radio signal received by the radio receiver, wherein the second radio signal comprises the at least one DPF regeneration inhibit parameter from the ECU, and receiving, at the radio receiver of the ECI device, a third radio signal, wherein the third radio signal comprises an instruction to initiate regeneration of the DPF of the diesel engine system, and wherein the third radio signal is transmitted by the communication device.

EEE 3 is the method of any one of EEE 1 to 2, further comprising: receiving, at a first terminal of the first connector via the first DLC, an electric current to power on at least one of (i) the radio receiver of the ECI device, (ii) the at least one processor of the ECI device, (iii) the second receiver of the ECI device, and (iv) the first transmitter of the ECI device; and powering on, using at least a portion of the received electric current, the at least one of (i) the radio receiver of the ECI device, (ii) the at least one processor of the ECI device, (iii) the second receiver of the ECI device, and (iv) the first transmitter of the ECI device.

EEE 4 is the method of any one of EEE 1 to 3, further comprising: identifying, by the at least one processor of the ECI device, the diesel engine system, wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

EEE 5 is the method of EEE 4, further comprising: receiving, at the radio receiver of the ECI device, a fourth radio signal comprising data indicative of the diesel engine system, wherein the at least one processor of the ECI device uses the data indicative of the diesel engine system to identify the diesel engine system, and wherein the fourth radio signal is transmitted by the communication device.

EEE 6 is the method of any one of EEE 4 and 5, further comprising: transmitting, by the first transmitter of the ECI device to the first DLC, a message to request an identifier of the diesel engine system from the ECU, and receiving, by the second receiver of the ECI device, the identifier of the diesel engine system from the ECU, wherein the at least one processor of the ECI device uses the identifier of the diesel engine system from the ECU to identify the diesel engine system.

EEE 7 is the method of any one of EEE 1 to 6, wherein the ECI device further comprises a second connector connectable to the second DLC, but not to the first DLC.

EEE 8 is the method of EEE 7, further comprising: switching, by the at least one processor, at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 9 is a non-transitory memory storing computer-readable program instructions that, when executed by at least one processor of an ECI device that comprises a first connector connectable to a first DLC, but not to a second DLC different than the first DLC cause the ECI device to perform functions for initiating regeneration of a DPF within a diesel engine system that comprises the DPF, a first DLC, and an ECU, the functions comprising: (i) receiving, at a radio receiver of the ECI device, a first radio signal comprising a request for at least one DPF regeneration inhibit parameter, (ii) determining, by at least one processor of the ECI device, at least one message for requesting the at least one DPF regeneration inhibit parameter from the ECU, (iii) transmitting, by a first transmitter of the ECI device to the first DLC, the at least one message for requesting the at least one DPF regeneration inhibit parameter from the ECU, (iv) receiving, by a second receiver of the ECI device, the at least one DPF regeneration inhibit parameter from the ECU, wherein the received at least one DPF regeneration inhibit parameter indicates regeneration of the DPF can be initiated, (v) determining, by the at least one processor of the ECI device, at least one message for requesting the ECU to initiate regeneration of the DPF, and (vi) transmitting, by the first transmitter of the ECI device to the first DLC, the at least one message for requesting the ECU to initiate regeneration of the DPF.

EEE 10 is the non-transitory memory of EEE 9, wherein the functions further comprise: transmitting, by a radio transmitter of the ECI device, a second radio signal to a communication device that transmitted the first radio signal received by the radio receiver, wherein the second radio signal comprises the at least one DPF regeneration inhibit parameter from the ECU, and receiving, at the radio receiver of the ECI device, a third radio signal, wherein the third radio signal comprises an instruction to initiate regeneration of the DPF of the diesel engine system, and wherein the third radio signal is transmitted by the communication device.

EEE 11 is the non-transitory memory of any one of EEE 9 to 10, wherein the functions further comprise: receiving, at a first terminal of the first connector via the first DLC, an electric current to power on at least one of (i) the radio receiver of the ECI device, (ii) the at least one processor of the ECI device, (iii) the second receiver of the ECI device, and (iv) the first transmitter of the ECI device; and powering on, using at least a portion of the received electric current, the at least one of (i) the radio receiver of the ECI device, (ii) the at least one processor of the ECI device, (iii) the second receiver of the ECI device, and (iv) the first transmitter of the ECI device.

EEE 12 is the non-transitory memory of any one of EEE 9 to 11, wherein the functions further comprise: identifying, by the at least one processor of the ECI device, the diesel engine system, wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

EEE 13 is the non-transitory memory of EEE 12, wherein the functions further comprise: receiving, at the radio receiver of the ECI device, a fourth radio signal comprising data indicative of the diesel engine system, wherein the at least one processor of the ECI device uses the data indicative of the diesel engine system to identify the diesel engine system, and wherein the fourth radio signal is transmitted by the communication device.

EEE 14 is the non-transitory memory of any one of EEE 12 and 13, wherein the functions further comprise: transmitting, by the first transmitter of the ECI device to the first DLC, a message to request an identifier of the diesel engine system from the ECU, and receiving, by the second receiver of the ECI device, the identifier of the diesel engine system from the ECU, wherein the at least one processor of the ECI device uses the identifier of the diesel engine system from the ECU to identify the diesel engine system.

EEE 15 is the non-transitory memory of any one of EEE 9 to 14, wherein the ECI device further comprises a second connector connectable to the second DLC, but not to the first DLC.

EEE 16 is the non-transitory memory of EEE 15, wherein the functions further comprise: switching at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 17 is an ECI device for initiating regeneration of a DPF within a diesel engine system that comprises the DPF, a first DLC, and an ECU, the ECI device comprising: a first connector connectable to the first DLC, but not to a second DLC different than the first DLC; at least one processor; a radio receiver; a second receiver; a first transmitter; and a radio transmitter; wherein the radio receiver is configured to receive a first radio signal comprising a request for at least one DPF regeneration inhibit parameter, wherein the at least one processor is programmed to determine at least one message for requesting the at least one DPF regeneration inhibit parameter from the ECU, wherein the first transmitter is configured to transmit to the first DLC the at least one message for requesting the at least one DPF regeneration inhibit parameter from the ECU, wherein the second receiver is configured to receive the at least one DPF regeneration inhibit parameter from the ECU, wherein the received at least one DPF regeneration inhibit parameter indicates regeneration of the DPF can be initiated, wherein the at least one processor is programmed to determine at least one message for requesting the ECU to initiate regeneration of the DPF, and wherein the first transmitter is configured to transmit to the first DLC the at least one message for requesting the ECU to initiate regeneration of the DPF.

EEE 18 is the ECI device of EEE 17, wherein the radio transmitter is configured to transmit a second radio signal to a communication device that transmitted the first radio signal, wherein the second radio signal comprises the at least one DPF regeneration inhibit parameter from the ECU, and wherein the radio receiver is configured to receive a third radio signal transmitted by the communication device, wherein the third radio signal comprises an instruction to initiate regeneration of the DPF of the diesel engine system.

EEE 19 is the ECI device of any one of EEE 17 to 18, wherein a first terminal of the first connector is configured to receive via the first DLC, an electric current to power on at least one of (i) the radio receiver of the ECI device, (ii) the at least one processor of the ECI device, (iii) the second receiver of the ECI device, and (iv) the first transmitter of the ECI device; and wherein the at least one of (i) the radio receiver of the ECI device, (ii) the at least one processor of the ECI device, (iii) the second receiver of the ECI device, and (iv) the first transmitter of the ECI device are configured to power on using at least a portion of the received electric current.

EEE 20 is the ECI device of any one of EEE 17 to 19, wherein the at least one processor is programmed to identify the diesel engine system, wherein is programmed to determine the at least one message for requesting the at least one DPF regeneration inhibit parameter from the ECU comprises the at least one processor being programmed to determine the at least one message for requesting the at least one DPF regeneration inhibit parameter from the ECU is mapped to the identified diesel engine system within a database of DPF regeneration inhibit parameters.

EEE 21 is the ECI device of EEE 20, wherein the radio receiver is configured to receive a fourth radio signal comprising data indicative of the diesel engine system, wherein the at least one processor is programmed to use the data indicative of the diesel engine system to identify the diesel engine system, and wherein the fourth radio signal is transmitted by the communication device.

EEE 22 is the ECI device of any one of EEE 20 and 21, wherein the first transmitter is configured to transmit to the first DLC, a message to request an identifier of the diesel engine system from the ECU, and wherein the second receiver is configured to receive the identifier of the diesel engine system from the ECU, wherein the at least one processor is programmed to use the identifier of the diesel engine system from the ECU to identify the diesel engine system.

EEE 23 is the ECI device of any one of EEE 17 to 22, further comprising: a second connector connectable to the second DLC, but not to the first DLC.

EEE 24 is the ECI device of EEE 23, further comprising: a circuit switch comprising (i) a first switch configured to switch at least one connection terminal of the second connector to a high impedance state while the first connector is connected the first DLC and the second connector is not connected to the second DLC, (ii) a second switch configured to connect the transmitter to at least one connection terminal of the first connector while the first connector is connected to the first DLC and the second connector is not connected to the second DLC, and (iii) a third switch configured to disconnect the transmitter of the ECI device from at least one connection terminal of the second connector while the first connector is connected to the first DLC and the second connector is not connected to the second DLC.

EEE 25 is the ECI device of any one of EEE 17 to 23, further comprising: a housing, wherein the at least one processor, the radio receiver, the second receiver, the first transmitter, and the radio transmitter are located inside of the housing, wherein the housing comprises and/or is connected to the first connector, and wherein the housing comprises and/or is connected to the second connector.

EEE 26 is a method for initiating regeneration of a DPF within a diesel engine system that comprises the DPF, a first DLC, and an ECU, the method comprising: (i) transmitting, by a radio transmitter of a communication device, a first radio signal, the first radio signal comprising a request for an engine communication interface (ECI) device to provide at least one DPF regeneration inhibit parameter, wherein the ECI device comprises a first connector, the first connector being connectable to the first DLC, (ii) receiving, by a radio receiver of the communication device, a second radio signal, the second radio signal comprising the at least one DPF regeneration inhibit parameter, wherein the second radio signal is from the ECI device, (iii) determining, by at least one processor of the communication device, the at least one DPF regeneration inhibit parameter received by the radio receiver indicates regeneration of the DPF can be initiated, and (iv) transmitting, by the radio transmitter of the communication device, a third radio signal, the third radio signal comprising an instruction for the ECI device to output at least one message for requesting the ECU to initiate regeneration of the DPF.

EEE 27 is the method of EEE 26, further comprising: determining, by the at least one processor of the communication device, an identifier of the diesel engine system; and determining, by the at least one processor of the communication device based on the identifier of the diesel engine system, the at least one DPF regeneration inhibit parameter to include in the request of the first radio signal.

EEE 28 is the method of any one of EEE 26 to 27, further comprising: determining, by the at least one processor of the communication device based on the identifier of the diesel engine system, a communication protocol for communicating with the ECU; and determining, by the at least one processor based on the determined communication protocol and the identifier of the diesel engine system, the at least one message for requesting the ECU to initiate regeneration of the DPF, wherein each message of the at least one message for requesting the ECU to initiate regeneration of the DPF is configured according to the determined communication protocol.

EEE 29 is the method of EEE 26 to 28, further comprising: receiving, by the at least processor of the communication device, an input from a use of a user interface input component of the communication device, wherein the input is indicative of the diesel engine system, wherein the at least one processor of the communication device determines the identifier of the diesel engine system based on the input indicative of the diesel engine system.

EEE 30 is the method of EEE 26 to 29, further comprising: receiving, by the radio receiver of the communication device, a fourth radio signal, wherein the fourth radio signal is from the ECI device, wherein the fourth radio signal comprises data indicative of the diesel engine system, and wherein the at least one processor of the communication device determines the identifier of the diesel engine system based on the data indicative of the diesel engine system.

EEE 31 is the method of any one of EEE 26 to 30, further comprising: displaying, on a display of the communication device, the at least one DPF regeneration inhibit parameter received by the radio receiver and/or a status of regeneration of the DPF after regeneration of the DPF is initiated.

EEE 32 is the method of any one of EEE 26 to 31, wherein the ECI device comprises a second connector, the second connector being connectable to a second DLC different than the first DLC, wherein the first connector is not connectable to the second DLC, and wherein the second connector is not connectable to the first DLC.

EEE 33 is the method of EEE 32, further comprising: switching, by the at least one processor, at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 34 is the method of any one or EEE 26 to 33, wherein the communication device comprises a smart-phone.

EEE 35 is the method of any one of EEE 26 to 34, wherein the at least one DPF regeneration inhibit parameter comprises a parking brake status parameter, a transmission gear selection parameter, an engine coolant temperature parameter, and/or a foot pedal status parameter.

EEE 36 is the method of any one of EEE 26 to 35, further comprising: prior to receiving the second radio signal, determining, by the at least one processor of the communication device, a diagnostic trouble code that inhibits initiating regeneration of the DPF is set to active within the ECU; and prior to receiving the second radio signal, transmitting, by the radio transmitter of the communication device, an instruction for the ECI device to output a signal to cause the ECU to set the diagnostic trouble code to inactive within the ECU.

EEE 37 is a non-transitory memory storing computer-readable program instructions that, when executed by at least one processor of a communication device cause the communication device to perform functions for initiating regeneration of a DPF within a diesel engine system that comprises the DPF, a first DLC, and an ECU, the functions comprising: (i) transmitting, by a radio transmitter of the communication device, a first radio signal, the first radio signal comprising a request for an ECI device to provide at least one DPF regeneration inhibit parameter, wherein the ECI device comprises a first connector, the first connector being connectable to the first DLC, (ii) receiving, by a radio receiver of the communication device, a second radio signal, the second radio signal comprising the at least one DPF regeneration inhibit parameter, wherein the second radio signal is from the ECI device, (iii) determining, by at least one processor of the communication device, the at least one DPF regeneration inhibit parameter received by the radio receiver indicates regeneration of the DPF can be initiated, and (iv) transmitting, by the radio transmitter of the communication device, a third radio signal, the third radio signal comprising an instruction for the ECI device to output at least one message for requesting the ECU to initiate regeneration of the DPF.

EEE 38 is the non-transitory memory of EEE 37, wherein the functions further comprise: determining, by the at least one processor of the communication device, an identifier of the diesel engine system; and determining, by the at least one processor of the communication device based on the identifier of the diesel engine system, the at least one DPF regeneration inhibit parameter to include in the request of the first radio signal.

EEE 39 is the non-transitory memory of any one of EEE 37 to 38, wherein the functions further comprise: determining, by the at least one processor of the communication device based on the identifier of the diesel engine system, a communication protocol for communicating with the ECU; and determining, by the at least one processor based on the determined communication protocol and the identifier of the diesel engine system, the at least one message for requesting the ECU to initiate regeneration of the DPF, wherein each message of the at least one message for requesting the ECU to initiate regeneration of the DPF is configured according to the determined communication protocol.

EEE 40 is the non-transitory memory of EEE 37 to 39, wherein the functions further comprise: receiving, by the at least processor of the communication device, an input from a use of a user interface input component of the communication device, wherein the input is indicative of the diesel engine system, wherein the at least one processor of the communication device determines the identifier of the diesel engine system based on the input indicative of the diesel engine system.

EEE 41 is the non-transitory memory of EEE 37 to 40, wherein the functions further comprise: receiving, by the radio receiver of the communication device, a fourth radio signal, wherein the fourth radio signal is from the ECI device, wherein the fourth radio signal comprises data indicative of the diesel engine system, and wherein the at least one processor of the communication device determines the identifier of the diesel engine system based on the data indicative of the diesel engine system.

EEE 42 is the non-transitory memory of any one of EEE 37 to 41, wherein the functions further comprise: displaying, on a display of the communication device, the at least one DPF regeneration inhibit parameter received by the radio receiver and/or a status of regeneration of the DPF after regeneration of the DPF is initiated.

EEE 43 is the non-transitory memory of any one of EEE 37 to 42, wherein the ECI device comprises a second connector, the second connector being connectable to a second DLC different than the first DLC, wherein the first connector is not connectable to the second DLC, and wherein the second connector is not connectable to the first DLC.

EEE 44 is the not-transitory memory of EEE 43, wherein the functions further comprise switching at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 45 is the non-transitory memory of any one or EEE 37 to 44, wherein the communication device comprises a smart-phone.

EEE 46 is the non-transitory memory of any one of EEE 37 to 45, wherein the at least one DPF regeneration inhibit parameter comprises a parking brake status parameter, a transmission gear selection parameter, an engine coolant temperature parameter, and/or a foot pedal status parameter.

EEE 47 is the non-transitory memory of any one of EEE 37 to 45, wherein the functions further comprise: prior to receiving the second radio signal, determining, by the at least one processor of the communication device, a diagnostic trouble code that inhibits initiating regeneration of the DPF is set to active within the ECU; and prior to receiving the second radio signal, transmitting, by the radio transmitter of the communication device, an instruction for the ECI device to output a signal to cause the ECU to set the diagnostic trouble code to inactive within the ECU.

EEE 48 is a communication device for initiating regeneration of a DPF within a diesel engine system that comprises the DPF, a first DLC, and an ECU, the communication device comprising: a radio transmitter; a radio receiver configured to receive a second radio signal, the second radio signal comprising at least one DPF regeneration inhibit parameter, wherein the second radio signal is from the ECI device; and at least one processor programmed to: (i) transmit, via the radio transmitter, a first radio signal, the first radio signal comprising a request for an ECI device to provide the at least one DPF regeneration inhibit parameter, wherein the ECI device comprises a first connector, the first connector being connectable to the first DLC; (ii) determine the at least one DPF regeneration inhibit parameter received by the radio receiver indicates regeneration of the DPF can be initiated; and (iii) transmit, via the radio transmitter, a third radio signal, the third radio signal comprising an instruction for the ECI device to output at least one message for requesting the ECU to initiate regeneration of the DPF.

EEE 49 is the communication device of EEE 48, wherein the at least one processor is further programmed to: determine an identifier of the diesel engine system, and determine, based on the identifier of the diesel engine system, the at least one DPF regeneration inhibit parameter to include in the request of the first radio signal.

EEE 50 is the communication device of any one of EEE 48 to 49 wherein the at least one processor is further programmed to: determine, based on the identifier of the diesel engine system, a communication protocol for communicating with the ECU, and determine, based on the determined communication protocol and the identifier of the diesel engine system, the at least one message for requesting the ECU to initiate regeneration of the DPF, wherein each message of the at least one message for requesting the ECU to initiate regeneration of the DPF is configured according to the determined communication protocol.

EEE 51 is the communication device of EEE 48 to 50, wherein the at least one processor is further programmed to receive an input from a use of a user interface input component of the communication device, wherein the input is indicative of the diesel engine system, and wherein the at least one processor is further programmed to determine the identifier of the diesel engine system based on the input indicative of the diesel engine system.

EEE 52 is the communication device of EEE 48 to 51, wherein the radio receiver is configured to receive a fourth radio signal, wherein the fourth radio signal is from the ECI device, wherein the fourth radio signal comprises data indicative of the diesel engine system, and wherein the at least one processor is further programmed to determine the identifier of the diesel engine system based on the data indicative of the diesel engine system.

EEE 53 is the communication device of any one of EEE 48 to 52, further comprising: a display configured to display the at least one DPF regeneration inhibit parameter received by the radio receiver and/or a status of regeneration of the DPF after regeneration of the DPF is initiated.

EEE 54 is the communication device of any one of EEE 48 to 53, wherein the ECI device comprises a second connector, the second connector being connectable to a second DLC different than the first DLC, wherein the first connector is not connectable to the second DLC, and wherein the second connector is not connectable to the first DLC.

EEE 55 is the communication device of EEE 54, further comprising: a circuit switch comprising (i) a first switch configured to switch at least one connection terminal of the second connector to a high impedance state while the first connector is connected the first DLC and the second connector is not connected to the second DLC, (ii) a second switch configured to connect the transmitter to at least one connection terminal of the first connector while the first connector is connected to the first DLC and the second connector is not connected to the second DLC, and (iii) a third switch configured to disconnect the transmitter of the ECI device from at least one connection terminal of the second connector while the first connector is connected to the first DLC and the second connector is not connected to the second DLC.

EEE 56 is the communication device of any one or EEE 48 to 55, wherein the communication device comprises a smart-phone.

EEE 57 is the communication device of any one of EEE 48 to 56, wherein the at least one DPF regeneration inhibit parameter comprises a parking brake status parameter, a transmission gear selection parameter, an engine coolant temperature parameter, and/or a foot pedal status parameter.

EEE 58 is the communication device of any one of EEE 48 to 57, wherein the at least one processor is further programmed to determine, prior to the radio transmitter receiving the second radio signal, a diagnostic trouble code that inhibits initiating regeneration of the DPF is set to active within the ECU; and wherein the at least one processor is further programmed to transmit via the transmitter, prior to the radio receiver receiving the second radio signal, an instruction for the ECI device to output a signal to cause the ECU to set the diagnostic trouble code to inactive within the ECU.

EEE 59 is a method for initiating regeneration of a DPF within a diesel engine system that comprises the DPF, a first DLC, and an ECU, the method comprising: (i) receiving, by at least one processor of an ECI device, an input to request the ECI device to request the ECU to initiate regeneration of the DPF, wherein the ECI device comprises a first connector connectable to the first DLC, but not to a second DLC different than the first DLC, (ii) determining, by the at least one processor of the ECI device, at least one message for requesting at least one DPF regeneration inhibit parameter from the ECU, (iii) transmitting, by a transmitter of the ECI device to the first DLC, the at least one message for requesting the at least one DPF regeneration inhibit parameter from the ECU, (iv) receiving, by a receiver of the ECI device, the at least one DPF regeneration inhibit parameter from the ECU, wherein the received at least one DPF regeneration inhibit parameter indicates regeneration of the DPF can be initiated, (v) determining, by the at least one processor of the ECI device, at least one message for requesting the ECU to initiate regeneration of the DPF, and (vi) transmitting, by the transmitter of the ECI device to the first DLC, the at least one message for requesting the ECU to initiate regeneration of the DPF.

EEE 60 is the method of EEE 59, wherein the ECI device further comprises a switch, and wherein receiving the input occurs in response to an activation of the switch.

EEE 61 is the method of any one of EEEs 59 and 60, wherein receiving the input occurs in response to connection of the first connector to the first DLC.

EEE 62 is the method of any one of EEEs 59 to 61, further comprising: receiving, at a first terminal of the first connector via the first DLC, an electric current to power on at least one of (i) the at least one processor of the ECI device, (ii) the receiver of the ECI device, and (iii) the transmitter of the ECI device; and powering on, using at least a portion of the received electric current, the at least one of (iv) the at least one processor of the ECI device, (v) the second receiver of the ECI device, and (vi) the transmitter of the ECI device.

EEE 63 is the method of any one of EEEs 59 to 62, further comprising: identifying, by the at least one processor of the ECI device, the diesel engine system, wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

EEE 64 is the method of EEE 63, further comprising: transmitting, by the transmitter of the ECI device to the first DLC, a message to request an identifier of the diesel engine system from the ECU; and receiving, by the receiver of the ECI device, the identifier of the diesel engine system from the ECU, wherein the at least one processor of the ECI device uses the identifier of the diesel engine system from the ECU to identify the diesel engine system.

EEE 65 is the method of any one of EEEs 59-64, wherein the ECI device further comprises a second connector connectable to the second DLC, but not to the first DLC.

EEE 66 is the method of EEE 65, further comprising: switching, by the at least one processor, at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 67 is the method of any one of EEEs 59-66, further comprising: outputting, by the at least one processor, an electrical signal to control an indicator light to display a status of regenerating the DPF.

EEE 68 is an ECI device for initiating regeneration of a DPF within a diesel engine system that comprises the DPF, a first DLC, and an ECU, the ECI device comprising: a first connector connectable to the first DLC, but not to a second DLC different than the first DLC; at least one processor; a receiver; and a transmitter, wherein the at least one processor is configured to receive an input to request the ECI device to request the ECU to initiate regeneration of the DPF, wherein the at least one processor is programmed to determine at least one message for requesting at least one DPF regeneration inhibit parameter from the ECU, wherein the transmitter is configured to transmit to the first DLC the at least one message for requesting the at least one DPF regeneration inhibit parameter from the ECU, wherein the receiver is configured to receive the at least one DPF regeneration inhibit parameter from the ECU, wherein the received at least one DPF regeneration inhibit parameter indicates regeneration of the DPF can be initiated, wherein the at least one processor is programmed to determine at least one message for requesting the ECU to initiate regeneration of the DPF, and wherein the transmitter is configured to transmit to the first DLC the at least one message for requesting the ECU to initiate regeneration of the DPF.

EEE 69 is the ECI device of EEE 68, further comprising: a second connector connectable to the second DLC, but not to the first DLC.

EEE 70 is the ECI device of EEE 69, further comprising: a circuit switch comprising (i) a first switch configured to switch at least one connection terminal of the second connector to a high impedance state while the first connector is connected the first DLC and the second connector is not connected to the second DLC, (ii) a second switch configured to connect the transmitter to at least one connection terminal of the first connector while the first connector is connected to the first DLC and the second connector is not connected to the second DLC, and (iii) a third switch configured to disconnect the transmitter of the ECI device from at least one connection terminal of the second connector while the first connector is connected to the first DLC and the second connector is not connected to the second DLC.

EEE 71 is the ECI device of EEE 69, further comprising: a housing, wherein the at least one processor, the receiver, and the transmitter are located inside of the housing, wherein the housing comprises and/or is connected to the first connector, and wherein the housing comprises and/or is connected to the second connector.

EEE 72 is the ECI device of any one of EEEs 68 to 71, further comprising: a switch connected to the at least one processor, wherein the ECI device is configured to receive the input in response to an activation of the switch.

EEE 73 is the ECI device of any one of EEEs 68 to 72, further comprising: an indicator light connected to the at least one processor, wherein the at least one processor is programmed to output an electrical signal to control the indicator light to display a status of regenerating the DPF.

EEE 74 is the ECI device of any one of EEEs 68 to 73, further comprising: a first printed circuit board (PCB); a second PCB, wherein the second PCB is perpendicular to the first PCB, and optionally a third PCB and a board-to-board connector to electrically connect at least one circuit on the first PCB and at least one circuit on the third PCB, wherein the third PCB is parallel to the first PCB.

EEE 75 is a non-transitory memory storing computer-readable program instructions that, when executed by at least one processor of an ECI device that comprises a first connector connectable to a first DLC, but not to a second DLC different than the first DLC cause the ECI device to perform functions for initiating regeneration of a DPF within a diesel engine system that comprises the DPF, a first DLC, and an ECU, the functions comprising: (i) receiving, by the at least one processor of the ECI device, an input to request the ECI device to request the ECU to initiate regeneration of the DPF, (ii) determining, by the at least one processor of the ECI device, at least one message for requesting at least one DPF regeneration inhibit parameter from the ECU, (iii) transmitting, by a transmitter of the ECI device to the first DLC, the at least one message for requesting the at least one DPF regeneration inhibit parameter from the ECU, (iv) receiving, by a receiver of the ECI device, the at least one DPF regeneration inhibit parameter from the ECU, wherein the received at least one DPF regeneration inhibit parameter indicates regeneration of the DPF can be initiated, (v) determining, by the at least one processor of the ECI device, at least one message for requesting the ECU to initiate regeneration of the DPF, and (vi) transmitting, by the transmitter of the ECI device to the first DLC, the at least one message for requesting the ECU to initiate regeneration of the DPF.

EEE 76 is the non-transitory memory of EEE 75, wherein the ECI device further comprises a switch, and wherein receiving the input occurs in response to an activation of the switch.

EEE 77 is the non-transitory memory of any one of EEEs 75 and 76, wherein receiving the input occurs in response to connection of the first connector to the first DLC.

EEE 78 is the non-transitory memory of any one of EEEs 75 to 77, the functions further comprising: receiving, at a first terminal of the first connector via the first DLC, an electric current to power on at least one of (i) the at least one processor of the ECI device, (ii) the receiver of the ECI device, and (iii) the transmitter of the ECI device; and powering on, using at least a portion of the received electric current, the at least one of (iv) the at least one processor of the ECI device, (v) the second receiver of the ECI device, and (vi) the transmitter of the ECI device.

EEE 79 is the non-transitory memory of any one of EEEs 75 to 78, the functions further comprising: identifying, by the at least one processor of the ECI device, the diesel engine system, wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

EEE 80 is the non-transitory memory of EEE 79, the functions further comprising: transmitting, by the transmitter of the ECI device to the first DLC, a message to request an identifier of the diesel engine system from the ECU; and receiving, by the receiver of the ECI device, the identifier of the diesel engine system from the ECU, wherein the at least one processor of the ECI device uses the identifier of the diesel engine system from the ECU to identify the diesel engine system.

EEE 81 is the non-transitory memory of any one of EEEs 75-80, wherein the ECI device further comprises a second connector connectable to the second DLC, but not to the first DLC.

EEE 82 is the non-transitory memory of EEE 81, the functions further comprising: switching, by the at least one processor, at least one connection terminal of the second connector to a high impedance state while the first connector is connected the first DLC and the second connector is not connected to the second DLC; switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

EEE 83 is the non-transitory memory of any one of EEEs 75-82, the functions further comprising: outputting, by the at least one processor, an electrical signal to control an indicator light to display a status of regenerating the DPF.

We claim:

1. A method for initiating regeneration of a diesel particulate filter (DPF) within a diesel engine system that comprises the DPF, a first data link connector (DLC), and an electronic control unit (ECU), the method comprising:
receiving, at a radio receiver of an engine communication interface (ECI) device, a first radio signal comprising a request for at least one DPF regeneration inhibit parameter, wherein the ECI device comprises a first connector connectable to the first DLC, but not to a second DLC different than the first DLC;
determining, by at least one processor of the ECI device, at least one message for requesting the at least one DPF regeneration inhibit parameter from the ECU;
transmitting, by a first transmitter of the ECI device to the first DLC, the at least one message for requesting the at least one DPF regeneration inhibit parameter from the ECU;
receiving, by a second receiver of the ECI device, the at least one DPF regeneration inhibit parameter from the ECU, wherein the received at least one DPF regeneration inhibit parameter indicates regeneration of the DPF can be initiated;
determining, by the at least one processor of the ECI device, at least one message for requesting the ECU to initiate regeneration of the DPF; and
transmitting, by the first transmitter of the ECI device to the first DLC, the at least one message for requesting the ECU to initiate regeneration of the DPF.

2. The method of claim 1, further comprising:
transmitting, by a radio transmitter of the ECI device, a second radio signal to a communication device that transmitted the first radio signal received by the radio receiver, wherein the second radio signal comprises the at least one DPF regeneration inhibit parameter from the ECU; and
receiving, at the radio receiver of the ECI device, a third radio signal, wherein the third radio signal comprises an instruction to initiate regeneration of the DPF of the diesel engine system, and wherein the third radio signal is transmitted by the communication device.

3. The method of claim 1, further comprising:
receiving, at a first terminal of the first connector via the first DLC, an electric current to power on at least one of (i) the radio receiver of the ECI device, (ii) the at least one processor of the ECI device, (iii) the second receiver of the ECI device, and (iv) the first transmitter of the ECI device; and
powering on, using at least a portion of the received electric current, the at least one of (i) the radio receiver of the ECI device, (ii) the at least one processor of the ECI device, (iii) the second receiver of the ECI device, and (iv) the first transmitter of the ECI device.

4. The method of claim 1, further comprising:
identifying, by the at least one processor of the ECI device, the diesel engine system,
wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

5. The method of claim 4, further comprising:
receiving, at the radio receiver of the ECI device, a fourth radio signal comprising data indicative of the diesel engine system,
wherein the at least one processor of the ECI device uses the data indicative of the diesel engine system to identify the diesel engine system, and
wherein the fourth radio signal is transmitted by the communication device.

6. The method of claim 4, further comprising:
transmitting, by the first transmitter of the ECI device to the first DLC, a message to request an identifier of the diesel engine system from the ECU; and
receiving, by the second receiver of the ECI device, the identifier of the diesel engine system from the ECU,
wherein the at least one processor of the ECI device uses the identifier of the diesel engine system from the ECU to identify the diesel engine system.

7. The method of claim 1, wherein the ECI device further comprises a second connector connectable to the second DLC, but not to the first DLC.

8. An engine communication interface (ECI) device for initiating regeneration of a diesel particulate filter (DPF) within a diesel engine system that comprises the DPF, a first data link connector (DLC), and an electronic control unit (ECU), the ECI device comprising:
a first connector connectable to the first DLC, but not to a second DLC different than the first DLC;
at least one processor;
a radio receiver;
a second receiver;
a first transmitter; and
a radio transmitter;
wherein the radio receiver is configured to receive a first radio signal comprising a request for at least one DPF regeneration inhibit parameter,
wherein the at least one processor is programmed to determine at least one message for requesting the at least one DPF regeneration inhibit parameter from the ECU,
wherein the first transmitter is configured to transmit to the first DLC the at least one message for requesting the at least one DPF regeneration inhibit parameter from the ECU,
wherein the second receiver is configured to receive the at least one DPF regeneration inhibit parameter from the ECU,
wherein the received at least one DPF regeneration inhibit parameter indicates regeneration of the DPF can be initiated,
wherein the at least one processor is programmed to determine at least one message for requesting the ECU to initiate regeneration of the DPF, and wherein the first transmitter is configured to transmit to the first DLC the at least one message for requesting the ECU to initiate regeneration of the DPF.

9. The ECI device of claim 8, further comprising:
a second connector connectable to the second DLC, but not to the first DLC.

10. The ECI device of claim 9, further comprising:
a housing,
wherein the at least one processor, the radio receiver, the second receiver, the first transmitter, and the radio transmitter are located inside of the housing,
wherein the housing comprises and/or is connected to the first connector, and
wherein the housing comprises and/or is connected to the second connector.

11. A method for initiating regeneration of a diesel particulate filter (DPF) within a diesel engine system that comprises the DPF, a first data link connector (DLC), and an electronic control unit (ECU), the method comprising:
transmitting, by a radio transmitter of a communication device, a first radio signal, the first radio signal comprising a request for an engine communication interface (ECI) device to provide at least one DPF regeneration inhibit parameter, wherein the ECI device comprises a first connector, the first connector being connectable to the first DLC;
receiving, by a radio receiver of the communication device, a second radio signal, the second radio signal comprising the at least one DPF regeneration inhibit parameter, wherein the second radio signal is from the ECI device;
determining, by at least one processor of the communication device, the at least one DPF regeneration inhibit parameter received by the radio receiver indicates regeneration of the DPF can be initiated; and
transmitting, by the radio transmitter of the communication device, a third radio signal, the third radio signal comprising an instruction for the ECI device to output at least one message for requesting the ECU to initiate regeneration of the DPF.

12. The method of claim 11, further comprising:
determining, by the at least one processor of the communication device, an identifier of the diesel engine system; and
determining, by the at least one processor of the communication device based on the identifier of the diesel engine system, the at least one DPF regeneration inhibit parameter to include in the request of the first radio signal.

13. The method of claim 12, further comprising:
determining, by the at least one processor of the communication device based on the identifier of the diesel engine system, a communication protocol for communicating with the ECU; and
determining, by the at least one processor based on the determined communication protocol and the identifier of the diesel engine system, the at least one message for requesting the ECU to initiate regeneration of the DPF, wherein each message of the at least one message for requesting the ECU to initiate regeneration of the DPF is configured according to the determined communication protocol.

14. The method of claim 12, further comprising:
receiving, by at least processor of the communication device, an input from a use of a user interface input component of the communication device,
wherein the input is indicative of the diesel engine system, and
wherein the at least one processor of the communication device determines the identifier of the diesel engine system based on the input indicative of the diesel engine system.

15. The method of claim 12, further comprising:
receiving, by the radio receiver of the communication device, a fourth radio signal,
wherein the fourth radio signal is from the ECI device,
wherein the fourth radio signal comprises data indicative of the diesel engine system, and
wherein the at least one processor of the communication device determines the identifier of the diesel engine system based on the data indicative of the diesel engine system.

16. The method of claim 11, further comprising:
displaying, on a display of the communication device, the at least one DPF regeneration inhibit parameter received by the radio receiver and/or a status of regeneration of the DPF after regeneration of the DPF is initiated.

17. The method of claim 11,
wherein the ECI device comprises a second connector, the second connector being connectable to a second DLC different than the first DLC,
wherein the first connector is not connectable to the second DLC, and
wherein the second connector is not connectable to the first DLC.

18. The method of claim 11, wherein the communication device comprises a smart-phone.

19. The method of claim 11, wherein the at least one DPF regeneration inhibit parameter comprises a parking brake status parameter, a transmission gear selection parameter, an engine coolant temperature parameter, and/or a foot pedal status parameter.

20. The method of claim 11, further comprising:
prior to receiving the second radio signal, determining, by the at least one processor of the communication device, a diagnostic trouble code that inhibits initiating regeneration of the DPF is set to active within the ECU; and
prior to receiving the second radio signal, transmitting, by the radio transmitter of the communication device, an instruction for the ECI device to output a signal to cause the ECU to set the diagnostic trouble code to inactive within the ECU.

21. A communication device for initiating regeneration of a diesel particulate filter (DPF) within a diesel engine system that comprises the DPF, a first data link connector (DLC), and an electronic control unit (ECU), the communication device comprising:
a radio transmitter;
a radio receiver configured to receive a second radio signal, the second radio signal comprising at least one DPF regeneration inhibit parameter, wherein the second radio signal is from an engine communication interface (ECI) device; and
at least one processor programmed to:
transmit, via the radio transmitter, a first radio signal, the first radio signal comprising a request for the ECI device to provide at least one DPF regeneration inhibit parameter, wherein the ECI device comprises a first connector, the first connector being connectable to the first DLC;

determine the at least one DPF regeneration inhibit parameter received by the radio receiver indicates regeneration of the DPF can be initiated; and transmit, via the radio transmitter, a third radio signal, the third radio signal comprising an instruction for the ECI device to output at least one message for requesting the ECU to initiate regeneration of the DPF.

22. A method for initiating regeneration of a diesel particulate filter (DPF) within a diesel engine system that comprises the DPF, a first data link connector (DLC), and an electronic control unit (ECU), the method comprising:

receiving, by at least one processor of an engine communication interface (ECI) device, an input to request the ECI device to request the ECU to initiate regeneration of the DPF, wherein the ECI device comprises a first connector connectable to the first DLC, but not to a second DLC different than the first DLC;

determining, by the at least one processor of the ECI device, at least one message for requesting at least one DPF regeneration inhibit parameter from the ECU;

transmitting, by a transmitter of the ECI device to the first DLC, the at least one message for requesting the at least one DPF regeneration inhibit parameter from the ECU;

receiving, by a receiver of the ECI device, the at least one DPF regeneration inhibit parameter from the ECU, wherein the received at least one DPF regeneration inhibit parameter indicates regeneration of the DPF can be initiated;

determining, by the at least one processor of the ECI device, at least one message for requesting the ECU to initiate regeneration of the DPF; and transmitting, by the transmitter of the ECI device to the first DLC, the at least one message for requesting the ECU to initiate regeneration of the DPF.

23. The method of claim 22,
wherein the ECI device further comprises a switch, and
wherein receiving the input occurs in response to an activation of the switch.

24. The method of claim 22,
wherein receiving the input occurs in response to connection of the first connector to the first DLC.

25. The method of claim 22, further comprising:
receiving, at a first terminal of the first connector via the first DLC, an electric current to power on at least one of (i) the at least one processor of the ECI device, (ii) the receiver of the ECI device, and (iii) the transmitter of the ECI device; and powering on, using at least a portion of the received electric current, the at least one of (i) the at least one processor of the ECI device, (ii) the receiver of the ECI device, and (iii) the transmitter of the ECI device.

26. The method of claim 22, further comprising:
identifying, by the at least one processor of the ECI device, the diesel engine system,
wherein determining the at least one message for requesting the at least one DPF regeneration inhibit parameter from the ECU comprises determining the at least one message for requesting the at least one DPF regeneration inhibit parameter from the ECU is mapped to the identified diesel engine system within a database of DPF regeneration inhibit parameters.

27. The method of claim 26, further comprising:
transmitting, by the transmitter of the ECI device to the first DLC, a message to request an identifier of the diesel engine system from the ECU; and
receiving, by the receiver of the ECI device, the identifier of the diesel engine system from the ECU, wherein the at least one processor of the ECI device uses the identifier of the diesel engine system from the ECU to identify the diesel engine system.

28. The method of claim 22, wherein the ECI device further comprises a second connector connectable to the second DLC, but not to the first DLC.

29. The method of claim 28, further comprising:
switching, by the at least one processor, at least one connection terminal of the second connector to a high impedance state while the first connector is connected the first DLC and the second connector is not connected to the second DLC;

switching, within the ECI device, a first switch to connect the transmitter of the ECI device to at least one connection terminal of the first connector while the first connector is connected to the first DLC and the second connector is not connected to the second DLC; and switching, within the ECI device, a second switch to disconnect the transmitter of the ECI device from at least one connection terminal of the second connector while the first connector is connected to the first DLC and the second connector is not connected to the second DLC.

30. The method of claim 22, further comprising:
outputting, by the at least one processor, an electrical signal to control an indicator light to display a status of regenerating the DPF.

31. An engine communication interface (ECI) device for initiating regeneration of a diesel particulate filter (DPF) within a diesel engine system that comprises the DPF, a first data link connector (DLC), and an electronic control unit (ECU), the ECI device comprising:

a first connector connectable to the first DLC, but not to a second DLC different than the first DLC;
at least one processor;
a receiver; and
a transmitter,
wherein the at least one processor is configured to receive an input to request the ECI device to request the ECU to initiate regeneration of the DPF,
wherein the at least one processor is programmed to determine at least one message for requesting at least one DPF regeneration inhibit parameter from the ECU,
wherein the transmitter is configured to transmit to the first DLC the at least one message for requesting the at least one DPF regeneration inhibit parameter from the ECU,
wherein the receiver is configured to receive the at least one DPF regeneration inhibit parameter from the ECU,
wherein the received at least one DPF regeneration inhibit parameter indicates regeneration of the DPF can be initiated,
wherein the at least one processor is programmed to determine at least one message for requesting the ECU to initiate regeneration of the DPF, and
wherein the transmitter is configured to transmit to the first DLC the at least one message for requesting the ECU to initiate regeneration of the DPF.

32. The ECI device of claim 31, further comprising:
a second connector connectable to the second DLC, but not to the first DLC.

33. The ECI device of claim 32, further comprising:
a circuit switch comprising (i) a first switch configured to switch at least one connection terminal of the second connector to a high impedance state while the first connector is connected the first DLC and the second connector is not connected to the second DLC, (ii) a second switch configured to connect the transmitter to at least one connection terminal of the first connector while the first connector is connected to the first DLC and the second connector is not connected to the second DLC, and (iii) a third switch configured to disconnect the transmitter of the ECI device from at least one connection terminal of the second connector while the first connector is connected to the first DLC and the second connector is not connected to the second DLC.

34. The ECI device of claim 32, further comprising:

a housing, wherein the at least one processor, the receiver, and the transmitter are located inside of the housing, wherein the housing comprises and/or is connected to the first connector, and wherein the housing comprises and/or is connected to the second connector.

35. The ECI device of claim 31, further comprising:

a switch connected to the at least one processor, wherein the ECI device is configured to receive the input in response to an activation of the switch.

36. The ECI device of claim 31, further comprising:

an indicator light connected to the at least one processor, wherein the at least one processor is programmed to output an electrical signal to control the indicator light to display a status of regenerating the DPF.

37. The ECI device of claim 31, further comprising:

a first printed circuit board (PCB);

a second PCB, wherein the second PCB is perpendicular to the first PCB, and optionally a third PCB and a board-to-board connector to electrically connect at least one circuit on the first PCB and at least one circuit on the third PCB, wherein the third PCB is parallel to the first PCB.

* * * * *